United States Patent
You et al.

(10) Patent No.: US 11,089,596 B2
(45) Date of Patent: Aug. 10, 2021

(54) METHOD FOR TRANSMITTING DATE AND TERMINAL DEVICE

(71) Applicant: Huawei Technologies Co., Ltd., Shenzhen (CN)

(72) Inventors: Chunhua You, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 16/577,905

(22) Filed: Sep. 20, 2019

(65) Prior Publication Data
US 2020/0022126 A1   Jan. 16, 2020

Related U.S. Application Data

(63) Continuation of application No. PCT/CN2018/078970, filed on Mar. 14, 2018.

(30) Foreign Application Priority Data

Mar. 22, 2017 (CN) .......................... 201710174524.6
Jun. 16, 2017 (CN) .......................... 201710459397.4

(51) Int. Cl.
*H04W 72/04* (2009.01)
*H04W 76/11* (2018.01)
(Continued)

(52) U.S. Cl.
CPC ......... *H04W 72/046* (2013.01); *H04W 74/02* (2013.01); *H04W 74/0833* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 8,488,443 B2 * 7/2013 Lee .......................... H04L 5/001
   370/216
8,553,655 B1 * 10/2013 Dinan ................... H04L 5/0055
   370/336
(Continued)

FOREIGN PATENT DOCUMENTS

CN       1798446 A     7/2006
CN     103988551 A     8/2014
(Continued)

OTHER PUBLICATIONS

CATT, "Considerations on beam recovery mechanism," 3GPP TSG RAN WG1 Meeting 388, R1-1702078, Athens, Greece, Feb. 13-27, 2017, 4 pages.

*Primary Examiner* — Peter G Solinsky
*Assistant Examiner* — Sanjay K Dewan
(74) *Attorney, Agent, or Firm* — Slater Matsil, LLP

(57) ABSTRACT

This application provides a method for transmitting data and a terminal device. The method includes: receiving, by a terminal device, first control information transmitted by a network device, where the first control information includes identity information of at least one uplink beam, and the first control information is used to indicate whether the at least one uplink beam is valid; and if the first control information indicates that the at least one uplink beam is valid, determining, by the terminal device, that the at least one uplink beam is valid in preset duration; or if the first control information indicates that the at least one uplink beam is invalid, skipping, by the terminal device, transmitting data in the at least one uplink beam.

11 Claims, 12 Drawing Sheets

200

A terminal device receives first control information transmitted by a network device, where the first control information includes identity information of at least one uplink beam, and the first control information is used to indicate whether the at least one uplink beam is valid  — S210

If the first control information indicates that the at least one uplink beam is valid, the terminal device determines that the at least one uplink beam is valid in preset duration; or if the first control information indicates that the at least one uplink beam is invalid, the terminal device does not transmit data in the at least one uplink beam  — S220

(51) Int. Cl.
  *H04W 80/02*  (2009.01)
  *H04W 74/08*  (2009.01)
  *H04W 74/02*  (2009.01)
  *H04W 76/27*  (2018.01)

(52) U.S. Cl.
  CPC ............ *H04W 76/11* (2018.02); *H04W 76/27* (2018.02); *H04W 80/02* (2013.01)

(58) Field of Classification Search
  USPC ......................................................... 370/329
  See application file for complete search history.

(56) References Cited

U.S. PATENT DOCUMENTS

| | | | | |
|---|---|---|---|---|
| 9,237,582 | B2* | 1/2016 | Seol et al. ........ | H04W 72/1284 |
| | | | | 370/252 |
| 2013/0201938 | A1* | 8/2013 | Seol ................. | H04W 72/1284 |
| | | | | 370/329 |
| 2013/0229307 | A1 | 9/2013 | Chang et al. | |
| 2013/0258885 | A1* | 10/2013 | Yu ........................... | H04L 1/188 |
| | | | | 370/252 |
| 2015/0004918 | A1* | 1/2015 | Wang .................... | H04W 48/16 |
| | | | | 455/73 |
| 2015/0023274 | A1* | 1/2015 | Morita ................ | H04W 72/042 |
| | | | | 370/329 |
| 2015/0036665 | A1 | 2/2015 | Wang et al. | |
| 2015/0124768 | A1* | 5/2015 | Jang .................... | H04W 72/042 |
| | | | | 370/329 |
| 2015/0181539 | A1* | 6/2015 | Aiba ................ | H04W 52/243 |
| | | | | 370/329 |
| 2015/0341872 | A1 | 11/2015 | Ryu et al. | |
| 2018/0020503 | A1* | 1/2018 | Deenoo ................. | H04W 76/28 |
| 2018/0027548 | A1* | 1/2018 | Suzuki .............. | H04W 74/0833 |
| | | | | 370/329 |
| 2018/0042000 | A1 | 2/2018 | Zhang et al. | |
| 2019/0199615 | A1* | 6/2019 | Zhang ................. | H04B 7/0617 |
| 2020/0259601 | A1* | 8/2020 | Zhou ................... | H04L 5/0085 |

FOREIGN PATENT DOCUMENTS

| | | |
|---|---|---|
| CN | 104303428 A | 1/2015 |
| CN | 105210444 A | 12/2015 |
| CN | 106464321 A | 2/2017 |
| CN | 107005858 A | 8/2017 |
| KR | 20150134408 A | 12/2015 |
| WO | 2012062766 A1 | 5/2012 |
| WO | 2016127403 A1 | 8/2016 |
| WO | 2016165128 A1 | 10/2016 |

* cited by examiner

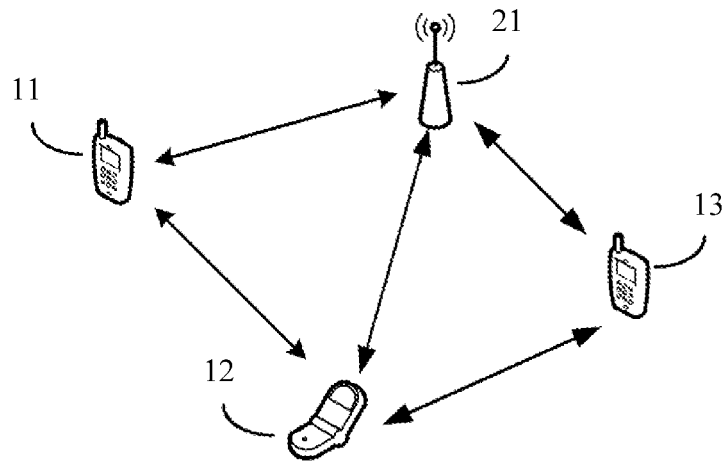

A terminal device receives first control information transmitted by a network device, where the first control information includes identity information of at least one uplink beam, and the first control information is used to indicate whether the at least one uplink beam is valid — S210

If the first control information indicates that the at least one uplink beam is valid, the terminal device determines that the at least one uplink beam is valid in preset duration; or if the first control information indicates that the at least one uplink beam is invalid, the terminal device does not transmit data in the at least one uplink beam — S220

A terminal device transmits a request message to a network device, and counts a quantity of times of transmitting the request message, where the request message is used to request to restore a downlink beam — S310

When the quantity of times of transmission does not reach a preset quantity of times, if the terminal device receives a response message transmitted by the network device, the terminal device stops transmitting the request message, and receives data that is transmitted by the network device by using a downlink beam indicated by the response message; or after the quantity of times of transmission reaches a preset quantity of times, the terminal device stops transmitting the request message — S320

A terminal device transmits a request message to a network device, and counts a quantity of times of transmitting the request message, where the request message is used to request to restore a downlink beam — S410

When the quantity of times of transmission does not reach a preset quantity of times, if the terminal device receives a response message transmitted by the network device with respect to the request message, the terminal device stops transmitting the request message, and receives an uplink transmission resource that is indicated by the network device by using the response message, where the uplink transmission resource may be used to transmit a measurement report or a beam status report; or when the quantity of times of transmission reaches a preset quantity of times, the terminal device stops transmitting the request message — S420

A terminal device transmits a request message to a network device, and counts a quantity of times of transmitting the request message, where the request message is used to request to restore a downlink beam — S510

When the quantity of times of transmission does not reach a preset quantity of times, if the terminal device receives a response message transmitted by the network device, the terminal device stops transmitting the request message, and receives data that is transmitted by the network device by using a downlink beam indicated by the response message; or when the quantity of times of transmission reaches a preset quantity of times, the terminal device stops transmitting the request message — S520

A terminal device transmits a first signal in at least one uplink beam to a network device, where the first signal is used by the network device to determine, from the at least one uplink beam in which the first signal is transmitted, that at least one first beam is valid — S610

The terminal device receives a first message transmitted by the network device, where the first message includes the at least one first beam — S620

The terminal device transmits data by using the at least one first beam — S630

```
A terminal device transmits a first signal in at least one uplink beam to a
network device, where the first signal is used by the network device to
determine, from the at least one uplink beam in which the first signal is
transmitted, that at least one first beam is valid
```
S710

```
The terminal device receives a first message transmitted by the network
device, where the first message includes an identity of the at least one
first beam
```
S720

The terminal device transmits data by using the at least one first beam — S730

A terminal device receives a first signal transmitted by a network device by using at least one downlink serving beam — S810

```
The terminal device determines cell out-of-synchronization or cell
synchronization, or beam out-of-synchronization or beam synchronization
according to first channel quality that is determined based on the first
signal in the at least one downlink beam
```
S820

FIG. 8

METHOD FOR TRANSMITTING DATE AND TERMINAL DEVICE

CROSS-REFERENCE TO RELATED APPLICATIONS

This application is a continuation of International Application No. PCT/CN2018/078970, filed on Mar. 14, 2018, which claims priority to Chinese Patent Application No. 201710174524.6, filed on Mar. 22, 2017 and Chinese Patent Application No. 201710459397.4, filed on Jun. 16, 2017. The disclosures of the aforementioned applications are hereby incorporated by reference in their entireties.

TECHNICAL FIELD

This application relates to the communications field, and more specifically, to a method for transmitting data and a terminal device.

BACKGROUND

Because conventional operating bands of a mobile communications system are mainly centered on bands lower than 6 GHz, spectrum resources are quite congested. To implement ultra-high-rate and short-range communication and support requirements in terms of a 5G capacity, transmission rate, and the like, the mobile communications system uses a high-frequency band (for example, a band higher than or equal to 6 GHz) to transmit a signal to mitigate a current situation of spectrum resource insufficiency. A high path loss is an inherent disadvantage of the high-frequency band. To overcome this disadvantage, a physical layer needs to use a high-gain beam antenna to enhance link coverage. A high-frequency cell may use a beam pair (beam pair) to perform data transmission. To be specific, a send end sends data in a direction or beam (beam), and a receive end also needs to receive data in a corresponding direction or beam. For example, a terminal device may perform data transmission with a network device by using at least one beam pair.

If the terminal device moves or a location of the terminal device changes, signal (received or sent) strength of a beam changes (increases or decreases), and data transmission is affected. In addition, there is currently no effective solution. Therefore, a method urgently needs to be provided to manage beams in the high-frequency band.

SUMMARY

This application provides a method for transmitting data and a terminal device to avoid unnecessary uplink transmission and achieve power saving and cell interference reduction.

According to a first aspect, a method for transmitting data is provided and includes: receiving, by a terminal device, first control information transmitted by a network device, where the first control information includes identity information of at least one uplink beam, and the first control information is used to indicate whether the at least one uplink beam is valid; and if the first control information indicates that the at least one uplink beam is valid, determining, by the terminal device, that the at least one uplink beam is valid in preset duration; or if the first control information indicates that the at least one uplink beam is invalid, skipping, by the terminal device, transmitting data in the at least one uplink beam.

In the method for transmitting data in this embodiment of this application, the terminal device receives the first control information transmitted by the network device, where the first control information includes the identity information of the at least one uplink beam, and the first control information is used to indicate whether the at least one uplink beam is valid; and if the first control information indicates that the at least one uplink beam is valid, the terminal device determines that the at least one uplink beam is valid in the preset duration; or if the first control information indicates that the at least one uplink beam is invalid, the terminal device does not transmit the data in the at least one uplink beam. Therefore, unnecessary uplink transmission can be avoided, and power saving and cell interference reduction are achieved.

Optionally, the first control information may include beam ID or index (index) information of the at least one uplink beam, so that the terminal device can identify the corresponding beam based on the identity information.

In this embodiment of this application, "a beam is valid" may be: when detecting that signal quality of a beam is higher than a threshold, a receive end (which may be specifically the network device) may consider that the beam is valid; otherwise, the receive end may consider that the beam is invalid. Alternatively, "a beam is valid" may be understood as "the beam is available"; and correspondingly, "a beam is invalid" is understood as "the beam is unavailable".

Optionally, the first control information may be transmitted via a MAC layer message or physical layer signaling. For example, the first control information may be transmitted by using a random access response (Random Access Response, RAR) message or a medium access control layer control element (Medium Access Control Control Element, MAC CE). For another example, the first control information may be further transmitted via downlink control signaling (Downlink Control Information, DCI).

In some possible implementations, the method further includes: when receiving the first control information, starting or restarting, by the terminal device, a first timer, where the preset duration is duration of a running period of the first timer.

Therefore, the terminal device may maintain valid duration of the beam by using the timer, and perform data transmission in the valid duration. This can avoid unnecessary uplink transmission.

Optionally, duration of the first timer may be configured by the network device. For example, the network device notifies the duration to the terminal device by using physical layer signaling, an RRC message, or a MAC CE.

In some possible implementations, the preset duration is preconfigured by the network device, or the preset duration is indicated by the network device by using the first control information.

Therefore, the preset duration in this embodiment of this application may be configured flexibly.

In some possible implementations, the method further includes: in the running period of the first timer, if the first control information indicates that the at least one uplink beam is invalid, determining, by the terminal device, that the at least one uplink beam is invalid, and stopping the first timer.

In some possible implementations, the method further includes: if the first timer expires or stops, and the terminal device has not received the first control information, determining, by the terminal device, that the at least one uplink beam is invalid.

Optionally, the terminal device does not use a transmission resource corresponding to the at least one uplink beam to transmit data, where the at least one uplink beam is invalid after the first timer expires or stops.

Optionally, if all serving beams in a serving cell of the terminal device fail, or timers corresponding to all serving beams in the serving cell expire, the terminal device may clear data in all HARQ buffers in the serving cell. This can prevent the terminal device from performing non-adaptive retransmission that does not comply with an expectation of the network device, and avoid interference to data transmission of other terminal devices.

After the at least one uplink beam fails, the terminal device may perform a subsequent beam training operation to obtain a valid uplink beam. Optionally, the beam training operation may include a random access process. In other words, the terminal device may obtain at least one valid uplink beam or at least one valid beam pair by using the random access process.

In some possible implementations, the method further includes: receiving, by a physical PHY layer of the terminal device, identity information of a downlink beam transmitted by the network device; transmitting, by the PHY layer of the terminal device, the identity information of the downlink beam to a medium access control MAC layer of the terminal device; selecting, by the MAC layer of the terminal device based on the identity information of the downlink beam, a first random access channel resource from a resource pool corresponding to the identity information of the downlink beam; transmitting, by the MAC layer of the terminal device, the first random access channel resource to the PHY layer of the terminal device; and transmitting, by the PHY layer of the terminal device, a random access preamble sequence in the at least one uplink beam to the network device by using the first random access channel resource.

Therefore, the MAC layer of the terminal device may interact with the PHY layer of the terminal device to obtain a beam ID or index, select a RACH resource based on the beam ID or index, and finally notify the selected RACH resource to the PHY layer of the terminal device to perform a random access process, so as to perform a beam training operation and obtain a valid beam.

According to a second aspect, a method for transmitting data is provided and includes: transmitting, by a terminal device, a request message to a network device, and counting a quantity of times of transmitting the request message, where the request message is used to request to recover a downlink beam; and when the quantity of times of transmission does not reach a preset quantity of times, if the terminal device receives a response message transmitted by the network device with respect to the request message, stopping transmitting the request message, and receiving data that is transmitted by the network device by using a downlink beam indicated by the response message, or receiving an uplink transmission resource that is indicated by the network device by using the response message, where the uplink transmission resource is used to transmit a measurement report or a beam status report; or when the quantity of times of transmission reaches a preset quantity of times, stopping, by the terminal device, transmitting the request message.

In this embodiment of this application, the terminal device transmits the request message to the network device, and counts the quantity of times of transmitting the request message; and before the quantity of times of transmission reaches the preset quantity of times, if the terminal device receives the response message transmitted by the network device, the terminal device stops transmitting the request message, and receives the data that is transmitted by the network device by using the downlink beam indicated by the response message; or after the quantity of times of transmission reaches the preset quantity of times, the terminal device stops transmitting the request message. Therefore, beam recovery can be performed, and further, unnecessary transmission of the request message is avoided, and power consumption of the terminal device is reduced.

Optionally, in an embodiment, the request message may include identity information of at least one downlink beam, where the at least one downlink beam is valid; or the request message includes identity information of at least one second downlink serving beam, where the at least one second downlink serving beam is a failed beam in a serving beam set of the terminal device.

In other words, the terminal device may add the identity information of the at least one valid downlink beam determined by the terminal device to the request message, so that the network device can determine, in the at least one downlink beam, a downlink beam finally used for transmitting data. Alternatively, the request message may include the identity information of the at least one second downlink serving beam, and the at least one second downlink serving beam is the failed beam in the serving beam set. All beams in the serving beam set may be used for data transmission between the terminal device and the network device.

In some possible implementations, before the transmitting, by a terminal device, a request message to a network device, the method further includes: determining, by the terminal device, that at least one first downlink serving beam fails, where the determining, by the terminal device, that at least one first downlink serving beam fails includes: determining, by the terminal device, that reference signal received power or reference signal received quality of at least one second downlink beam is higher than or equal to a first preset threshold; or determining, by the terminal device, that reference signal received power of at least one second downlink beam is higher than or equal to an average value of reference signal received power of the at least one first downlink serving beam; or determining, by the terminal device, that reference signal received quality of at least one second downlink beam is higher than or equal to an average value of reference signal received quality of the at least one first downlink serving beam; or determining, by the terminal device, that reference signal received power of at least one second downlink beam is higher than or equal to a sum of an average value of reference signal received power of the at least one first downlink serving beam and a second preset threshold; or determining, by the terminal device, that reference signal received quality of at least one second downlink beam is higher than or equal to a sum of an average value of reference signal received quality of the at least one first downlink serving beam and a third preset threshold; or determining, by the terminal device, that reference signal received power of at least one second downlink beam is higher than or equal to reference signal received power of a reference beam in the at least one first downlink serving beam, where the reference beam may be a beam with best reference signal received power or a beam with worst reference signal received power in the at least one first downlink serving beam; or determining, by the terminal device, that reference signal received quality of at least one second downlink beam is higher than or equal to reference signal received quality of a reference beam in the at least one first downlink serving beam, where the reference beam may be a beam with best reference signal received quality or a beam with worst reference signal received quality in the at least one first downlink serving beam; or determining, by the terminal device, that reference signal received power of at least one second downlink beam is higher than or equal to a sum of reference signal received power of a reference beam in the at least one first downlink serving beam and a fourth preset threshold, where the reference beam may be a beam with best reference signal received power or a beam with worst reference signal received power in the at least one first downlink serving beam; or determining, by the terminal device, that reference signal received quality of at least one second downlink beam is higher than or equal to a sum of reference signal received quality of a reference beam in the at least one first downlink serving beam and a fifth preset threshold, where the reference beam may be a beam with best reference signal received quality or a beam with worst reference signal received quality in the at least one first downlink serving beam.

Herein after determining to indicate that the at least one first downlink serving beam fails, the terminal device may transmit the request message to the network device.

Optionally, the terminal device may measure the downlink beam, and obtain signal strength of the downlink beam based on a measurement result. The terminal device may determine, based on the signal strength of the downlink beam, that at least one downlink beam (for example, the first downlink serving beam) fails (failure). For example, if signal strength of the at least one first downlink serving beam is lower than or equal to a threshold, the terminal device may consider that the at least one first downlink serving beam fails.

Optionally, the preset quantity of times is preconfigured by the network device, or pre-specified by a protocol, so that a quantity of times that the terminal device transmits a BRR is limited.

Optionally, when receiving the response message, the terminal device may perform a modification or adjustment operation on a receive beam, to receive data transmitted by the network device in at least one downlink beam, where the at least one downlink beam is indicated by the network device by using the response message.

In some possible implementations, the method further includes: after the quantity of times of transmission reaches the preset quantity of times, performing, by the terminal device, at least one of the following operations: transmitting, by the terminal device, a random access request to the network device; or determining, by the terminal device, a radio link failure; or entering, by the terminal device, an idle mode; or initiating, by the terminal device, a radio resource control RRC connection reestablishment process.

In some possible implementations, before the transmitting, by a terminal device, a request message to a network device, the method further includes: determining, by the terminal device based on the at least one first downlink serving beam, that at least one recovery request is triggered.

In some possible implementations, the method further includes: when the terminal device receives the response message transmitted by the network device, or when the quantity of times of transmission reaches the preset quantity of times, canceling, by the terminal device, the triggered at least one recovery request.

In some possible implementations, if the network device configures a discontinuous reception DRX mechanism for the terminal device, the request message is further used to trigger the terminal device to monitor a downlink channel.

In some possible implementations, optionally, the method further includes: after the terminal device transmits the request message of the downlink beam to the network device, and before the terminal device cancels the triggered at least one recovery request, monitoring, by the terminal device, the downlink channel to receive the response message transmitted by the network device.

In some possible implementations, the method further includes: if the terminal device detects, in a preset time window, the response message transmitted by the network device with respect to the request message, and no trigger condition used to control the terminal device to monitor the downlink channel is satisfied, stopping, by the terminal device, monitoring the downlink channel; or if the terminal device does not detect, in a preset time window associated with the request message, the response message transmitted by the network device with respect to the request message, and no trigger condition used to control the terminal device to monitor the downlink channel is satisfied, stopping, by the terminal device, monitoring the downlink channel.

In some possible implementations, before the terminal device receives the response message transmitted by the network device, the method further includes: receiving, by the terminal device, resource information transmitted by the network device, where the resource information is used to indicate an uplink transmission resource; and transmitting, by the terminal device, a medium access control control element MAC CE to the network device by using the uplink transmission resource, where the MAC CE includes the identity information of the at least one downlink beam, or the MAC CE includes the identity information of the at least one second downlink serving beam, and the at least one second downlink serving beam is the failed beam in the serving beam set of the terminal device.

In other words, the terminal device may add, to the MAC CE, the identity information of the at least one downlink beam having relatively good signal strength and determined by the terminal device, so that the network device can determine, in the at least one downlink beam, the downlink beam finally used for transmitting the data. Optionally, the MAC CE may also carry the identity information of the at least one second downlink serving beam, and the at least one second downlink serving beam is the failed beam in the serving beam set of the terminal device. In addition, the transmission resource used by the terminal device to transmit the MAC CE may be configured by the network device for the terminal device. Optionally, the identity information of the downlink beam may be a beam ID or index.

Optionally, the response message received by the terminal device is transmitted by the network device in one or more downlink beams, and the one or more downlink beams are obtained by the network device from the at least one downlink beam.

In other words, the terminal device may receive, in the one or more downlink beams determined by the network device, the response message transmitted by the network device.

According to a third aspect, a method for transmitting data is provided and includes: transmitting, by a terminal device, a first signal in at least one uplink beam to a network device, where the first signal is used by the network device to determine, from the at least one uplink beam in which the first signal is transmitted, that at least one first beam is valid; receiving, by the terminal device, a first message transmitted by the network device, where the first message includes the at least one first beam; and transmitting, by the terminal device, data by using the at least one first beam.

In the method for transmitting data in this embodiment of this application, the terminal device transmits the first signal in the at least one uplink beam to the network device, so that the network device determines, from the at least one uplink beam in which the first signal is transmitted, that at least one first beam having relatively good signal quality is valid; the terminal device receives the first message transmitted by the network device, where the first message includes the at least one first beam; and the terminal device finally transmits the data by using the at least one first beam, so that the data can be transmitted in the beam having relatively good signal quality.

Optionally, the at least one uplink beam may be accumulated at a same time or at different times, and this is not limited. Alternatively, all uplink beams of the terminal device are covered by beam sweeping (beam sweeping). To be specific, a beam coverage direction is relatively wide, and a possibility of being swept is relatively high.

Optionally, the terminal device may use the at least one first beam to transmit at least one of the following data: an SR, CSI, a HARQ feedback, an SRS, SPS, grant free, user plane data, control plane data, and the like.

In some possible implementations, if the network device configures a discontinuous reception DRX mechanism for the terminal device, the first signal is further used to trigger the terminal device to monitor a downlink channel.

In some possible implementations, the receiving, by the terminal device, a first message transmitted by the network device includes: when the terminal device transmits the first signal in the at least one uplink beam to the network device, starting, by the terminal device, a first timer; in a running period of the first timer, monitoring, by the terminal device, the downlink channel to receive the first message transmitted by the network device by using the downlink channel; and after detecting the first message, stopping, by the terminal device, monitoring the downlink channel.

In some possible implementations, before starting the first timer, the method further includes: after the terminal device transmits the first signal in the at least one uplink beam to the network device, starting, by the terminal device, a second timer; and in a running period of the second timer, skipping, by the terminal device, monitoring the downlink channel.

Further, because the timers are introduced to the terminal device, unnecessary monitoring is avoided, and power of the terminal device is saved.

According to a fourth aspect, a terminal device is provided, and is configured to perform the method in the first aspect or any possible implementation of the first aspect. Specifically, the apparatus includes a unit configured to perform the method in the first aspect or any possible implementation of the first aspect.

According to a fifth aspect, a terminal device is provided, and is configured to perform the method in the second aspect or any possible implementation of the second aspect. Specifically, the apparatus includes a unit configured to perform the method in the second aspect or any possible implementation of the second aspect.

According to a sixth aspect, a terminal device is provided, and is configured to perform the method in the third aspect or any possible implementation of the third aspect. Specifically, the apparatus includes a unit configured to perform the method in the third aspect or any possible implementation of the third aspect.

According to a seventh aspect, a terminal device is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in the first aspect or any possible implementation of the first aspect.

According to an eighth aspect, a terminal device is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in the second aspect or any possible implementation of the second aspect.

According to a ninth aspect, a terminal device is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in the third aspect or any possible implementation of the third aspect.

According to a tenth aspect, a computer-readable storage medium is provided, where the computer-readable storage medium stores a program, and the program enables a terminal device to perform the method for transmitting data in the first aspect and any possible implementation of the first aspect.

According to an eleventh aspect, a computer-readable storage medium is provided, where the computer-readable storage medium stores a program, and the program enables a terminal device to perform the method for transmitting data in the second aspect and any possible implementation of the second aspect.

According to a twelfth aspect, a computer-readable storage medium is provided, where the computer-readable storage medium stores a program, and the program enables a terminal device to perform the method for transmitting data in the third aspect and any possible implementation of the third aspect.

According to a thirteenth aspect, a method for transmitting data is provided and includes: receiving, by a terminal device, a first signal transmitted by a network device by using at least one downlink serving beam, where the first signal is a synchronization signal and/or a reference signal; and determining, by the terminal device, cell out-of-synchronization or cell synchronization, or beam out-of-synchronization or beam synchronization based on first channel quality that is determined based on a first signal in all or a part of the at least one downlink beam.

In this embodiment of this application, the terminal device receives the first signal transmitted by the network device by using the at least one downlink serving beam, and may determine the first channel quality based on the first signal in all or the part of the at least one downlink beam, to determine whether to initiate a reestablishment process.

Optionally, the determining, by the terminal device, cell out-of-synchronization or cell synchronization, or beam out-of-synchronization or beam synchronization based on reference signal received quality or reference signal received power of the at least one downlink beam includes: if the terminal device determines that reference signal received quality of all or the part of the at least one downlink beam is lower than a preset reference signal quality threshold, determining, by the terminal device, cell out-of-synchronization or beam out-of-synchronization; or if the terminal device measures that reference signal received power of all or the part of the at least one downlink beam is lower than a predetermined reference signal received power threshold, determining, by the terminal device, cell out-of-synchronization or beam out-of-synchronization.

According to a fourteenth aspect, a terminal device is provided, and is configured to perform the method in the thirteenth aspect or any possible implementation of the thirteenth aspect. Specifically, the apparatus includes a unit configured to perform the method in the thirteenth aspect or any possible implementation of the thirteenth aspect.

According to a fifteenth aspect, a terminal device is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in the thirteenth aspect or any possible implementation of the thirteenth aspect.

According to a sixteenth aspect, a computer-readable storage medium is provided, where the computer-readable storage medium stores a program, and the program enables a terminal device to perform the method for transmitting data in the thirteenth aspect and any possible implementation of the thirteenth aspect.

According to a seventeenth aspect, a method for transmitting data is provided and includes: receiving, by a terminal device, a first indication transmitted by a network device, where the first indication is used to allocate an uplink transmission resource; when determining that a first protocol layer protocol data unit PDU generated based on the uplink transmission resource includes padding bits, adding, by the terminal device, first protocol layer control signaling for a beam status report to the padding bits; and transmitting, by the terminal device, the first protocol layer PDU to the network device based on the first indication, where the first protocol layer PDU includes the padding bits, and the padding bits include the first protocol layer control signaling for the beam status report.

Optionally, the first protocol layer is a MAC layer, and the first protocol layer control signaling is a MAC CE.

In this embodiment of this application, the terminal device may transmit a padding beam status report MAC CE to the network device by using a remaining resource, without actively requesting a resource. Therefore, transmission resources can be utilized effectively, and resource waste is avoided.

According to an eighteenth aspect, a terminal device is provided, and is configured to perform the method in the seventeenth aspect or any possible implementation of the seventeenth aspect. Specifically, the apparatus includes a unit configured to perform the method in the seventeenth aspect or any possible implementation of the seventeenth aspect.

According to a nineteenth aspect, a terminal device is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in the seventeenth aspect or any possible implementation of the seventeenth aspect.

According to a twentieth aspect, a computer-readable storage medium is provided, where the computer-readable storage medium stores a program, and the program enables a terminal device to perform the method for transmitting data in the seventeenth aspect and any possible implementation of the seventeenth aspect.

According to a twenty-first aspect, a computer program product including an instruction is provided. When the computer program product runs on a computer, the computer is enabled to perform the method in the foregoing aspect and any possible implementation of the foregoing aspect.

BRIEF DESCRIPTION OF THE DRAWINGS

FIG. 1 is a schematic diagram of an application scenario;

FIG. 2 is a schematic flowchart of a method for transmitting data according to an embodiment of this application;

FIG. 3 is a schematic flowchart of a method for transmitting data according to another embodiment of this application;

FIG. 4 is a schematic flowchart of a method for transmitting data according to another embodiment of this application;

FIG. 5 is a schematic flowchart of a method for transmitting data according to another embodiment of this application;

FIG. 6 is a schematic flowchart of a method for transmitting data according to another embodiment of this application;

FIG. 7 is a schematic flowchart of a method for transmitting data according to another embodiment of this application;

FIG. 8 is a schematic flowchart of a method for transmitting data according to another embodiment of this application;

DETAILED DESCRIPTION OF ILLUSTRATIVE EMBODIMENTS

Figure 9:
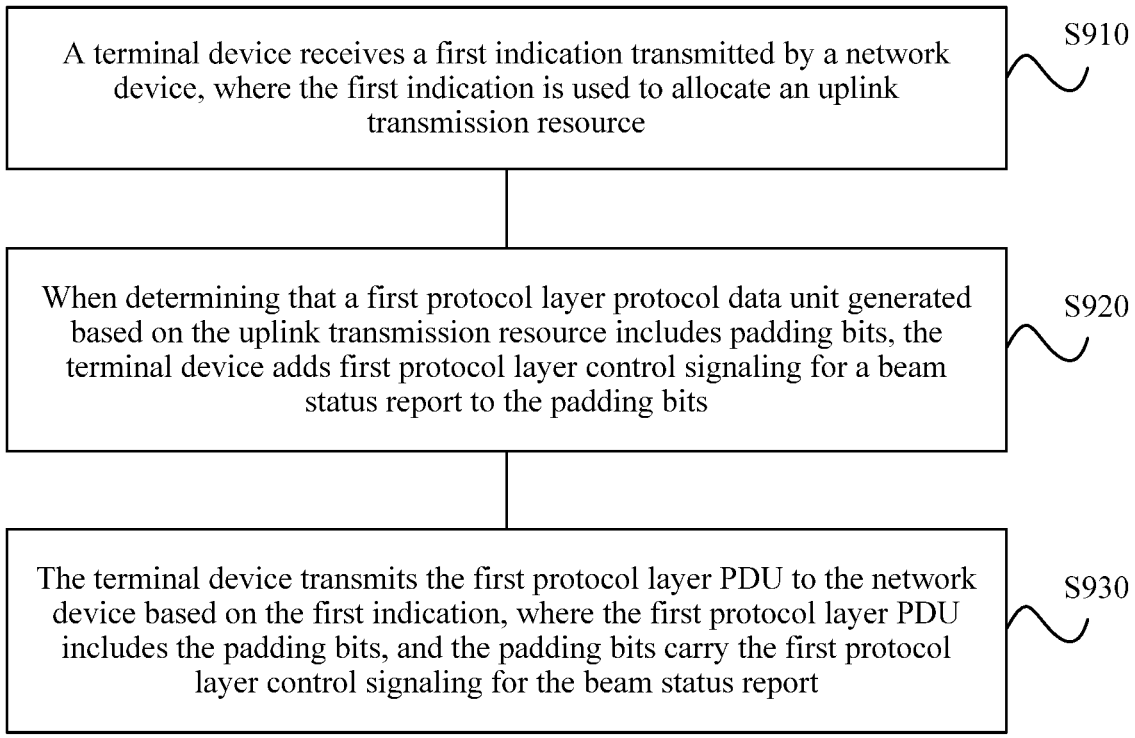
FIG. 9 is a schematic flowchart of a method for transmitting data according to another embodiment of this application.

The following describes technical solutions of this application with reference to accompanying drawings.

It should be understood that, the technical solutions of the embodiments of this application may be applied to various communications systems, for example, current communications systems such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, and a Universal Mobile Telecommunications System (UMTS), and particularly applied to a future 5G new radio (NR) system or a 5G system or a communications system based on an orthogonal frequency division multiplexing (OFDM) technology.

It should also be understood that, in the embodiments of this application, a network device may be referred to as a network device side, a base station, or the like. The base station may be a base transceiver station (BTS) in the GSM or CDMA, or may be a NodeB in the WCDMA, or may be an evolved NodeB (Evolutional NodeB, eNB, or eNodeB) in the LTE or a base station device gNB in a future 5G network. This is not limited in this application.

It should also be understood that, a terminal device in the embodiments of this application may communicate with one or more core networks by using a radio access network (RAN). The terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or the like.

FIG. 1 is a schematic diagram of a scenario. It should be understood that, for ease of understanding, herein the scenario in FIG. 1 is introduced as an example for description, but does not constitute a limitation on this application. FIG. 1 shows a terminal device 11, a terminal device 12, a terminal device 13, and a base station 21.

As shown in FIG. 1, the terminal device 11 may communicate with the base station 21, the terminal device 12 may communicate with the base station 21, and the terminal device 13 communicates with the base station 21. Alternatively, the terminal device 12 may communicate with the terminal device 11. Alternatively, in another case, the terminal device 13 communicates with the terminal device 12.

For a high-frequency cell, the terminal device 11 and the base station 21 may be used as an example, and a beam pair may be used for data transmission between the terminal device 11 and the base station 21. For example, the base station 21 transmits data in a direction or beam, and the terminal device 11 also needs to receive data in a corresponding direction or beam; or the terminal device 11 transmits data in a direction or beam, and the base station 21 also needs to receive data in a corresponding direction or beam.

The following briefly introduces or describes some terms used in the embodiments of this application.

A beam may be understood as a space domain resource, and may be a transmit or receive precoding vector with power transmission directivity. In addition, the transmit or receive precoding vector can be identified by using index information. The power transmission directivity may indicate that a signal precoded by using the precoding vector and received in a spatial position has relatively good received power, for example, satisfies a receive demodulation signal-to-noise ratio. The power transmission directivity may also indicate that same signals transmitted from different spatial positions and received by using the precoding vector have different received power.

Optionally, a same communications device (such as a terminal device or a network device) may have different precoding vectors, and different devices may also have different precoding vectors, that is, correspond to different beams.

With respect to a configuration or capability of the communications device, the communications device may use one or more of different precoding vectors at a same time, that is, one or more beams may be formed at the same time. Beam information may be identified by using index information. Optionally, the index information may correspond to a resource identity (ID) configured for UE. For example, the index information may correspond to an ID or a resource configured for a channel state information reference signal (CSI-RS), or may correspond to an ID or a resource configured for an uplink sounding reference signal (SRS). Alternatively, optionally, the index information may be index information explicitly or implicitly carried by a signal or a channel carried in a beam. For example, the index information may be index information of the beam, indicated by a synchronization signal or a broadcast channel transmitted by using the beam.

A beam pair may include a send beam of a send end and a receive beam of a receive end, also referred to as an uplink beam or a downlink beam. For example, the beam pair may include a gNB Tx beam transmit beam or a UE Rx beam receive beam, or a UE Tx beam transmit beam or a gNB Rx beam receive beam, where the transmit beam may also be understood as a send beam.

It should be understood that, the terms are applied to all the following embodiments. For brevity, meanings or functions of the terms are not described again when the terms appear again in the subsequent embodiments.

FIG. 2 is a schematic flowchart of a method 200 for transmitting data according to an embodiment of this application. The method 200 may be performed by a terminal device. For example, the terminal device may be the terminal device 11, the terminal device 12, or the terminal device 13 in FIG. 1. Correspondingly, a network device communicating with the terminal device may be the base station 21 in FIG. 1. As shown in FIG. 2, the method 200 includes the following steps.

S210. A terminal device receives first control information transmitted by a network device, where the first control information includes identity information of at least one uplink beam, and the first control information is used to indicate whether the at least one uplink beam is valid.

Optionally, the first control information may include the identity information (for example, beam ID or index information) of the at least one uplink beam, so that the terminal device can identify the corresponding beam based on the identity information of the beam.

Optionally, the at least one uplink beam may be an uplink serving beam. A serving beam may be a beam used for transmitting data between the terminal device and the network device. Serving beams may include an uplink serving beam and a downlink serving beam.

Optionally, in this embodiment of this application, "a beam is valid" may be: when detecting that signal quality of a beam is higher than a threshold, a receive end (which may be specifically the network device) may consider that the beam is valid; otherwise, the receive end may consider that the beam is invalid or fails. Alternatively, "a beam is valid" may be understood as "the beam is available"; and correspondingly, "a beam is invalid or fails" is understood as "the beam is unavailable".

In this embodiment of this application, "invalid" may be understood as "failed", and "failed" may also be understood as "invalid". The terms "invalid" and "failed" introduced in this embodiment of this application are only for ease of defining a status of a beam from different perspectives and do not constitute a limitation on this embodiment of this application. For example, from a perspective of a network device side, the network device may indicate, to the terminal device, that a beam is valid or invalid; and from a perspective of a terminal device side, the terminal device may determine through measurement that a beam is valid or that a beam fails. Certainly, this is only an example for description. Which term is specifically used for description may depend on a specific embodiment. A person skilled in the art can understand that the term "failed" or "invalid" of the beam does not constitute a limitation on this embodiment of this application.

Herein the uplink beam may include a transmit beam of the terminal device in a beam pair.

Correspondingly, the network device may transmit the first control information to the terminal device, to notify the terminal device which beams are valid or which beams are invalid.

For example, the network device may manage the beam pair based on measurement of the beam pair. Specifically, for example, if some uplink beams are valid, the network device may add the valid uplink beams; or if some uplink beams are invalid, the network device may perform an operation of removing the invalid uplink beams. In addition, the network device notifies the terminal device of the valid uplink beams or invalid uplink beams by using the first control information. In addition, if some uplink beams are valid, the network device may further notify the terminal device that the terminal device can continue to use the beams, so that a data transmission process is performed.

Optionally, the first control information may be transmitted by using a medium access control (MAC) layer control element layer message or physical (Physical, PHY) layer signaling. For example, the first control information may be transmitted by using a random access response (Random Access Response, RAR) message or a medium access control layer control element (Medium Access Control Control Element, MAC CE). For another example, the first control information may be further transmitted by using downlink control signaling (DCI).

Optionally, if the first control information is transmitted by using physical layer signaling, a physical layer of the terminal device needs to notify the first control information to a MAC layer of the terminal device. In other words, the physical layer of the terminal device may receive the first control information transmitted by the network device.

S220. If the first control information indicates that the at least one uplink beam is valid, the terminal device determines that the at least one uplink beam is valid in preset duration; or if the first control information indicates that the at least one uplink beam is invalid, the terminal device does not transmit data in the at least one uplink beam.

Specifically, the first control information may indicate whether the at least one uplink beam is valid. If the first control information indicates that the at least one uplink beam is valid, the terminal device may determine that the at least one uplink beam is valid in the preset duration. The terminal device may use the valid uplink beams to perform data communication with the network device. For example, the terminal device may use the valid uplink beams to transmit at least one of the following data: a scheduling request (SR), channel state information (CSI), a hybrid automatic repeat request (HARQ) feedback, a channel sounding reference signal (SRS), semi-persistent scheduling (SPS), grant free, user plane data, control plane data, and the like.

The SR is used by the terminal device to notify the network device that the terminal device has uplink data to be transmitted. Optionally, the SR may be transmitted by using a physical uplink control channel (PUCCH).

The CSI may include a channel quality indicator (CQI), a precoding matrix indicator (Precoding Matrix Indicator, PMI), a precoding type indicator (PTI), and a rank indicator (RI). The CSI is mainly used by the terminal device to notify quality of a downlink channel to the network device, so that the network device performs downlink scheduling based on the quality of the downlink channel. The CQI is used to select a modulation and coding scheme. The PMI is used to select a codebook of multi-antenna multiple-input multiple-output (MIMO). The PTI is used to indicate a precoding type. The RI is used to indicate a rank of an antenna matrix in the multi-antenna MIMO. Optionally, the CSI may also be transmitted by using the PUCCH.

The HARQ feedback is used as a feedback about downlink data. The SRS is used by the network device to perform uplink channel quality measurement or beam management.

The SPS is applicable to a service scenario in which a packet of a voice over IP network (VoIP) service or the like is periodically transmitted, and a packet size is basically fixed. In semi-persistent scheduling, the network device and the terminal device periodically reserve and use a specific radio bearer (RB) resource based on an agreement between the two parties. Therefore, PDCCH overheads are reduced.

"Grant free" means that before the terminal device uses grant free to transmit data, the network device does not need to dynamically allocate a dedicated resource. It may also be understood that, a grant free resource used by the terminal device is based on contention, and at least one terminal device may share the resource. Grant free is introduced mainly to save power of the terminal device.

It should be understood that, some possible transmission information of the terminal device in uplink transmission is described only as an example herein, and does not constitute a limitation on this embodiment of this application. Actually, other appropriate transmission information may be included.

Alternatively, if the first control information indicates that the at least one uplink beam is invalid, the terminal device does not perform uplink transmission in the at least one uplink beam. Specifically, the terminal device does not use the at least one uplink beam to transmit the data.

In the method for transmitting data in this embodiment of this application, the terminal device receives the first control information transmitted by the network device, where the first control information includes the identity information of the at least one uplink beam, and the first control information is used to indicate whether the at least one uplink beam is valid; and if the first control information indicates that the at least one uplink beam is valid, the terminal device determines that the at least one uplink beam is valid in the preset duration; or if the first control information indicates that the at least one uplink beam is invalid, the terminal device does not transmit the data in the at least one uplink beam. Therefore, unnecessary uplink transmission can be avoided, and power saving and cell interference reduction are achieved.

Optionally, the preset duration may be preconfigured by the network device; or the preset duration may be indicated by the network device by using the first control information. Optionally, the preset duration may be reflected by a timer.

Optionally, in an embodiment, the method 200 may further include: when receiving the first control information, the terminal device starts or restarts a first timer, where the preset duration is duration of a running period of the first timer.

Specifically, when the terminal device receives the first control information transmitted by the network device, the first timer may be introduced. The first timer may be specifically a timer of the MAC layer of the terminal device. For example, the first timer may be a beam pair timer. Alternatively, the first timer may be understood as a valid time of the first timer that the terminal device uses to maintain the uplink beam of the terminal device.

In this embodiment of this application, the first timer may be associated with a group of uplink beams, or the first timer may be associated with one uplink beam. Optionally, the group of uplink beams may be beams for at least one cell.

Optionally, duration of the first timer may be configured by the network device. For example, the network device notifies the duration of the first timer to the terminal device by using physical layer signaling, a radio resource control (RRC) message, or a MAC CE.

Herein, if the first control information indicates that the at least one uplink beam is valid, the terminal device may start or restart the first timer. In the running period of the first timer, the terminal device may determine that the at least one uplink beam is valid. In this case, the terminal device may be allowed to perform data transmission in the at least one uplink beam. For example, the terminal device may use a dedicated uplink resource and a related configuration of the terminal device corresponding to the beam pair, specifically including a time domain resource, a frequency domain resource, a code domain resource, a space domain resource, or the like. Specifically, "restarting the first timer" means that if the terminal device receives the first control information in the running period of the first timer, and the first control information indicates that the at least one uplink beam is valid, the terminal device may restart the first timer.

Optionally, in an embodiment, the method may further include: in the running period of the first timer, if the first control information indicates that the at least one uplink beam is invalid, the terminal device determines that the at least one uplink beam is invalid, and stops the first timer.

Specifically, in the running period of the first timer, if the first control information indicates that the at least one uplink beam is invalid, the terminal device may determine that the at least one uplink beam is invalid, and stop the first timer.

Optionally, in an embodiment, the method may further include: if the first timer expires or stops, and the terminal device has not received the first control information, the terminal device determines that the at least one uplink beam is invalid.

Optionally, the terminal device does not use a transmission resource corresponding to the at least one uplink beam to transmit the data. In other words, the at least one uplink beam pair is invalid after the first timer expires or stops.

Specifically, if the first timer expires or is stopped, and the terminal device has not received the first control information, the terminal device may consider that the at least one uplink beam is invalid. In addition, the terminal device does not transmit the data on the transmission resource corresponding to the at least one uplink beam. Optionally, the terminal device may release the SR, the CSI, the HARQ feedback, the SRS, the SPS, and the grant free resource configured in the at least one uplink beam.

Optionally, if described from perspectives of the physical PHY layer and the MAC layer of the terminal device, the method may include: the PHY layer of the terminal device may determine, based on the first control information, whether the at least one uplink beam is valid. If the PHY layer of the terminal device determines that the at least one uplink beam is invalid, the PHY layer of the terminal device may notify the MAC layer of the terminal device that the at least one uplink beam is invalid. After receiving the notification of the PHY layer of the terminal device, the MAC layer of the terminal device does not allow the at least one uplink beam to transmit at least one of the following data: the SR, the CSI, the HARQ feedback, the SRS, the SPS, the grant free, or the like. Herein the PHY layer of the terminal device may transmit a random access preamble sequence to perform a random access process, so as to obtain a valid uplink beam.

Optionally, if all serving beams in a serving cell of the terminal device fail, or timers corresponding to all serving beams in the serving cell expire, the terminal device may clear data in all HARQ buffers in the serving cell. This can prevent the terminal device from performing non-adaptive retransmission that does not comply with an expectation of the network device, and avoid interference to data transmission of other terminal devices.

After expiry or stopping of the first timer, which may also be understood as failure of the at least one uplink beam, or when the first control information received by the terminal device indicates that the at least one uplink beam is invalid, the terminal device may perform a subsequent beam training operation to obtain a valid uplink beam. Optionally, the beam training operation may include a random access process. In other words, the terminal device may obtain at least one valid uplink beam or at least one valid beam pair by using the random access process.

Optionally, in an embodiment, the method 200 may include: the PHY layer of the terminal device receives identity information of a downlink beam transmitted by the network device; the PHY layer of the terminal device transmits the identity information of the downlink beam to the MAC layer of the terminal device; the MAC layer of the terminal device selects, based on the identity information of the downlink beam, a first random access channel resource from a resource pool corresponding to the identity information of the downlink beam; the MAC layer of the terminal device transmits the first random access channel resource to the PHY layer of the terminal device; and the PHY layer of the terminal device transmits a random access preamble sequence in the at least one uplink beam to the network device by using the first random access channel resource.

A radio interface may include three protocol layers: a physical layer (L1), a data link layer (L2), and a network layer (L3) from bottom to top in sequence. The L1 is mainly used to provide a radio physical channel for transmission for a higher-layer service. From top to bottom in sequence, the L2 includes a packet data convergence (PDCP) layer, a radio link control (RLC) layer, a medium access control (MAC) layer, and a physical layer. The L3 includes an RRC sublayer in an access stratum, and mobility management (MM) and call control (CC) in a non-access stratum. The PHY layer provides a transmission medium and an interconnect device for data communication between devices, and provides a reliable environment for data transmission. The MAC layer may transmit data to the PHY layer in a specified format.

Specifically, the PHY layer of the terminal device may receive identity information (a DL beam ID or index) of a downlink beam transmitted by the network device. One random access channel (RACH) resource pool may be associated with or correspond to one DL beam ID or index. Then the PHY layer of the terminal device transmits the identity information of the downlink beam to the MAC layer of the terminal device. The MAC layer of the terminal device may select a RACH resource (for example, a first random access channel resource) from a RACH resource pool corresponding to the identity information of the downlink beam. Then the MAC layer of the terminal device transmits the first random access channel resource to the PHY layer of the terminal device. The PHY layer of the terminal device transmits a random access preamble sequence in at least one transmit beam to the network device by using the first random access channel resource. For example, the PHY layer of the terminal device transmits a preamble sequence to the network device by using the RACH resource. Correspondingly, the network device receives the random access preamble sequence by using at least one receive beam, and determines, based on signal quality of the random access preamble sequence received in the at least one receive beam, which transmit beam is valid and which transmit beam is invalid in the at least one transmit beam. Optionally, the network device may notify, by using the first control information, the terminal device which transmit beam is valid and which transmit beam is invalid.

In other words, the MAC layer of the terminal device may interact with the PHY layer of the terminal device to obtain the beam ID or index, select the RACH resource based on the beam ID or index, and finally notify the selected RACH resource to the PHY layer of the terminal device to perform a random access process, so as to perform a beam training operation and obtain a valid beam.

Optionally, when transmitting the first random access channel resource to the PHY layer of the terminal device, the MAC layer of the terminal device may further notify initial transmit power to the PHY layer of the terminal device. The PHY layer of the terminal device may use the initial transmit power to perform random access on the RACH resource.

Optionally, the initial transmit power may be carried in random access configuration information transmitted by the network device. For example, the random access configuration information may include power control information and/or random access resource information, where the power control information may include the initial transmit power and a power ramp step.

Optionally, the MAC layer of the terminal device may have not received a first indication transmitted by the PHY layer of the terminal device. To be specific, the MAC layer of the terminal device has not interacted with the PHY layer of the terminal device, and has not obtained the beam ID or index either. In this case, the MAC layer of the terminal device may select a RACH resource from a RACH resource pool (or a RACH resource pool used in previous successful random access) in which a preamble sequence is previously transmitted. In addition, on a basis of transmit power for transmitting the preamble sequence previously, the MAC layer of the terminal device may add one-step power based on the power ramp step as transmit power. Similarly, the MAC layer of the terminal device transmits the transmit power and the selected RACH resource to the PHY layer of the terminal device, so that the PHY layer of the terminal device may use the transmit power to perform random access on the selected RACH resource.

Therefore, the MAC layer of the terminal device interacts with the PHY layer of the terminal device to obtain the beam ID or index, and may perform a random access process, so that a valid beam is obtained for data transmission.

It should be understood that, in this embodiment of this application, the MAC layer of the terminal device interacts with the PHY layer of the terminal device to obtain the beam ID or index. Alternatively, this embodiment may be implemented separately, so that this embodiment is applied to another scenario and not limited to being applied to the random access process of the terminal device.

The foregoing describes some embodiments about an uplink beam in a high-frequency cell. The following describes some embodiments about a downlink beam in a high-frequency cell in detail.

FIG. 3 is a schematic flowchart of a method 300 for transmitting data according to another embodiment of this application. The method 300 may be performed by a terminal device. For example, the terminal device may be the terminal device 11, the terminal device 12, or the terminal device 13 in FIG. 1. Correspondingly, a network device communicating with the terminal device may be the base station 21 in FIG. 1. As shown in FIG. 3, the method 300 includes the following steps.

S310. A terminal device transmits a request message to a network device, and counts a quantity of times of transmitting the request message, where the request message is used to request to recover a downlink beam.

Optionally, the terminal device may transmit the request message in one or more uplink beams to the network device, for example, a beam recovery request (BRR) message, to request the network device to recover the downlink beam. Optionally, the terminal device may transmit the request message to the network device by using an omni-directional antenna. Further, the terminal device may introduce a counter to count the quantity of times of transmitting the request message. The counter is used to count the quantity of times of transmitting the request message. For example, for a group of uplink beams, when the terminal device transmits a BRR, the terminal device may add 1 to the counter. Optionally, the group of uplink beams may be beams obtained in a manner of beam sweeping.

Optionally, for example, if the terminal device has triggered only one BRR, and no other BRR is triggered to be in a pending state, the counter is marked as 0. Herein triggering the BRR and transmitting the request message are different actions of the terminal device. The pending state is: when the terminal device triggers at least one BRR, it may be considered that the at least one BRR is in the pending state. Optionally, if the pending state is canceled, the terminal device does not transmit the request message to the network device.

Optionally, in an embodiment, the request message may include identity information of at least one downlink beam, where the at least one downlink beam is valid; or the request message includes identity information of at least one second downlink serving beam, where the at least one second downlink serving beam is a failed beam in a serving beam set of the terminal device.

In other words, the terminal device may add the identity information of the at least one valid downlink beam determined by the terminal device to the request message, so that the network device can determine, in the at least one downlink beam, a downlink beam finally used for transmitting data. Optionally, the at least one downlink beam may be beams of a same serving cell, or may be beams of different serving cells. This is not limited.

Alternatively, the request message may include the identity information of the at least one second downlink serving beam, and the at least one second downlink serving beam is the failed beam in the serving beam set. All beams in the serving beam set may be used for data transmission between the terminal device and the network device. Optionally, the at least one second downlink serving beam may be beams of a same serving cell, or may be beams of different serving cells. This is not limited.

For example, if the terminal device may maintain M downlink serving beams (which may be understood as the foregoing serving beam set), if determining that N of the M downlink serving beams fail, where N is a positive integer less than or equal to M, the terminal device transmits a request message to the network device, where the request message may carry the N failed downlink serving beams and a beam having relatively good signal quality (which may be understood as the foregoing at least one downlink beam) that are determined by the terminal device. Optionally, the request message may be transmitted for the N downlink serving beams, or may not be related to the N downlink serving beams.

Optionally, the request message may further carry the serving beam set of the terminal device.

Optionally, before S310, the method 300 may further include: the terminal device determines that at least one first downlink serving beam fails.

Herein a serving beam may be a beam used for transmitting data between the terminal device and the network device. Serving beams may include an uplink serving beam and a downlink serving beam.

Optionally, the at least one first downlink serving beam may be beams of a same serving cell, or may be beams of different serving cells. This is not limited.

Optionally, the terminal device may measure the downlink serving beam, and obtain signal strength of the downlink beam based on a measurement result. The terminal device may determine, based on the signal strength of the downlink serving beam, that at least one downlink serving beam (for example, the first downlink serving beam) fails. For example, after a period of time in which signal strength of the at least one first downlink serving beam is lower than or equal to a threshold, the terminal device may consider that the at least one first downlink serving beam fails.

For example, the terminal device may determine that a serving beam in a serving cell fails, or may determine that an active serving beam fails.

In this embodiment of this application, after the terminal device determines that the at least one first downlink serving beam fails, the terminal device may trigger at least one BRR, and further transmit the triggered BRR to the network device, to request to recover the downlink beam.

Optionally, before S310, the terminal device may receive resource configuration information transmitted by the network device, where the resource configuration information is used to configure a first resource for a serving cell of the terminal device. Optionally, the first resource may include at least one of a time domain resource, a frequency domain resource, a code domain resource, and a space domain resource. Optionally, the first resource may be a resource of a primary cell (PCell) or a secondary cell (SCell).

Optionally, the terminal device may select a resource from the first resource to transmit the request message to the network device.

S320. When the quantity of times of transmission does not reach a preset quantity of times, if the terminal device receives a response message transmitted by the network device, the terminal device stops transmitting the request message, and receives data that is transmitted by the network device by using a downlink beam indicated by the response message; or after the quantity of times of transmission reaches a preset quantity of times, the terminal device stops transmitting the request message.

Specifically, when the quantity of times of transmitting the request message is less than or equal to the preset quantity of times (for example, the preset quantity of times is a predefined maximum quantity of times of transmission), if the terminal device receives the response message transmitted by the network device, the terminal device may stop transmitting the request message, and receive the data that is transmitted by the network device by using the downlink beam indicated by the response message (that is, perform data communication with the network device); or when the quantity of times of transmitting the request message is greater than or equal to a maximum quantity of times of transmission, the terminal device needs to stop transmitting the request message even if the terminal device does not receive the response message transmitted by the network device.

Herein the downlink beam indicated by the network device by using the response message is a valid beam, which may be understood as a valid downlink beam determined by the network device, where the downlink beam and the failed beam of the at least one first downlink serving beam determined by the terminal device are different concepts. In other words, the downlink beam indicated by the network device by using the response message is a beam that is determined by the network device and may be used by the terminal device for data transmission.

In this embodiment of this application, the terminal device transmits the request message to the network device, and counts the quantity of times of transmitting the request message; and before the quantity of times of transmission reaches the preset quantity of times, if the terminal device receives the response message transmitted by the network device, the terminal device stops transmitting the request message, and receives the data that is transmitted by the network device by using the downlink beam indicated by the response message; or after the quantity of times of transmission reaches the preset quantity of times, the terminal device stops transmitting the request message. Therefore, beam recovery can be performed, and further, unnecessary transmission of the request message is avoided, and power consumption of the terminal device is reduced.

Optionally, the preset quantity of times is preconfigured by the network device, or pre-specified by a protocol, so that the quantity of times that the terminal device transmits the request message is limited.

Optionally, when receiving the response message, the terminal device may perform a modification or adjustment operation on a receive beam, or may not perform modification or adjustment, to receive the data transmitted by the network device in the at least one downlink beam, where the at least one downlink beam is indicated by the network device by using the response message. Optionally, the data includes downlink control plane data and/or user plane data.

Herein the modification or adjustment operation includes: (1) if a part of receive beams change, the terminal device partially adjusts the receive beams based on the response message, for example, changes phases or angles of the receive beams; (2) if all receive beams change, the terminal device adjusts all the receive beams based on the response message, for example, changes phases or angles of the receive beams; or (3) if no receive beam changes, the terminal device does not adjust or change a direction of any receive beam. It should be understood that, herein only three cases are used as an example for description and do not constitute a limitation on this embodiment of this application. Actually there may be other appropriate adjustment or modification operations.

Optionally, the response message transmitted by the network device may include identity information of the at least one downlink beam, to notify the terminal device of a downlink beam serving the terminal device. Herein the at least one downlink beam may be understood as a beam used by the terminal device to update the serving beam set of the terminal device.

Optionally, the response message may further include an uplink grant (UL grant) or downlink assignment (DL assignment).

Optionally, the response message transmitted by the network device may also be transmitted by using physical layer signaling or a MAC CE.

Optionally, after stopping transmitting the request message, the terminal device may release the first resource, without transmitting the request message again. Therefore, unnecessary transmission of the request message is avoided, and power of the terminal is saved.

Optionally, the method 300 may further include: after the quantity of times of transmission reaches the preset quantity of times, the terminal device transmits a random access request to the network device; or the terminal device determines a radio link failure; or the terminal device enters an idle mode; or the terminal device initiates a radio resource control RRC connection reestablishment process.

Specifically, if the quantity of times of transmitting the request message is greater than or equal to the maximum quantity of times of transmission, the terminal device may transmit the random access request to the network device, to request the network device to provide a service for the terminal device; or the terminal device may consider a radio link failure; or the terminal device enters the idle mode, and releases a context of the serving cell of the terminal device; or the terminal device initiates the RRC connection reestablishment process, where the RRC connection reestablishment process is used to reestablish an RRC connection for restarting data transmission. In other words, after the quantity of times of transmission reaches the preset quantity of times, the terminal device may implement any one of the four cases. Alternatively, the terminal may perform other possible actions.

Optionally, before the terminal device transmits the request message to the network device, the method may further include: the terminal device determines, based on the at least one first downlink serving beam, that at least one recovery request is triggered.

In other words, after determining that the at least one first downlink serving beam fails, the terminal device may trigger the at least one recovery request. Herein the triggered at least one recovery request may be at least one BRR in the pending state. The terminal device may transmit the request message to the network device according to or based on the triggered at least one BRR. The pending state is: when the terminal device triggers at least one BRR, it may be considered that the at least one BRR is in the pending state. Optionally, if the pending state is canceled, the terminal device does not transmit the request message to the network device.

Optionally, as long as one BRR is in the pending state and is not canceled, the terminal device may continue to transmit the request message to the network device.

Optionally, the method 300 may further include: when the terminal device receives the response message transmitted by the network device, or when the quantity of times of transmission reaches the preset quantity of times, the terminal device cancels the triggered at least one recovery request.

Specifically, if the terminal device receives the response message transmitted by the network device, the triggered at least one recovery request may be canceled (that is, all BRRs in the pending state are canceled); or if the quantity of times that the terminal device transmits the request message exceeds or reaches the maximum quantity of times of transmission, the at least one recovery request may be canceled.

Optionally, if the network device configures a discontinuous reception DRX mechanism for the terminal device, the method further includes: after the terminal device transmits the request message of the downlink beam to the network device, and before the terminal device cancels the triggered at least one recovery request, the terminal device monitors a downlink channel to receive the response message transmitted by the network device.

Specifically, if the discontinuous reception (DRX) mechanism is configured for the terminal device, after the terminal device transmits the request message of the downlink beam to the network device, and before the terminal device cancels the at least one recovery request (that is, the at least one recovery request is still in the pending state), the terminal device may maintain an active time of the DRX mechanism, and monitor a downlink channel, for example, a physical downlink control channel (PDCCH), to receive the response message transmitted by the network device. Specifically, for example, the terminal device may monitor a PDCCH of a downlink serving beam set of a serving cell, or may monitor a PDCCH of a downlink serving beam set of at least one serving cell, to obtain the response message.

Optionally, the method 300 may further include: if the terminal device detects the response message transmitted by the network device, the terminal device stops monitoring the downlink channel; or if the quantity of times of transmission reaches the preset quantity of times, and the terminal device does not detect the response message transmitted by the network device, the terminal device stops monitoring the downlink channel.

Specifically, in the DRX mechanism, if the terminal device has successfully detected the response message, the terminal device may stop monitoring the downlink channel; or if the quantity of times that the terminal device transmits the request message reaches the maximum quantity of times of transmission, but the terminal device still does not detect the response message, the terminal device still stops monitoring the downlink channel.

The foregoing describes a case in which the terminal device may notify the network device, by using the request message, that the terminal device determines that at least one downlink beam is valid. In the following description, whether the at least one downlink beam is valid may be notified to the network device in other manners.

Optionally, in an embodiment, before the terminal device receives the response message transmitted by the network device, the method further includes: the terminal device receives resource information transmitted by the network device, where the resource information is used to indicate an uplink transmission resource; and the terminal device transmits a medium access control control element MAC CE to the network device by using the uplink transmission resource, where the MAC CE includes the identity information of the at least one downlink beam, and the at least one downlink beam is valid, or the MAC CE includes the identity information of the at least one second downlink serving beam, and the at least one second downlink serving beam is the failed beam in the serving beam set of the terminal device.

In other words, the terminal device may add, to the MAC CE, the identity information (for example, a beam ID or index) of the at least one downlink beam having relatively good signal strength and determined by the terminal device, so that the network device can determine, in the at least one downlink beam, the downlink beam finally used for transmitting the data. In addition, the transmission resource used by the terminal device to transmit the MAC CE may be configured by the network device for the terminal device. Optionally, the request message may further carry the serving beam set of the terminal device. Optionally, the at least one downlink beam may be beams of a same serving cell, or may be beams of different serving cells. This is not limited.

Alternatively, the MAC CE may include the identity information of the at least one second downlink serving beam, and the at least one second downlink serving beam is the failed beam in the serving beam set. All beams in the serving beam set may be used for data transmission between the terminal device and the network device. Optionally, the at least one second downlink serving beam may be beams of a same serving cell, or may be beams of different serving cells. This is not limited.

In conclusion, the terminal device may notify the network device of the at least one downlink beam, or the at least one second downlink serving beam, or the serving beam set of the terminal device by using the request message or the MAC CE. The network device may select one or more downlink beams from the at least one downlink beam to return the response message to the terminal device.

Optionally, the response message received by the terminal device is transmitted by the network device in one or more downlink beams, and the one or more downlink beams are obtained by the network device from the at least one downlink beam.

In other words, the terminal device may receive, in the one or more downlink beams determined by the network device, the response message transmitted by the network device.

In this embodiment of this application, the network device may select or determine one or more valid downlink beams from the at least one downlink beam (that is, the at least one downlink beam of the identity information carried in the request message or the MAC CE). Alternatively, the network device may select or determine one or more valid downlink beams from the serving beam set of the terminal device based on the at least one second downlink serving beam (that is, the at least one failed serving downlink beam of the identity information carried in the request message or the MAC CE).

Therefore, in this embodiment of this application, the terminal device transmits the request message to the network device, and counts the quantity of times of transmitting the request message; and before the quantity of times of transmission reaches the preset quantity of times, if the terminal device receives the response message transmitted by the network device, the terminal device stops transmitting the request message, and receives the data that is transmitted by the network device by using the downlink beam indicated by the response message; or after the quantity of times of transmission reaches the preset quantity of times, the terminal device stops transmitting the request message. Therefore, beam recovery can be performed, and further, unnecessary transmission of the request message is avoided, and power consumption of the terminal device is reduced.

In the method 200 of this embodiment of this application, the terminal device may receive the first control information transmitted by the network device, where the first control information is used to indicate whether the at least one uplink beam is valid. Further, this application further provides an embodiment in which a terminal device may transmit a first signal (for example, a synchronization signal) in advance to a network device, so that the network device can determine, based on the first signal, some beams having relatively good signal quality. The following describes this embodiment in detail with reference to FIG. 6. It should be understood that, this embodiment may be used in combination with the foregoing embodiment, or may be used separately. This is not limited herein.

FIG. 4 is a schematic flowchart of a method 400 for transmitting data according to another embodiment of this application. The method 400 may be performed by a terminal device. For example, the terminal device may be the terminal device 11, the terminal device 12, or the terminal device 13 in FIG. 1. Correspondingly, a network device communicating with the terminal device may be the base station 21 in FIG. 1. As shown in FIG. 4, the method 400 includes the following steps.

S410. A terminal device transmits a request message to a network device, and counts a quantity of times of transmitting the request message, where the request message is used to request to recover a downlink beam.

Optionally, the terminal device may transmit the request message in one or more uplink beams to the network device, for example, a beam failure recovery request (BRR) message, to request the network device to recover the downlink beam. Optionally, the request message may be further used to notify the network device that beam failure occurs on the terminal device. Optionally, the terminal device may transmit the request message to the network device by using an omni-directional antenna. Further, the terminal device may introduce a counter to count the quantity of times of transmitting the request message. In other words, in this embodiment of this application, the counter is used to count a quantity of times that the BRR is transmitted. For example, for a group of uplink beams, when the terminal device transmits a BRR, the terminal device may add 1 to the counter. Optionally, the group of uplink beams may be beams obtained in a manner of beam sweeping.

Optionally, the request message may be transmitted by using a physical uplink control channel PUCCH or a physical channel used for transmitting a preamble sequence preamble. If the request message is transmitted on the PUCCH, the request message is uplink control signaling; or if the request message is transmitted on the physical channel used for transmitting the preamble sequence, the request message is the preamble sequence. It should be noted that, if resources of both the physical uplink control channel PUCCH and the physical channel used for transmitting the preamble sequence preamble are configured for the terminal device, the terminal device preferentially selects the physical uplink control channel PUCCH to transmit the request message.

Optionally, for example, if the terminal device has triggered only one BRR, and no other BRR is triggered to be in a pending state (pending state), the counter is marked as 0. Herein triggering the BRR and transmitting the request message are different actions of the terminal device. The pending state is: when the terminal device triggers at least one BRR, it may be considered that the at least one BRR is in the pending state. Optionally, if the pending state is canceled, the terminal device does not transmit the request message to the network device.

Optionally, if a first timer is configured for the terminal device, in a running period of the first timer, even if the terminal device has triggered the BRR, the terminal device is not triggered to transmit the BRR to the network device by using at least one beam or at least one cell associated with the first timer, or the terminal device does not trigger the terminal device to transmit the BRR to the network device. Optionally, duration of the first timer is preconfigured by the network device or pre-specified by a protocol.

Optionally, the terminal device starts the first timer in a time unit in which a beam status report is transmitted or generated. Alternatively, when a MAC protocol data unit includes a beam status report, the terminal device may start the first timer in a time unit in which the beam status report is located. The beam status report may be understood as a beam measurement report.

Optionally, in an embodiment, the request message is used to indicate that the terminal device determines that a beam fails, and may be further used to indicate whether a beam includes an available downlink beam. The available downlink beam may be understood as a beam whose reference signal received power or reference signal quality is higher than or equal to a threshold.

In the technical solution of this application, identity information of the beam is a configured identity of a channel state information reference signal (CSI-RS) or a time index of a synchronization signal block (SS-block). A configuration of the CSI may include a configured identity of a time-frequency resource, and may further include an antenna port identity.

Optionally, before S410, the method 400 may further include: the terminal device determines that at least one first downlink serving beam fails.

For example, that the terminal device determines that at least one first downlink serving beam fails includes: the terminal device determines that reference signal received power or reference signal received quality of at least one second downlink beam is higher than or equal to a first preset threshold; or the terminal device determines that reference signal received power of at least one second downlink beam is higher than or equal to an average value of reference signal received power of the at least one first downlink serving beam; or the terminal device determines that reference signal received quality of at least one second downlink beam is higher than or equal to an average value of reference signal received quality of the at least one first downlink serving beam; or the terminal device determines that reference signal received power of at least one second downlink beam is higher than or equal to a sum of an average value of reference signal received power of the at least one first downlink serving beam and a second preset threshold; or the terminal device determines that reference signal received quality of at least one second downlink beam is higher than or equal to a sum of an average value of reference signal received quality of the at least one first downlink serving beam and a third preset threshold; or the terminal device determines that reference signal received power of at least one second downlink beam is higher than or equal to reference signal received power of a reference beam in the at least one first downlink serving beam, where the reference beam may be a beam with best reference signal received power or a beam with worst reference signal received power in the at least one first downlink serving beam; or the terminal device determines that reference signal received quality of at least one second downlink beam is higher than or equal to reference signal received quality of a reference beam in the at least one first downlink serving beam, where the reference beam may be a beam with best reference signal received quality or a beam with worst reference signal received quality in the at least one first downlink serving beam; or the terminal device determines that reference signal received power of at least one second downlink beam is higher than or equal to a sum of reference signal received power of a reference beam in the at least one first downlink serving beam and a fourth preset threshold, where the reference beam may be a beam with best reference signal received power or a beam with worst reference signal received power in the at least one first downlink serving beam; or the terminal device determines that reference signal received quality of at least one second downlink beam is higher than or equal to a sum of reference signal received quality of a reference beam in the at least one first downlink serving beam and a fifth preset threshold, where the reference beam may be a beam with best reference signal received quality or a beam with worst reference signal received quality in the at least one first downlink serving beam.

The first preset threshold, the second preset threshold, the third preset threshold, the fourth preset threshold, and the fifth preset threshold may be configured by a network or pre-specified by a protocol.

Optionally, a specific quantity of the at least one second downlink beams may be configured by the network device, or specified by a protocol.

In the technical solution of this application, a serving beam is associated with a beam of the SS-block or the CSI-RS. For example, the serving beam is the same as a beam parameter of the beam of the SS-block or the CSI-RS, or the serving beam and the beam of the SS-block or the CSI-RS are quasi-co-located. "Quasi-co-location" may be understood as "geographical locations of antennas used for transmitting beams are approximate or the same". Optionally, the specific quantity of the at least one second downlink beams may be configured by the network.

Optionally, the terminal device starts or restarts a second timer when generating a beam status report. Alternatively, when a MAC protocol data unit includes a beam status report, the terminal device starts or restarts the second timer in a time unit in which the beam status report is located.

Optionally, duration of the second timer may be configured by the network. When the second timer expires, the terminal device may trigger a beam status report, but the terminal device is not triggered to transmit a beam failure recovery request to the network device. Optionally, if the terminal device obtains an uplink transmission resource allocated by the network device, and the beam status report is triggered when the second timer expires, the terminal device may transmit the beam status report to the network device based on the uplink transmission resource.

In the technical solution of this application, the beam status report may be understood as a beam measurement report.

Herein the serving beam may be a beam used for transmitting data between the terminal device and the network device, for example, transmitting dedicated downlink control information on a downlink control channel. The serving beam may include an uplink serving beam and/or a downlink serving beam.

Optionally, the at least one first downlink serving beam may be beams of a same serving cell, or may be beams of different serving cells. This is not limited.

Optionally, the terminal device may measure a reference signal of a downlink serving beam. For example, the reference signal is a CSI-RS and/or a synchronization signal (the synchronization signal may include at least one of a primary synchronization signal PSS, a secondary synchronization signal SSS, and a demodulation signal DMRS in system information) of a synchronization signal block (SS-block), and then signal quality or reference signal received quality or reference signal received power of the downlink beam is obtained based on a measurement result. Then the terminal device may determine, based on the signal quality or reference signal received quality or reference signal received power of the downlink serving beam, that at least one downlink serving beam (for example, a first downlink serving beam) fails (failure). For example, after a period of time in which the signal quality or reference signal received quality or reference signal received power of the at least one first downlink serving beam is lower than or equal to a threshold, the terminal device may consider that the at least one first downlink serving beam fails.

For example, the terminal device may determine that a serving beam in a serving cell fails, or may determine that an active serving beam fails.

In this embodiment of this application, after the terminal device determines that the at least one first downlink serving beam fails, the terminal device may trigger at least one BRR or a beam status report, and further transmit the request message to the network device, to request to recover the downlink beam.

Optionally, before S410, the terminal device may receive resource configuration information transmitted by the network device, where the resource configuration information is used to configure a first resource for a serving cell of the terminal device. Optionally, the first resource may include at least one of a time domain resource, a frequency domain resource, a code domain resource, and a space domain resource. Optionally, the first resource may be a resource of a primary cell (PCell) or a secondary cell (SCell).

Optionally, the terminal device may select a resource from the first resource to transmit the request message to the network device.

S420. When the quantity of times of transmission does not reach a preset quantity of times, if the terminal device receives a response message transmitted by the network device with respect to the request message, the terminal device stops transmitting the request message, and receives an uplink transmission resource that is indicated by the network device by using the response message, where the uplink transmission resource may be used to transmit a measurement report or a beam status report; or when the quantity of times of transmission reaches a preset quantity of times, the terminal device stops transmitting the request message.

Specifically, the terminal device receives, in a preset time window after transmitting the request message every time, the response message transmitted by the network device with respect to the request message. When the quantity of times of transmitting the request message is less than or equal to the preset quantity of times (for example, a maximum quantity of times of transmission), if the terminal device receives the response message transmitted by the network device with respect to the request message, the terminal device may stop transmitting the request message, and receive the uplink transmission resource added by the network device to the response message. Optionally, the response message may further carry an uplink time advance (uplink time advance). The uplink time advance is an uplink time advance determined by using a downlink time for reference. The terminal device may report the beam measurement report or the beam status report to the network device based on the uplink transmission resource, where the beam measurement report or the beam status report may be carried in a MAC CE or physical layer signaling. The beam measurement report may include an identity of at least one valid downlink beam. Alternatively, when the quantity of times of transmitting the request message is greater than or equal to the maximum quantity of times of transmission, even if the terminal device has not received the response message transmitted by the network device, the terminal device must stop transmitting the request message. Optionally, if the request message is a preamble sequence, the response message includes the uplink transmission resource and the uplink time advance; or if the request message is uplink control information, the response message includes the uplink transmission resource. In the technical solution of this application, the beam measurement report may also be a beam status report.

In this embodiment of this application, the terminal device transmits the request message to the network device, and counts the quantity of times of transmitting the request message; and before the quantity of times of transmission reaches the preset quantity of times, if the terminal device receives the response message transmitted by the network device with respect to the request message, the terminal device stops transmitting the request message, and receives the uplink transmission resource added by the network device to the response message, and reports the beam measurement report or the beam status report to the network device based on the uplink transmission resource; or after the quantity of times of transmission reaches the preset quantity of times, the terminal device stops transmitting the request message, so that beam recovery can be performed. Further, unnecessary transmission of the request message is avoided, and power consumption of the terminal device is reduced.

In other words, the terminal device may transmit the beam measurement report by using the MAC CE or physical layer signaling, where the beam measurement report carries identity information (for example, a beam ID or index) of at least one downlink beam having relatively good signal strength and determined by the terminal device, so that the network device can determine, in the at least one downlink beam, a downlink beam finally used for transmitting data. In addition, the transmission resource for transmitting the beam measurement report by the terminal device may be configured by the network device for the terminal device. Optionally, the request message may further carry the serving beam set of the terminal device. Optionally, the at least one downlink beam may be beams of a same serving cell, or may be beams of different serving cells. This is not limited.

Alternatively, the beam measurement report may also include identity information of at least one second downlink serving beam, and the at least one second downlink serving beam is a failed beam in the serving beam set. All beams in the serving beam set may be used for data transmission between the terminal device and the network device. Optionally, the at least one second downlink serving beam may be beams of a same serving cell, or may be beams of different serving cells. This is not limited.

Optionally, the preset quantity of times is preconfigured by the network device, or pre-specified by a protocol, so that the quantity of times that the terminal device transmits the request message is limited.

In this embodiment of this application, after reporting the measurement result, the terminal device receives an indication from the network device, where the indication is used to perform a modification or adjustment operation on a receive beam, or modification or adjustment may not be performed, to receive data transmitted by the network device in the at least one downlink beam, where the at least one downlink beam is indicated by the network device by using the response message. Optionally, the data includes downlink control plane data and/or user plane data.

Herein the modification or adjustment operation includes: (1) if a part of receive beams change, the terminal device partially adjusts the receive beams based on the response message, for example, changes phases or angles of the receive beams; (2) if all receive beams change, the terminal device adjusts all the receive beams based on the response message, for example, changes phases or angles of the receive beams; or (3) if no receive beam changes, the terminal device does not adjust or change a direction of any receive beam. It should be understood that, herein only three cases are used as an example for description and do not constitute a limitation on this embodiment of this application. Actually there may be other appropriate adjustment or modification operations.

Optionally, after stopping transmitting the request message, the terminal device may release the first resource, without transmitting the request message again. Therefore, unnecessary transmission of the request message is avoided, and power of the terminal is saved.

Optionally, the method 400 may further include: after the quantity of times of transmission reaches the preset quantity of times, the terminal device transmits a random access request to the network device; or the terminal device determines a radio link failure; or the terminal device enters an idle mode; or the terminal device initiates a radio resource control RRC connection reestablishment process.

Optionally, the terminal device may count a quantity of times of transmitting the request message in a specific beam. In other words, the terminal device may separately count quantities of times of transmitting the request message in different beams. In this case, after quantities of times associated with all beams reach the preset quantity of times, the terminal device transmits the random access request to the network device; or the terminal device determines a radio link failure; or the terminal device enters the idle mode; or the terminal device initiates the radio resource control RRC connection reestablishment process.

Optionally, the terminal device may count a quantity of times of transmitting the request message in a cell. In other words, the terminal device may separately count quantities of times of transmitting the request message in different cells. In this case, after a quantity of times associated with a specific cell such as the primary cell reaches the preset quantity of times, the terminal device transmits the random access request to the network device; or the terminal device determines a radio link failure; or the terminal device enters the idle mode; or the terminal device initiates the radio resource control RRC connection reestablishment process. Optionally, the terminal device may count a quantity of times of transmitting the request message in any cell. In other words, the terminal device does not separately count quantities of times of transmitting the request message in different cells.

Specifically, optionally, if the request message is transmitted by using the PUCCH, and the quantity of times of transmitting the request message is greater than or equal to the maximum quantity of times of transmission, the terminal device may transmit the random access request on a contention-based or non-contention-based resource to the network device, for example, a first preamble sequence, to request the network device to provide a service for the terminal device; or the terminal device may consider a radio link failure; or the terminal device enters the idle mode, and releases a context of the serving cell of the terminal device; or the terminal device initiates the RRC connection reestablishment process, where the RRC connection reestablishment process is used to reestablish an RRC connection for restarting data transmission, or the terminal device is triggered to transmit a second preamble sequence to the network device, where the second preamble sequence is used to notify the network device that the beam fails, and the second preamble sequence is transmitted by using a non-contention-based dedicated resource. In other words, if the request message is transmitted by using the PUCCH, after the quantity of times of transmission reaches the preset quantity of times, the terminal device may implement any one of the foregoing cases.

Optionally, if the request message is transmitted by using the channel used for transmitting the preamble sequence preamble, and the quantity of times of transmitting the request message is greater than or equal to the maximum quantity of times of transmission, the terminal device may transmit the random access request to the network device, to request the network device to provide a service for the terminal device; or the terminal device may consider a radio link failure; or the terminal device enters the idle mode, and releases a context of the serving cell of the terminal device; or the terminal device initiates the RRC connection reestablishment process, where the RRC connection reestablishment process is used to reestablish an RRC connection for restarting data transmission; or the terminal device is triggered to transmit a third preamble sequence to the network device, where the third preamble sequence is used to notify the network device that the beam fails, and the third preamble sequence is transmitted by using a contention-based common resource. In other words, if the request message is transmitted by using the channel used for transmitting the preamble sequence, after the quantity of times of transmission reaches the preset quantity of times, the terminal device may implement any one of the foregoing cases. Alternatively, the terminal device may perform other possible actions, and this is not limited herein.

Optionally, if the request message is transmitted by using the PUCCH, and the quantity of times of transmitting the request message is greater than or equal to the maximum quantity of times of transmission, the terminal device may release a PUCCH resource configured by the network device, and may further release an SRS resource configured by the network device, and may further clear a semi-persistent scheduling resource.

Alternatively, optionally, if the request message is transmitted by using a dedicated or non-contention-based resource of the channel used for transmitting the preamble sequence preamble, and the quantity of times of transmitting the request message is greater than or equal to the maximum quantity of times of transmission, the terminal device may release the dedicated resource of the channel used for transmitting the preamble sequence preamble and configured by the network device, and may further release the dedicated resource of the channel used for transmitting the preamble sequence preamble and configured by the network device, to reduce cell interference.

Optionally, before the terminal device transmits the request message to the network device, the method 400 may further include: the terminal device determines, based on the at least one first downlink serving beam, that at least one recovery request is triggered; and further, the terminal device determines, based on the at least one first downlink serving beam, that at least one beam status report is triggered, and determines, based on the triggered beam status report, that at least one recovery request is triggered.

In other words, after the terminal device determines that the at least one first downlink serving beam fails, the terminal device may trigger the at least one recovery request, or after the terminal device determines that the at least one first downlink serving beam fails, the terminal device may trigger the at least one beam status report, and then trigger the at least one recovery request based on the triggered beam status report. Herein the triggered at least one recovery request may be at least one BRR in the pending state. The terminal device may transmit the request message to the network device according to or based on the triggered at least one BRR. The pending state is: when the terminal device triggers at least one BRR, it may be considered that the at least one BRR is in the pending state. Optionally, if the pending state is canceled, the terminal device does not transmit the request message to the network device.

Optionally, as long as one BRR is in the pending state and is not canceled, the terminal device may continue to transmit the request message to the network device.

Optionally, if the first timer is configured for the terminal device, in the running period of the first timer, even if the terminal device has triggered the BRR, the terminal device is not triggered to transmit the BRR to the network device by using at least one beam or at least one cell associated with the first timer or does not transmit the BRR to the network device. The duration of the first timer is preconfigured by the network device or pre-specified by a protocol. Optionally, the terminal device may start the first timer when the terminal device generates or transmits the BRR or the MAC protocol data unit includes the beam status report.

Optionally, in an embodiment, the method 400 may further include: when the terminal device receives the response message transmitted by the network device with respect to the request message, or when the quantity of times of transmission reaches the preset quantity of times, the terminal device cancels the triggered at least one recovery request.

Specifically, if the terminal device receives the response message transmitted by the network device with respect to the request message, the triggered at least one recovery request may be canceled (that is, all BRRs in the pending state are canceled); or if the quantity of times that the terminal device transmits the request message exceeds or reaches the maximum quantity of times of transmission, the at least one recovery request may be canceled.

Optionally, in an embodiment, the method 400 may further include: if the network device configures a discontinuous reception DRX mechanism for the terminal device, the request message is further used to trigger the terminal device to monitor a downlink channel; for example, the method further includes: after the terminal device transmits the request message of the downlink beam to the network device, and before the terminal device cancels the triggered at least one recovery request, the terminal device monitors the downlink channel to receive the response message transmitted by the network device.

Optionally, every time the terminal device transmits at least one request message, a preset time window is associated. When the quantity of times of transmission does not reach or reaches the preset quantity of times, the terminal device is triggered to monitor the downlink channel. Optionally, the preset time window may be specifically a DRX timer in the DRX mechanism. This is not limited.

Specifically, if the discontinuous reception (DRX) mechanism is configured for the terminal device, after the terminal device transmits the request message of the downlink beam to the network device, and before the terminal device cancels the at least one recovery request (that is, the at least one recovery request is still in the pending state), the terminal device may, for example, maintain an active time of the DRX mechanism in each preset time window, and monitor the downlink channel, for example, a physical downlink control channel (PDCCH), to receive the response message transmitted by the network device. For example, the response message is used to indicate the uplink transmission resource, so that the terminal device reports the beam measurement report or the beam status report. If the terminal device detects the response message transmitted by the network device and/or the quantity of times of transmission reaches the preset quantity of times but the terminal device has not detected the response message transmitted by the network device, the triggered at least one recovery request is canceled. Specifically, for example, the terminal device may monitor a PDCCH of a downlink serving beam set of a serving cell, or may monitor a PDCCH of a downlink serving beam set of at least one serving cell, to obtain the response message.

Optionally, the method 400 may further include: if the terminal device detects, in a preset time window, the response message transmitted by the network device with respect to the request message, and no other trigger condition used to control the terminal device to monitor the downlink channel is satisfied, the terminal device stops monitoring the downlink channel; or if the quantity of times of transmission reaches the preset quantity of times, and the terminal device does not detect, in a preset time window, the response message transmitted by the network device, and no other trigger condition used to control the terminal device to monitor the downlink channel is satisfied, the terminal device stops monitoring the downlink channel; or if the terminal device does not detect, in a preset time window associated with the request message, the response message transmitted by the network device, and no other trigger condition used to control the terminal device to monitor the downlink channel is satisfied, the terminal device stops monitoring the downlink channel.

For example, other trigger conditions used to control the terminal device to monitor the downlink channel include at least one of the following conditions:

(1) In a running period of a third timer, the terminal device periodically starts the third timer. In the running period of the third timer, the terminal device monitors the downlink channel, which is used by the terminal device to determine whether there is downlink control signaling transmitted by the network device, for example, downlink assignment (DL assignment) or an uplink grant (UL grant). The third timer may be an On duration timer, and duration of the first timer may be preconfigured by the network device.

(2) In a running period of a fourth timer, the terminal device starts or restarts the fourth timer when receiving downlink control signaling transmitted by the network device and used to indicate new (uplink or downlink) transmission. In the running period of the fourth timer, the terminal device monitors the downlink channel to receive the downlink control signaling transmitted by the network device. The fourth timer may be a DRX inactivity timer, and duration of the fourth timer may be preconfigured by the network device.

(3) In a running period of a fifth timer, the terminal device starts or restarts the fifth timer when receiving downlink data transmitted by the network device. In the running period of the fifth timer, the terminal device monitors the downlink channel to receive downlink control signaling transmitted by the network device for retransmission of the downlink data. The fifth timer may be a DRX retransmission timer, and duration of the fifth timer may be preconfigured by the network device.

(4) In a running period of a sixth timer, the terminal device transmits uplink data, and starts or restarts the sixth timer. In the running period of the sixth timer, the terminal device monitors the downlink channel to receive an uplink grant transmitted by the network device for retransmission of the uplink data. The sixth timer may be a DRX UL retransmission timer, and duration of the sixth timer may be preconfigured by the network device.

(5) A scheduling request is in a pending (pending) state, where the pending (pending) state is used to trigger transmission of a scheduling request on an uplink control channel to the network device.

(6) At least one uplink grant that may be used for HARQ retransmission exists, and data exists in at least one HARQ buffer.

(7) In a period in which a random access response message with respect to a dedicated preamble sequence is successfully received but no downlink control information used to indicate new (uplink and/or downlink) transmission is received.

(8) When the terminal device has received a first trigger for two-step scheduling, and expects to receive a corresponding second trigger. The first trigger and the second trigger determine a time domain resource position for uplink transmission.

(9) The terminal device transmits at least one first signal in at least one beam to the network device, where the first signal is used to trigger the terminal device to monitor the downlink channel. For example, the first signal is an SRS signal. For descriptions about the first signal, refer to descriptions in the following method 600 or 700.

It should be understood that, the foregoing nine conditions are used only as an example for description herein, and do not constitute a limitation on this embodiment of this application. The other trigger conditions used to control the terminal device to monitor the downlink channel may further include a condition that is introduced in the future and used to control the terminal device to monitor the downlink control channel.

It should also be understood that, numbers "first", "second", . . . , that are introduced in this embodiment of this application are only for distinguishing different objects, for example, distinguishing different timers, and do not constitute a limitation on the protection scope of this embodiment.

The other trigger conditions used to control the terminal device to monitor the downlink channel do not include that the terminal device transmits the request message.

When none of the trigger conditions used to control the terminal device to monitor the downlink channel is satisfied, the terminal device stops monitoring the downlink channel, or does not monitor the downlink channel any longer. For example, the preset time window may be implemented by using a timer. For example, the terminal device may start or restart a seventh timer every time the terminal device transmits at least one request message, and monitor the downlink control channel in a running period of the seventh timer. For example, if the terminal device successfully detects the response message with respect to the request message in the running period of the seventh timer, and no other trigger condition used to control the terminal device to monitor the downlink channel is satisfied, the terminal device may stop monitoring the downlink channel, and stop the seventh timer; or if the quantity of times that the terminal device transmits the request message reaches the maximum quantity of times of transmission, but the terminal device still does not detect the response message in the running period of the seventh timer, and no other trigger condition used to control the terminal device to monitor the downlink channel is satisfied, the terminal device stops monitoring the downlink channel, and stops the seventh timer; or when the seventh timer expires, if the terminal device has not detected the response message transmitted by the network device, and no other trigger condition used to control the terminal device to monitor the downlink channel is satisfied, the terminal device stops monitoring the downlink channel.

Specifically, in the DRX mechanism, if the terminal device successfully detects the response message with respect to the request message in the preset time window, and no other trigger condition used to control the terminal device to monitor the downlink channel is satisfied, the terminal device may stop monitoring the downlink channel; if the quantity of times that the terminal device transmits the request message reaches the maximum quantity of times of transmission, but the terminal device still does not detect the response message with respect to the request message in the preset time window, and no other trigger condition used to control the terminal device to monitor the downlink channel is satisfied, the terminal device stops monitoring the downlink channel; or if the terminal device does not detect, in the preset time window associated with the request message, the response message transmitted by the network device with respect to the request message, and no other trigger condition used to control the terminal device to monitor the downlink channel is satisfied, the terminal device stops monitoring the downlink channel. The other trigger conditions used to control the terminal device to monitor the downlink channel do not include the following condition: The terminal device detects the response message transmitted by the network device, and the quantity of times of transmission reaches the preset quantity of times but the terminal device does not detect the response message transmitted by the network device.

Optionally, the network device or the terminal device may divide a cell into a plurality of groups, and each group uses a set of DRX timers, where the DRX timers (for example, a DRX retransmission timer or a DRX UL retransmission timer) of each group run independently. States of UE are a collection of a plurality of sets of DRX states.

Specifically, the downlink channel may be a physical downlink control channel of at least one cell.

In the foregoing description, the terminal device may notify the network device, by using the request message, that the terminal device determines that at least one valid downlink beam exists. For example, the terminal device indicates, to the network device by using zero or one character, whether at least one failed downlink beam exists. For example, 1 indicates existence, and 0 indicates nonexistence.

Therefore, in this embodiment of this application, the terminal device transmits the request message to the network device, and counts the quantity of times of transmitting the request message; and before the quantity of times of transmission reaches the preset quantity of times, if the terminal device receives the response message transmitted by the network device with respect to the request message, the terminal device stops transmitting the request message, and receives the uplink transmission resource added by the network device to the response message, and the terminal device reports a beam measurement result to the network device based on the uplink transmission resource; or after the quantity of times of transmission reaches the preset quantity of times, the terminal device stops transmitting the request message, so that beam recovery can be performed. Further, unnecessary transmission of the request message is avoided, and power consumption of the terminal device is reduced.

FIG. 5 is a schematic flowchart of a method 500 for transmitting data according to another embodiment of this application. The method 500 may be performed by a terminal device. For example, the terminal device may be the terminal device 11, the terminal device 12, or the terminal device 13 in FIG. 1. Correspondingly, a network device communicating with the terminal device may be the base station 21 in FIG. 1. As shown in FIG. 5, the method 500 includes the following steps.

S510. A terminal device transmits a request message to a network device, and counts a quantity of times of transmitting the request message, where the request message is used to request to recover a downlink beam.

Optionally, the terminal device may transmit the request message in one or more uplink beams to the network device, for example, a beam failure recovery request (BRR) message, to request the network device to recover the downlink beam. Optionally, the terminal device may transmit the request message to the network device by using an omnidirectional antenna. Further, the terminal device may introduce a counter to count the quantity of times of transmitting the request message. In other words, in this embodiment of this application, the counter is used to count a quantity of times that the BRR is transmitted. For example, for a group of uplink beams, when the terminal device transmits a BRR, the terminal device may add 1 to the counter. Optionally, the group of uplink beams may be beams obtained in a manner of beam sweeping. Optionally, the request message may be transmitted by using a physical uplink control channel PUCCH or a physical channel used for transmitting a preamble sequence preamble. The request message transmitted on the PUCCH is uplink control signaling. The request message transmitted on the physical channel used for transmitting the preamble sequence is the preamble sequence. If resources of both the physical uplink control channel PUCCH and the physical channel used for transmitting the preamble sequence preamble are configured for the terminal device, the terminal device preferentially selects the physical uplink control channel PUCCH to transmit the request message.

Optionally, for example, if the terminal device has triggered only one BRR, and no other BRR is triggered to be in a pending state, the counter is marked as 0. Herein triggering the BRR and transmitting the request message are different actions of the terminal device. The pending state is: when the terminal device triggers at least one BRR, it may be considered that the at least one BRR is in the pending state. Optionally, if the pending state is canceled, the terminal device does not transmit the request message to the network device.

Optionally, if a first timer is configured for the terminal device, when the terminal device transmits the request message to the network device, the terminal device starts the first timer. In a running period of the first timer (for example, the timer does not expire or is not stopped), the terminal device is not triggered to transmit the request message to the network device even if the BRR is in the pending state. When the first timer expires, if the BRR is still in the pending state, the terminal device is triggered to transmit the request message to the network device.

Optionally, the request message may include identity information of at least one downlink beam, where the at least one downlink beam is valid; or the request message includes identity information of at least one second downlink serving beam, where the at least one second downlink serving beam is a failed beam in a serving beam set of the terminal device. In the solution of this application, the identity information of the beam may be a configured identity of a channel state information reference signal CSI-RS or a time index (time index) of a synchronization signal block (SS-block). The configured identity of the CSI may include a configured identity of a time-frequency resource, and may further include an antenna port identity.

In other words, the terminal device may add the identity information of the at least one valid downlink beam determined by the terminal device to the request message, so that the network device can determine, in the at least one downlink beam, a downlink beam finally used for transmitting data. Optionally, the at least one downlink beam may be beams of a same serving cell, or may be beams of different serving cells. This is not limited.

Alternatively, the request message may include the identity information of the at least one second downlink serving beam, and the at least one second downlink serving beam is the failed beam in the serving beam set. All beams in the serving beam set may be used for data transmission between the terminal device and the network device. Optionally, the at least one second downlink serving beam may be beams of a same serving cell, or may be beams of different serving cells. This is not limited.

For example, if the terminal device may maintain M downlink serving beams (which may be understood as the foregoing serving beam set), if determining that N of the M downlink serving beams fail, where N is a positive integer less than or equal to M, the terminal device transmits a request message to the network device, where the request message may carry the N failed downlink serving beams and a beam having relatively good signal quality (which may be understood as the foregoing at least one downlink beam) that are determined by the terminal device. Optionally, the request message may be transmitted for the N downlink serving beams, or may not be related to the N downlink serving beams.

Optionally, the request message may further carry the serving beam set of the terminal device.

Optionally, the terminal device may count a quantity of times of transmitting the request message in a specific beam. In other words, the terminal device may separately count quantities of times of transmitting the request message in different beams.

Optionally, the terminal device may count a quantity of times of transmitting the request message in a cell. In other words, the terminal device may separately count quantities of times of transmitting the request message in different cells.

Optionally, the terminal device may count a quantity of times of transmitting the request message in a cell. In other words, the terminal device may separately count quantities of times of transmitting the request message in different cells.

Optionally, the terminal device may count a quantity of times of transmitting the request message in any cell. In other words, the terminal device does not separately count quantities of times of transmitting the request message in different cells.

Optionally, before S510, the method 500 may further include: the terminal device determines that at least one first downlink serving beam fails.

That the terminal device determines that at least one first downlink serving beam fails includes: the terminal device determines that reference signal received power or reference signal received quality of at least one second downlink beam is higher than or equal to a first preset threshold; or the terminal device determines that reference signal received power of at least one second downlink beam is higher than or equal to an average value of reference signal received power of the at least one first downlink serving beam; or the terminal device determines that reference signal received quality of at least one second downlink beam is higher than or equal to an average value of reference signal received quality of the at least one first downlink serving beam; or the terminal device determines that reference signal received power of at least one second downlink beam is higher than or equal to a sum of an average value of reference signal received power of the at least one first downlink serving beam and a second preset threshold; or the terminal device determines that reference signal received quality of at least one second downlink beam is higher than or equal to a sum of an average value of reference signal received quality of the at least one first downlink serving beam and a third preset threshold; or the terminal device determines that reference signal received power of at least one second downlink beam is higher than or equal to reference signal received power of a reference beam in the at least one first downlink serving beam, where the reference beam may be a beam with best reference signal received power or a beam with worst reference signal received power in the at least one first downlink serving beam; or the terminal device determines that reference signal received quality of at least one second downlink beam is higher than or equal to reference signal received quality of a reference beam in the at least one first downlink serving beam, where the reference beam may be a beam with best reference signal received quality or a beam with worst reference signal received quality in the at least one first downlink serving beam; or the terminal device determines that reference signal received power of at least one second downlink beam is higher than or equal to a sum of reference signal received power of a reference beam in the at least one first downlink serving beam and a fourth preset threshold, where the reference beam may be a beam with best reference signal received power or a beam with worst reference signal received power in the at least one first downlink serving beam; or the terminal device determines that reference signal received quality of at least one second downlink beam is higher than or equal to a sum of reference signal received quality of a reference beam in the at least one first downlink serving beam and a fifth preset threshold, where the reference beam may be a beam with best reference signal received quality or a beam with worst reference signal received quality in the at least one first downlink serving beam.

The first preset threshold, the second preset threshold, the third preset threshold, the fourth preset threshold, and the fifth preset threshold may be configured by a network or pre-specified by a protocol.

Optionally, a specific quantity of the at least one second downlink beams may be configured by the network device, or specified by a protocol.

In the technical solution of this application, a serving beam is associated with a beam of the SS-block or the CSI-RS. For example, the serving beam is the same as a beam parameter of the beam of the SS-block or the CSI-RS, or the serving beam and the beam of the SS-block or the CSI-RS are quasi-co-located. "Quasi-co-location" may be understood as "geographical locations of antennas used for transmitting beams are approximate or the same". Optionally, the specific quantity of the at least one second downlink beams may be configured by the network.

Optionally, when a second timer expires, the terminal device triggers a beam recovery BRR; and after the BRR is transmitted, the second timer is started or restarted, where duration of the second timer may be configured by the network. Beam recovery triggered by expiry of a tenth timer does not trigger the terminal device to transmit a beam recovery request to the network device. If the terminal device has an uplink transmission resource allocated by the network, and the beam recovery BRR is triggered when the second timer expires, the terminal device generates a beam recovery report based on the uplink transmission resource.

In the technical solution of this application, the beam recovery report may also be understood as a beam status report.

Herein the serving beam may be a beam used for transmitting data between the terminal device and the network device, for example, transmitting dedicated downlink control information on a downlink control channel. The serving beam may include an uplink serving beam and/or a downlink serving beam.

Optionally, the at least one first downlink serving beam may be beams of a same serving cell, or may be beams of different serving cells. This is not limited.

Optionally, the terminal device may measure a reference signal of a downlink serving beam. For example, the reference signal may be a CSI-RS and/or a synchronization signal (the synchronization signal may include at least one of a primary synchronization signal PSS, a secondary synchronization signal SSS, and a demodulation signal DMRS in system information) of a synchronization signal block (SS-block), and then signal quality or reference signal received quality or reference signal received power of the downlink beam is obtained based on a measurement result. The terminal device may determine, based on the signal quality or reference signal received quality or reference signal received power of the downlink serving beam, that at least one downlink serving beam (for example, a first downlink serving beam) fails (failure). For example, after a period of time in which the signal quality or reference signal received quality or reference signal received power of the at least one first downlink serving beam is lower than or equal to a threshold, the terminal device may consider that the at least one first downlink serving beam fails.

For example, the terminal device may determine that a serving beam in a serving cell fails, or may determine that an active serving beam fails.

In this embodiment of this application, after the terminal device determines that the at least one first downlink serving beam fails, the terminal device may trigger at least one BRR or a beam status report, and further transmit the request message to the network device, to request to recover the downlink beam.

Optionally, before S510, the terminal device may receive resource configuration information transmitted by the network device, where the resource configuration information is used to configure a first resource for a serving cell of the terminal device. Optionally, the first resource may include at least one of a time domain resource, a frequency domain resource, a code domain resource, and a space domain resource. Optionally, the first resource may be a resource of a primary cell (PCell) or a secondary cell (SCell).

Optionally, the terminal device may select a resource from the first resource to transmit the request message to the network device.

S520. When the quantity of times of transmission does not reach a preset quantity of times, if the terminal device receives a response message transmitted by the network device with respect to the request message, the terminal device stops transmitting the request message, and receives data that is transmitted by the network device by using a downlink beam indicated by the response message; or when the quantity of times of transmission reaches a preset quantity of times, the terminal device stops transmitting the request message.

Specifically, the terminal device receives, within a preset time after transmitting the request message every time, the response message transmitted by the network device with respect to the request message; and when the quantity of times of transmitting the request message is less than or equal to the preset quantity of times (for example, a maximum quantity of times of transmission), if the terminal device receives the response message transmitted by the network device with respect to the request message, the terminal device may stop transmitting the request message, and receive the data that is transmitted by the network device by using the downlink beam indicated by the response message (that is, perform data communication with the network device); or when the quantity of times of transmitting the request message is greater than or equal to a maximum quantity of times of transmission, the terminal device must stop transmitting the request message even if the terminal device does not receive the response message transmitted by the network device.

Herein the downlink beam indicated by the network device by using the response message is a valid beam, which may be understood as a valid downlink beam determined by the network device, where the downlink beam and the failed beam of the at least one first downlink serving beam determined by the terminal device are different concepts. In other words, the downlink beam indicated by the network device by using the response message is a beam that is determined by the network device and may be used by the terminal device for data transmission, for example, data on a physical downlink control channel.

In this embodiment of this application, the terminal device transmits the request message to the network device, and counts the quantity of times of transmitting the request message; and before the quantity of times of transmission reaches the preset quantity of times, if the terminal device receives the response message transmitted by the network device with respect to the request message, the terminal device stops transmitting the request message, and receives the data that is transmitted by the network device by using the downlink beam indicated by the response message; or after the quantity of times of transmission reaches the preset quantity of times, the terminal device stops transmitting the request message. Therefore, beam recovery can be performed, and further, unnecessary transmission of the request message is avoided, and power consumption of the terminal device is reduced.

Optionally, the preset quantity of times is preconfigured by the network device, or pre-specified by a protocol, so that the quantity of times that the terminal device transmits the request message is limited.

Optionally, when receiving the response message, the terminal device may perform a modification or adjustment operation on a receive beam, or may not perform modification or adjustment, to receive the data transmitted by the network device in the at least one downlink beam, where the at least one downlink beam is indicated by the network device by using the response message. Optionally, the data includes downlink control plane data and/or user plane data.

Herein the modification or adjustment operation includes: (1) if a part of receive beams change, the terminal device partially adjusts the receive beams based on the response message, for example, changes phases or angles of the receive beams; (2) if all receive beams change, the terminal device adjusts all the receive beams based on the response message, for example, changes phases or angles of the receive beams; or (3) if no receive beam changes, the terminal device does not adjust or change a direction of any receive beam. It should be understood that, herein only three cases are used as an example for description and do not constitute a limitation on this embodiment of this application. Actually there may be other appropriate adjustment or modification operations.

Optionally, the response message transmitted by the network device may include identity information of the at least one downlink beam, to notify the terminal device of a downlink beam serving the terminal device. Herein the at least one downlink beam may be understood as a beam used by the terminal device to update the serving beam set of the terminal device.

Optionally, the response message may further include an uplink grant (UL grant) or downlink assignment (DL assignment).

Optionally, the response message transmitted by the network device may also be transmitted by using physical layer signaling or a MAC CE.

Optionally, after stopping transmitting the request message, the terminal device may release the first resource, without transmitting the request message again. Therefore, unnecessary transmission of the request message is avoided, and power of the terminal is saved.

Optionally, the method 500 may further include: after the quantity of times of transmission reaches the preset quantity of times, the terminal device transmits a random access request to the network device; or the terminal device determines a radio link failure; or the terminal device enters an idle mode; or the terminal device initiates a radio resource control RRC connection reestablishment process.

Optionally, the terminal device may count a quantity of times of transmitting the request message in a specific beam. In other words, the terminal device may separately count quantities of times of transmitting the request message in different beams. In this case, after quantities of times associated with all beams reach the preset quantity of times, the terminal device transmits the random access request to the network device; or the terminal device determines a radio link failure; or the terminal device enters the idle mode; or the terminal device initiates the radio resource control RRC connection reestablishment process.

Optionally, the terminal device may count a quantity of times of transmitting the request message in a cell. In other words, the terminal device may separately count quantities of times of transmitting the request message in different cells. In this case, after a quantity of times associated with a specific cell such as the primary cell reaches the preset quantity of times, the terminal device transmits the random access request to the network device; or the terminal device determines a radio link failure; or the terminal device enters the idle mode; or the terminal device initiates the radio resource control RRC connection reestablishment process.

Optionally, the terminal device may count a quantity of times of transmitting the request message in any cell. In other words, the terminal device does not separately count quantities of times of transmitting the request message in different cells.

Specifically, if the request message is transmitted by using the PUCCH, and the quantity of times of transmitting the request message is greater than or equal to the maximum quantity of times of transmission, the terminal device may transmit the random access request on a contention-based or non-contention-based resource to the network device, for example, a first preamble sequence, to request the network device to provide a service for the terminal device; or the terminal device may consider a radio link failure; or the terminal device enters the idle mode, and releases a context of the serving cell of the terminal device; or the terminal device initiates the RRC connection reestablishment process, where the RRC connection reestablishment process is used to reestablish an RRC connection for restarting data transmission, or the terminal device is triggered to transmit a second preamble sequence to the network device, where the second preamble sequence is used to notify the network device that the beam fails, and the second preamble sequence is transmitted by using a non-contention-based dedicated resource. In other words, after the quantity of times of transmission reaches the preset quantity of times, the terminal device may implement any one of the five cases. If the request message is transmitted by using the channel used for transmitting the preamble sequence, and the quantity of times of transmitting the request message is greater than or equal to the maximum quantity of times of transmission, the terminal device may transmit the random access request to the network device, to request the network device to provide a service for the terminal device; or the terminal device may consider a radio link failure; or the terminal device enters the idle mode, and releases a context of the serving cell of the terminal device; or the terminal device initiates the RRC connection reestablishment process, where the RRC connection reestablishment process is used to reestablish an RRC connection for restarting data transmission; or the terminal device is triggered to transmit a third preamble sequence to the network device, where the third preamble sequence is used to notify the network device that the beam fails, and the third preamble sequence is transmitted by using a contention-based common resource. In other words, after the quantity of times of transmission reaches the preset quantity of times, the terminal device may implement any one of the five cases. Alternatively, the terminal may perform other possible actions.

Optionally, if the request message is transmitted by using the PUCCH, and the quantity of times of transmitting the request message is greater than or equal to the maximum quantity of times of transmission, the terminal device may release a PUCCH resource configured by the network device, and may further release an SRS resource configured by the network device, and may further clear a semi-persistent scheduling resource. If the request message is transmitted by using a dedicated or non-contention-based resource of the channel used for transmitting the preamble sequence preamble, and the quantity of times of transmitting the request message is greater than or equal to the maximum quantity of times of transmission, the terminal device may release the dedicated resource of the channel used for transmitting the preamble sequence preamble and configured by the network device, and may further release the dedicated resource of the channel used for transmitting the preamble sequence preamble and configured by the network device, to reduce cell interference.

Optionally, before the terminal device transmits the request message to the network device, the method may further include: the terminal device determines, based on the at least one first downlink serving beam, that at least one recovery request is triggered; or the terminal device determines, based on the at least one first downlink serving beam, that at least one beam status report is triggered, and determines, based on the triggered beam status report, that at least one recovery request is triggered.

In other words, after the terminal device determines that the at least one first downlink serving beam fails, the terminal device may trigger the at least one recovery request, or after the terminal device determines that the at least one first downlink serving beam fails, the terminal device may trigger the at least one beam status report, and trigger the at least one recovery request based on the triggered beam status report. Herein the triggered at least one recovery request may be at least one BRR in the pending state. The terminal device may transmit the request message to the network device according to or based on the triggered at least one BRR. The pending state is: when the terminal device triggers at least one BRR, it may be considered that the at least one BRR is in the pending state. Optionally, if the pending state is canceled, the terminal device does not transmit the request message to the network device.

Optionally, as long as one BRR is in the pending state and is not canceled, the terminal device may continue to transmit the request message to the network device.

Optionally, the method 500 may further include: when the terminal device receives the response message transmitted by the network device with respect to the request message, or when the quantity of times of transmission reaches the preset quantity of times, the terminal device cancels the triggered at least one recovery request.

Specifically, if the terminal device receives the response message transmitted by the network device with respect to the request message, the triggered at least one recovery request may be canceled (that is, all BRRs in the pending state are canceled); or if the quantity of times that the terminal device transmits the request message exceeds or reaches the maximum quantity of times of transmission, the at least one recovery request may be canceled.

Optionally, the method 500 may further include: if the network device configures a discontinuous reception DRX mechanism for the terminal device, the request message is further used to trigger the terminal device to monitor a downlink channel; for example, the method further includes: after the terminal device transmits the request message of the downlink beam to the network device, and before the terminal device cancels the triggered at least one recovery request, the terminal device monitors the downlink channel to receive the response message transmitted by the network device.

Optionally, every time the terminal device transmits at least one request message, a preset time window is associated. When the quantity of times of transmission does not reach or reaches the preset quantity of times, the terminal device is triggered to monitor the downlink channel.

Specifically, if the discontinuous reception (Discontinuous Reception, DRX) mechanism is configured for the terminal device, after the terminal device transmits the request message of the downlink beam to the network device, and before the terminal device cancels the at least one recovery request (that is, the at least one recovery request is still in the pending state), the terminal device may, for example, maintain an active time of the DRX mechanism in each preset time window, and monitor the downlink channel, for example, a physical downlink control channel (PDCCH), to receive the response message transmitted by the network device. For example, the response message is used to indicate an uplink transmission resource, so that the terminal device reports a measurement result. If the terminal device detects the response message transmitted by the network device and/or the quantity of times of transmission reaches the preset quantity of times but the terminal device has not detected the response message transmitted by the network device, the triggered at least one recovery request is canceled. Specifically, for example, the terminal device may monitor a PDCCH of a downlink serving beam set of a serving cell, or may monitor a PDCCH of a downlink serving beam set of at least one serving cell, to obtain the response message.

Optionally, the method 500 may further include: if the terminal device detects, in a preset time window, the response message transmitted by the network device with respect to the request message, and no other trigger condition used to control the terminal device to monitor the downlink channel is satisfied, the terminal device stops monitoring the downlink channel; or if the quantity of times of transmission reaches the preset quantity of times, and the terminal device does not detect, in a preset time window, the response message transmitted by the network device, and no other trigger condition used to control the terminal device to monitor the downlink channel is satisfied, the terminal device stops monitoring the downlink channel; or if the terminal device does not detect, in a preset time window associated with the request message, the response message transmitted by the network device, and no other trigger condition used to control the terminal device to monitor the downlink channel is satisfied, the terminal device stops monitoring the downlink channel.

For example, other trigger conditions used to control the terminal device to monitor the downlink channel include at least one of the following conditions:

(1) In a running period of a third timer, the terminal device periodically starts the third timer. In the running period of the third timer, the terminal device monitors the downlink channel, which is used by the terminal device to determine whether there is downlink control signaling transmitted by the network device, for example, downlink assignment (DL assignment) or an uplink grant (UL grant). The third timer may be an On duration timer, and duration of the first timer may be preconfigured by the network device.

(2) In a running period of a fourth timer, the terminal device starts or restarts the fourth timer when receiving downlink control signaling transmitted by the network device and used to indicate new (uplink or downlink) transmission. In the running period of the fourth timer, the terminal device monitors the downlink channel to receive the downlink control signaling transmitted by the network device. The fourth timer may be a DRX inactivity timer, and duration of the fourth timer may be preconfigured by the network device.

(3) In a running period of a fifth timer, the terminal device starts or restarts the fifth timer when receiving downlink data transmitted by the network device. In the running period of the fifth timer, the terminal device monitors the downlink channel to receive downlink control signaling transmitted by the network device for retransmission of the downlink data. The fifth timer may be a DRX retransmission timer, and duration of the fifth timer may be preconfigured by the network device.

(4) In a running period of a sixth timer, the terminal device transmits uplink data, and starts or restarts the sixth timer. In the running period of the sixth timer, the terminal device monitors the downlink channel to receive an uplink grant transmitted by the network device for retransmission of the uplink data. The sixth timer may be a DRX UL retransmission timer, and duration of the sixth timer may be preconfigured by the network device.

(5) A scheduling request is in a pending (pending) state, where the pending (pending) state is used to trigger transmission of a scheduling request on an uplink control channel to the network device.

(6) At least one uplink grant that may be used for HARQ retransmission exists, and data exists in at least one HARQ buffer.

(7) In a period in which a random access response message with respect to a dedicated preamble sequence is successfully received but no downlink control information used to indicate new (uplink and/or downlink) transmission is received.

(8) When the terminal device has received a first trigger for two-step scheduling, and expects to receive a corresponding second trigger. The first trigger and the second trigger determine a time domain resource position for uplink transmission.

(9) The terminal device transmits at least one first signal in at least one beam to the network device, where the first signal is used to trigger the terminal device to monitor the downlink channel. For example, the first signal is an SRS signal. For descriptions about the first signal, refer to descriptions in the following method 600 or 700.

It should be understood that, the foregoing nine conditions are used only as an example for description herein, and do not constitute a limitation on this embodiment of this application. The other trigger conditions used to control the terminal device to monitor the downlink channel may further include a condition that is introduced in the future and used to control the terminal device to monitor the downlink control channel.

It should also be understood that, numbers "first", "second", . . . , that are introduced in this embodiment of this application are only for distinguishing different objects, for example, distinguishing different timers, and do not constitute a limitation on the protection scope of this embodiment.

The other trigger conditions used to control the terminal device to monitor the downlink channel do not include that the terminal device transmits the request message.

When none of the trigger conditions used to control the terminal device to monitor the downlink channel is satisfied, the terminal device stops monitoring the downlink channel, or does not monitor the downlink channel any longer.

Optionally, for example, the terminal device starts or restarts a seventh timer every time the request message is transmitted, and monitors the downlink control channel in a running period of the first timer. For example, if the terminal device successfully detects the response message with respect to the request message in the running period of the seventh timer, and no other trigger condition used to control the terminal device to monitor the downlink channel is satisfied, the terminal device may stop monitoring the downlink channel, and stop the seventh timer; if the quantity of times that the terminal device transmits the request message reaches the maximum quantity of times of transmission, but the terminal device still does not detect the response message in the running period of the seventh timer, and no other trigger condition used to control the terminal device to monitor the downlink channel is satisfied, the terminal device stops monitoring the downlink channel, and stops the seventh timer; or when the seventh timer expires, if the terminal device has not detected the response message transmitted by the network device, and no other trigger condition used to control the terminal device to monitor the downlink channel is satisfied, the terminal device stops monitoring the downlink channel.

Specifically, in the DRX mechanism, if the terminal device successfully detects the response message with respect to the request message in the preset time window, and no other trigger condition used to control the terminal device to monitor the downlink channel is satisfied, the terminal device may stop monitoring the downlink channel; if the quantity of times that the terminal device transmits the request message reaches the maximum quantity of times of transmission, but the terminal device still does not detect the response message with respect to the request message in the preset time window, and no other trigger condition used to control the terminal device to monitor the downlink channel is satisfied, the terminal device stops monitoring the downlink channel; or if the terminal device does not detect, in the preset time window associated with the request message, the response message transmitted by the network device with respect to the request message, and no other trigger condition used to control the terminal device to monitor the downlink channel is satisfied, the terminal device stops monitoring the downlink channel. The other trigger conditions used to control the terminal device to monitor the downlink channel do not include the following condition: The terminal device transmits the request message.

Specifically, the downlink channel may be a physical downlink control channel of at least one cell.

In the foregoing description, the terminal device may notify the network device, by using the request message, that the terminal device determines that at least one valid downlink beam exists. For example, the terminal device indicates, to the network device by using zero or one character, whether at least one failed downlink beam exists. For example, 1 indicates existence, and 0 indicates nonexistence. In the following description, the at least one downlink beam may be notified to the network device in other manners.

In this embodiment of this application, the network device may select or determine one or more valid downlink beams from the at least one downlink beam (that is, the at least one downlink beam of the identity information carried in the request message or the MAC CE). Alternatively, the network device may select or determine one or more valid downlink beams from the serving beam set of the terminal device based on the at least one second downlink serving beam (that is, the at least one failed serving downlink beam of the identity information carried in the request message or the MAC CE).

Therefore, in this embodiment of this application, the terminal device transmits the request message to the network device, and counts the quantity of times of transmitting the request message; and before the quantity of times of transmission reaches the preset quantity of times, if the terminal device receives the response message transmitted by the network device with respect to the request message, the terminal device stops transmitting the request message, and receives the data that is transmitted by the network device by using the downlink beam indicated by the response message; or after the quantity of times of transmission reaches the preset quantity of times, the terminal device stops transmitting the request message. Therefore, beam recovery can be performed, and further, unnecessary transmission of the request message is avoided, and power consumption of the terminal device is reduced.

In the following description, the at least one downlink beam may be notified to the network device in other manners. In the method 200 of this embodiment of this application, the terminal device may receive the first control information transmitted by the network device, where the first control information is used to indicate whether the at least one uplink beam is valid. Further, this application further provides an embodiment in which a terminal device may transmit a first signal (for example, a synchronization signal) in advance to a network device, so that the network device can determine, based on the first signal, some beams having relatively good signal quality or power. The following describes this embodiment in detail with reference to FIG. 6. It should be understood that, this embodiment may be used in combination with the foregoing embodiment, or may be used separately. This is not limited herein.

FIG. 6 is a schematic flowchart of a method 600 for transmitting data according to another embodiment of this application. The method 600 may be performed by a terminal device. For example, the terminal device may be the terminal device 11, the terminal device 12, or the terminal device 13 in FIG. 1. Correspondingly, a network device communicating with the terminal device may be the base station 21 in FIG. 1. As shown in FIG. 6, the method 600 includes the following steps.

S610. A terminal device transmits a first signal in at least one uplink beam to a network device, where the first signal is used by the network device to determine, from the at least one uplink beam in which the first signal is transmitted, that at least one first beam is valid.

Optionally, the at least one uplink beam may be accumulated at a same time or at different times, and this is not limited. Alternatively, all uplink beams of the terminal device are covered by beam sweeping. To be specific, coverage of the terminal device is enhanced in a manner of beam sweeping.

Herein the first signal is used to assist the network device in determining the at least one first beam. The at least one first beam is some beams whose received signal quality or strength is higher than a threshold.

Correspondingly, with reference to the first signal transmitted by the terminal device, the network device may determine, from the at least one uplink beam in which the terminal device transmits the first signal, at least one first beam having relatively good signal quality, and notify the terminal device of the at least one first beam having relatively good signal quality.

Optionally, the first signal may include an SRS signal. The SRS signal may be further used for channel estimation or beam management.

Optionally, similarly, the terminal device may receive configuration information transmitted by the network device, where the configuration information is used to configure a first resource for a serving cell of the terminal device. Optionally, the first resource may include at least one of a time domain resource, a frequency domain resource, a code domain resource, and a space domain resource.

Optionally, the terminal device may select a resource from the first resource to transmit the first signal to the network device. Optionally, the first resource may be a resource of a primary cell (PCell) or a secondary cell (SCell).

Optionally, the first resource may be transmitted by using a physical uplink shared channel (PUSCH), a physical uplink control channel (PUCCH), or another channel.

Optionally, the first resource may be a periodic resource.

S620. The terminal device receives a first message transmitted by the network device, where the first message includes the at least one first beam.

In other words, the network device may transmit the first message to the terminal device, where the first message includes the at least one first beam having relatively good signal quality and determined by the network device. Optionally, the first message may include identity information (a beam ID or index) of the at least one first beam.

S630. The terminal device transmits data by using the at least one first beam.

In this embodiment of this application, the terminal device transmits the first signal in the at least one uplink beam to the network device, so that the network device determines, from the at least one uplink beam in which the first signal is transmitted, that the at least one first beam having relatively good signal quality is valid; the terminal device receives the first message transmitted by the network device, where the first message includes the at least one first beam; and the terminal device finally transmits the data by using the at least one first beam, so that the data can be transmitted in the beam having relatively good signal quality.

Optionally, the terminal device may use the at least one first beam to transmit at least one of the following data: an SR, CSI, a HARQ feedback, an SRS, SPS, grant free, user plane data, control plane data, and the like.

Optionally, in an embodiment, if the network device configures a discontinuous reception DRX mechanism for the terminal device, the first signal is further used to trigger the terminal device to monitor a downlink channel.

Optionally, in an embodiment, that the terminal device receives a first message transmitted by the network device includes: when the terminal device transmits the first signal in the at least one uplink beam to the network device, the terminal device starts or restarts a first timer; in a running period of the first timer, the terminal device monitors the downlink channel to receive the first message transmitted by the network device by using the downlink channel; and after detecting the first message, the terminal device stops monitoring the downlink channel.

Specifically, when the terminal device transmits the first signal in the at least one uplink beam to the network device, the terminal device may start the first timer, and in the running period of the first timer, maintain an active time of DRX, and continuously monitor the downlink channel to obtain the first message transmitted by the network device by using the downlink channel. After detecting the first message, the terminal device may stop monitoring the downlink channel, to avoid unnecessary monitoring and save power of the terminal device. Optionally, duration of the first timer may be preconfigured by the network device or pre-specified by a protocol. Optionally, the downlink channel may be specifically a PDCCH.

Specifically, for example, the terminal device may monitor a PDCCH of a downlink serving beam set of a serving cell, or may monitor a PDCCH of a downlink serving beam set of at least one serving cell, to obtain the first message.

Optionally, before the first timer is started, the method 400 may further include: after the terminal device transmits the first signal in the at least one uplink beam to the network device, the terminal device starts a second timer; and in a running period of the second timer, the terminal device does not monitor the downlink channel.

Specifically, after transmitting the first signal in the at least one uplink beam to the network device and before starting the first timer, the terminal device may further start the second timer. Because the network device may require a processing delay, the terminal may not monitor the downlink channel in the running period of the second timer, to save power of the terminal device. After the second timer expires, the terminal device may start the first timer for monitoring, to obtain the first message transmitted by the network device.

Therefore, in the method for transmitting data in this embodiment of this application, the terminal device transmits the first signal in the at least one uplink beam to the network device, so that the network device determines, from the at least one uplink beam in which the first signal is transmitted, that the at least one first beam having relatively good signal quality is valid; the terminal device receives the first message transmitted by the network device, where the first message includes the at least one first beam; and the terminal device finally transmits the data by using the at least one first beam, so that the data can be transmitted in the beam having relatively good signal quality. Further, because the timers are introduced to the terminal device, unnecessary monitoring is avoided, and power of the terminal device is saved.

It should be understood that, numbers "first", "second", . . . , that are introduced in this embodiment of this application are only for distinguishing different objects, for example, distinguishing different "beams" or distinguishing different "information", and do not constitute a limitation on this embodiment of this application.

The foregoing describes a method for transmitting data according to this embodiment of this application. The following describes a terminal device according to an embodiment of this application.

FIG. 7 is a schematic flowchart of a method 700 for transmitting data according to another embodiment of this application. The method 700 may be performed by a terminal device. For example, the terminal device may be the terminal device 11, the terminal device 12, or the terminal device 13 in FIG. 1. Correspondingly, a network device communicating with the terminal device may be the base station 21 in FIG. 1. As shown in FIG. 7, the method 700 includes the following steps.

S710. A terminal device transmits a first signal in at least one uplink beam to a network device, where the first signal is used by the network device to determine, from the at least one uplink beam in which the first signal is transmitted, that at least one first beam is valid.

Optionally, the at least one uplink beam may be accumulated at a same time or at different times, and this is not limited. Alternatively, all uplink beams of the terminal device are covered by beam sweeping (beam sweeping). To be specific, coverage of the terminal device is enhanced in a manner of beam sweeping.

Herein the first signal is used to assist the network device in determining the at least one first beam. The at least one first beam is some beams whose received signal quality or power is higher than a threshold.

Correspondingly, with reference to the first signal transmitted by the terminal device, the network device may determine, from the at least one uplink beam in which the terminal device transmits the first signal, at least one first beam having relatively good received signal power or quality, and notify the terminal device of the at least one first beam having relatively good signal power or quality.

Optionally, the first signal may include an SRS signal. The SRS signal may be further used for channel estimation or beam management.

Optionally, similarly, the terminal device may receive configuration information transmitted by the network device, where the configuration information is used to configure a first resource for a serving cell of the terminal device. Optionally, the first resource may include at least one of a time domain resource, a frequency domain resource, a code domain resource, and a space domain resource.

Optionally, the terminal device may select a resource from the first resource to transmit the first signal to the network device. Optionally, the first resource may be a resource of a primary cell (PCell) or a secondary cell (SCell).

Optionally, the first resource may be transmitted by using a physical uplink shared channel (Physical Uplink Shared Channel, PUSCH), a physical uplink control channel (Physical Uplink Control Channel, PUCCH), or another channel.

Optionally, the first resource may be a periodic or semi-persistent resource.

S720. The terminal device receives a first message transmitted by the network device, where the first message includes an identity of the at least one first beam.

Specifically, the identity of the first beam is a configured identity ID or an index (index) associated with the first signal.

In other words, the network device may transmit the first message to the terminal device, where the first message includes an identity of the at least one first beam having relatively good signal received quality or signal received power and determined by the network device. Optionally, the first message may include the identity (a beam ID or index) of the at least one first beam. For example, the identity of the first beam may be an identity of a resource used to transmit an SRS or an identity (an ID or an index) configured for an SRS and used to transmit the SRS. For example, the terminal device transmits an SRS on a resource 1 to the network device by using a beam 1, and transmits an SRS on a resource 2 to the network device by using a beam 2. Correspondingly, the network device measures the SRSs that are transmitted by the terminal device on the resource 1 and the resource 2; and if determining that received power or signal quality of the SRS on the resource 1 is relatively good, the network device transmits a beam (the resource 1) of the first beam to the terminal device. Then the terminal device receives an identity (the resource 1) of the first beam transmitted by the network device, and transmits data by using the beam (the beam 1) associated with the resource 1. The resource of the SRS may include at least one of the following: a time domain resource, a frequency domain resource, and a code domain resource (an SRS sequence).

S730. The terminal device transmits data by using the at least one first beam. Specifically, the terminal device transmits the data to the network device by using a beam parameter or an antenna parameter corresponding to the at least one first beam. For example, the terminal device transmits at least one of a scheduling request, a beam recovery request, and contention-based automatic uplink transmission by using the beam parameter or the antenna parameter corresponding to the at least one first beam.

In this embodiment of this application, the terminal device transmits the first signal in the at least one uplink beam to the network device, so that the network device determines, from the at least one uplink beam in which the first signal is transmitted, that the at least one first beam having relatively good signal received quality or signal received power is valid; the terminal device receives the first message transmitted by the network device, where the first message includes the identity of the at least one first beam; and the terminal device finally transmits the data by using the at least one first beam, so that the data can be transmitted in the beam having relatively good signal quality.

Optionally, every time the terminal device transmits at least one first signal in the at least one uplink beam to the network device, a first preset time window is associated. Optionally, if the terminal device transmits the first signal on N consecutive periodic or semi-persistent resources to the network device by using the at least one uplink beam, and does not receive, in K first preset time windows, the first message transmitted by the network device, the terminal device determines a radio link failure, and initiates an RRC reestablishment process. K is greater than or equal to 1, N is greater than or equal to 1, and a specific value of K or N may be configured by a base station or pre-specified by a protocol. For example, if a period of a time-frequency resource of the SRS is 10 milliseconds, and duration of each period is three symbols, the time-frequency resource may be used by the terminal device to transmit the SRS signal in a maximum of three beams, for example, transmit the first signal on consecutive symbols 0/1/2 to the network device by using beams 1/2/3 respectively. In this case, 1 or 3 is added to a counter.

Optionally, if the terminal device transmits the first signal on N consecutive periodic or semi-persistent resources to the network device by using the at least one uplink beam, the terminal device starts a first timer; and when the first timer expires, if the terminal device has not received the first message transmitted by the network device, the terminal device determines a radio link failure, and initiates an RRC reestablishment process, where duration of the first timer is configured by a base station or pre-specified by a protocol.

Optionally, the terminal device may use the at least one first beam to transmit at least one of the following data: an SR, CSI, a HARQ feedback, an SRS, SPS, grant free, user plane data, control plane data, and the like.

Optionally, in an embodiment, if the network device configures a discontinuous reception DRX mechanism for the terminal device, the first signal is further used to trigger the terminal device to monitor a downlink channel.

For example, the method further includes: when the terminal device expects to receive the first message transmitted by the network device, the terminal device monitors the downlink channel to receive the first message transmitted by the network device, where a time-frequency resource in which the first message is located is determined by downlink control signaling transmitted on the downlink channel.

It should be noted that, when the terminal device does not receive the first message in a current time unit, the terminal device expects to receive the first message in a next time unit of a second preset time window. Optionally, every time the terminal device transmits at least one first signal in the at least one uplink beam to the network device, a second preset time window is associated.

Specifically, after transmitting the first signal, the terminal device monitors the downlink channel to receive the first message transmitted by the network device. If the terminal device receives, in the second preset time window, the first message transmitted by the network device, and no other trigger condition used to control the terminal device to monitor the downlink channel is satisfied, the terminal device stops monitoring the downlink channel; or if the terminal device has not received, in the second preset time window after transmitting the first signal, the first message transmitted by the network device, and no other trigger condition used to control the terminal device to monitor the downlink channel is satisfied, the terminal device stops monitoring the downlink channel; or if the terminal device does not detect, in the second preset time window associated with the first signal, the first message transmitted by the network device, and no other trigger condition used to control the terminal device to monitor the downlink channel is satisfied, the terminal device stops monitoring the downlink channel; or if a quantity of times that the first signal is transmitted reaches a preset maximum quantity of times of transmission, and no other trigger condition used to control the terminal device to monitor the downlink channel is satisfied, the terminal device stops monitoring the downlink channel.

Optionally, in this embodiment of this application, each preset time window may be specifically a timer in implementation. This is not limited.

Other trigger conditions used to control the terminal device to monitor the downlink channel do not include the following condition: The terminal device transmits the first signal in the at least one uplink beam to the network device.

For example, the other trigger conditions used to control the terminal device to monitor the downlink channel include at least one of the following conditions:

(1) In a running period of a third timer, the terminal device periodically starts the third timer. In the running period of the third timer, the terminal device monitors the downlink channel, which is used by the terminal device to determine whether there is downlink control signaling transmitted by the network device, for example, downlink assignment (DL assignment) or an uplink grant (UL grant). The third timer may be an On duration timer, and duration of the first timer may be preconfigured by the network device.

(2) In a running period of a fourth timer, the terminal device starts or restarts the fourth timer when receiving downlink control signaling transmitted by the network device and used to indicate new (uplink or downlink) transmission. In the running period of the fourth timer, the terminal device monitors the downlink channel to receive the downlink control signaling transmitted by the network device. The fourth timer may be a DRX inactivity timer, and duration of the fourth timer may be preconfigured by the network device.

(3) In a running period of a fifth timer, the terminal device starts or restarts the fifth timer when receiving downlink data transmitted by the network device. In the running period of the fifth timer, the terminal device monitors the downlink channel to receive downlink control signaling transmitted by the network device for retransmission of the downlink data. The fifth timer may be a DRX retransmission timer, and duration of the fifth timer may be preconfigured by the network device.

(4) In a running period of a sixth timer, the terminal device transmits uplink data, and starts or restarts the sixth timer. In the running period of the sixth timer, the terminal device monitors the downlink channel to receive an uplink grant transmitted by the network device for retransmission of the uplink data. The sixth timer may be a DRX UL retransmission timer, and duration of the sixth timer may be preconfigured by the network device.

(5) A scheduling request is in a pending (pending) state, where the pending (pending) state is used to trigger transmission of a scheduling request on an uplink control channel to the network device.

(6) At least one uplink grant that may be used for HARQ retransmission exists, and data exists in at least one HARQ buffer.

(7) In a period in which a random access response message with respect to a dedicated preamble sequence is successfully received but no downlink control information used to indicate new (uplink and/or downlink) transmission is received.

(8) When the terminal device has received a first trigger for two-step scheduling, and expects to receive a corresponding second trigger. The first trigger and the second trigger determine a time domain resource position for uplink transmission.

(9) The terminal device transmits a request message to the network device, where the request message is used to trigger the terminal device to monitor the downlink channel. For descriptions about the request message, refer to the descriptions in the foregoing method 400 or 500.

It should be understood that, the foregoing nine conditions are used only as an example for description herein, and do not constitute a limitation on this embodiment of this application. The other trigger conditions used to control the terminal device to monitor the downlink channel may further include a condition that is introduced in the future and used to control the terminal device to monitor the downlink control channel.

When none of the trigger conditions used to control the terminal device to monitor the downlink channel is satisfied, the terminal device stops monitoring the downlink channel, or does not monitor the downlink channel any longer.

Specifically, the downlink channel may be a physical downlink control channel of at least one cell.

Optionally, when the terminal device transmits the first signal in the at least one uplink beam to the network device, the terminal device starts or restarts the first timer; in a running period of the first timer, the terminal device monitors the downlink channel to receive the first message transmitted by the network device by using the downlink channel; and after detecting the first message, and no other trigger condition used to control the terminal device to monitor the downlink channel is satisfied, the terminal device stops monitoring the downlink channel, and stops the first timer.

Specifically, when the terminal device transmits the first signal in the at least one uplink beam to the network device, the terminal device may start the first timer, and in the running period of the first timer, maintain an active time of DRX, and continuously monitor the downlink channel to obtain the first message transmitted by the network device by using the downlink channel. After the terminal device detects the first message, and no other trigger condition used to control the terminal device to monitor the downlink channel is satisfied, the terminal device may stop monitoring the downlink channel, and stop the first timer, to avoid unnecessary monitoring and save power of the terminal device. Optionally, the duration of the first timer may be preconfigured by the network device or pre-specified by a protocol.

Specifically, for example, the terminal device may monitor a PDCCH of a downlink serving beam set of a serving cell, or may monitor a PDCCH of a downlink serving beam set of at least one serving cell, to obtain the first message.

Optionally, the downlink channel may be specifically a PDCCH.

Optionally, before the first timer is started, the method 700 may further include: when the terminal device transmits the first signal in the at least one uplink beam to the network device, the terminal device starts a second timer; and in a running period of the second timer, when no other condition used to control the terminal device to monitor the downlink channel exists, the terminal device does not monitor the downlink channel.

Specifically, after transmitting the first signal in the at least one uplink beam to the network device and before starting the first timer, the terminal device may further start the second timer. Because the network device may require a processing delay, in the running period of the second timer, if no other condition used to control the terminal device to monitor the downlink channel exists, the terminal may not monitor the downlink channel, to save power of the terminal device. After the second timer expires, the terminal device may start the first timer for monitoring, to obtain the first message transmitted by the network device.

Therefore, in the method for transmitting data in this embodiment of this application, the terminal device transmits the first signal in the at least one uplink beam to the network device, so that the network device determines, from the at least one uplink beam in which the first signal is transmitted, that the at least one first beam having relatively good signal quality is valid; the terminal device receives the first message transmitted by the network device, where the first message includes the at least one first beam; and the terminal device finally transmits the data by using the at least one first beam, so that the data can be transmitted in the beam having relatively good signal quality. Further, because the timers are introduced to the terminal device, unnecessary monitoring is avoided, and power of the terminal device is saved.

FIG. 8 is a schematic flowchart of a method 800 for transmitting data according to another embodiment of this application. The method 800 may be performed by a terminal device. For example, the terminal device may be the terminal device 11, the terminal device 12, or the terminal device 13 in FIG. 1. Correspondingly, a network device communicating with the terminal device may be the base station 21 in FIG. 1. As shown in FIG. 8, the method 800 includes the following steps.

S810. A terminal device receives a first signal transmitted by a network device by using at least one downlink serving beam.

Specifically, a physical PHY layer of the terminal device receives the first signal transmitted by the network device by using the at least one downlink beam. Optionally, the first signal may be at least one of a CSI-RS, a PSS, an SSS, and a DMRS.

Optionally, a quantity of the at least one downlink beam is configured by the network device, and the at least one downlink beam includes at least one of the following: at least one serving beam (serving beam), and at least one non-serving beam (for example, a candidate beam (candidate beam)).

S820. The terminal device determines cell out-of-synchronization (Out of sync, OOS) or cell synchronization (In sync, IS), or beam out-of-synchronization or beam synchronization according to or based on first channel quality that is determined based on the first signal in the at least one downlink beam. Optionally, the first channel quality is PDCCH quality.

Specifically, the physical PHY layer of the terminal device may determine cell synchronization or cell out-of-synchronization by detecting the PDCCH quality determined based on the first signal in the at least one downlink beam.

In this embodiment of this application, the terminal device may determine, based on the PDCCH quality that is determined based on the first signal in the downlink beam, whether out-of-synchronization occurs. Optionally, the PDCCH quality is a block error rate of hypothetical PDCCH transmission (block error rate of hypothetical PDCCH transmission), and is a cell-level result.

Optionally, S820 includes: if the PHY layer of the terminal device determines that PDCCH quality determined based on a first signal in all or a part of the at least one downlink beam is lower than a preset PDCCH quality threshold, the terminal device determines cell out-of-synchronization or beam out-of-synchronization.

Specifically, the quantity of the at least one downlink serving beam is N, where N is an integer, and N is configured by the network device. In a measurement window of each preset measurement period, if PDCCH quality determined based on a first signal in X of the N beams is lower than a preset first threshold (Qout), the terminal device determines one out-of-synchronization; or if PDCCH quality determined based on a first signal in X of the N beams is higher than or equal to a preset second threshold (Qin), where N is greater than or equal to X, X is an integer, and X is configured by the network device.

Alternatively, in a measurement window of each preset measurement period, if PDCCH quality determined based on a first signal in N−X of the N beams is lower than a preset first threshold (Qout), the terminal device determines one out-of-synchronization; or if PDCCH quality determined based on a first signal in N−X of the N beams is higher than or equal to a preset second threshold (Qin), where N is greater than or equal to X, X is an integer, X is configured by the network device, and N−X indicates N minus X.

Optionally, the first threshold and the second threshold may be determined by the network device and transmitted to the terminal device.

Optionally, the method further includes: if the terminal device determines cell out-of-synchronization or beam out-of-synchronization, the terminal device starts a first timer.

For example, if an RRC layer of the terminal device consecutively receives $N_1$ consecutive cell out-of-synchronization OOS indications (that is, $N_1$ cell out-of-synchronization indications are determined by using $N_2$ downlink beams), the terminal device may start a timer, for example, the first timer.

Optionally, duration of the first timer may be configured by the network device, or may be prescribed by a protocol. This is not limited herein.

Optionally, if the terminal device receives $N_3$ consecutive cell synchronization IS indications in a running period of the first timer, the terminal device stops the first timer.

In other words, if the terminal device receives the $N_3$ consecutive cell synchronization IS indications in the running period of the first timer, the terminal device may stop the first timer.

Optionally, if the terminal device has not received the $N_3$ consecutive cell synchronization IS indications when the first timer expires, the terminal device determines link connection failure, and triggers a reestablishment process.

In other words, if the terminal device has not received the $N_3$ consecutive cell synchronization IS indications when the first timer expires, the terminal device declares a radio link failure, and triggers a reestablishment process.

$N_1$, $N_2$, and $N_3$ may be configured by the network. It should be noted that, the consecutive cell out-of-synchronization indications or the consecutive cell synchronization indications are not affected by a time of measuring the first signal by the terminal device.

Therefore, the terminal device receives the downlink beam transmitted by the network device, and may determine, based on PDCCH quality of the downlink beam, whether cell out-of-synchronization occurs, and therefore determine whether a reestablishment process needs to be initiated.

FIG. 9 is a schematic flowchart of a method 900 for transmitting data according to another embodiment of this application. The method 900 may be performed by a terminal device. For example, the terminal device may be the terminal device 11, the terminal device 12, or the terminal device 13 in FIG. 1. Correspondingly, a network device communicating with the terminal device may be the base station 21 in FIG. 1. As shown in FIG. 9, the method 900 includes the following steps.

S910. A terminal device receives a first indication transmitted by a network device, where the first indication is used to allocate an uplink transmission resource.

Optionally, the uplink transmission resource includes a transport block size.

Optionally, the uplink transmission resource may further include a physical resource block, a HARQ process identity, a redundancy version, a new transmission indication, or the like.

S920. When determining that a first protocol layer protocol data unit generated based on the uplink transmission resource includes padding bits (padding bits), the terminal device adds first protocol layer control signaling for a beam status report to the padding bits (padding bits).

It should be noted that, the first protocol layer control signaling carried in the padding bits may also be understood as padding first protocol layer control signaling. For example, the first protocol layer control signaling for the beam status report, carried in the padding bits, may also be understood as first protocol layer control signaling for the padding beam status report.

For example, the first protocol layer may be a medium access control MAC layer, and the first protocol layer control signaling may be a medium access control MAC control element CE.

It should be noted that, when the terminal device determines that the first protocol layer protocol data unit generated based on the uplink transmission resource includes the padding bits, the terminal device adds the first protocol layer control signaling for the padding beam status report to the padding bits. It may also be understood that, after the uplink transmission resource is allocated, if a resource used for transmitting padding data exists, the terminal device adds a beam status report MAC CE as padding data to the padding bits. It should be noted that, the MAC CE includes a padding MAC CE and a non padding MAC CE. The non padding MAC CE includes at least one of the following: a power headroom report (PHR) MAC CE, a C-RNTI MAC CE, a PHR MAC CE, and an SPS acknowledgement MAC CE.

The padding bits may be understood as a remaining resource, or a resource used for transmitting a padding beam status report MAC CE. The remaining resource is a remaining resource in the transport block size included in the uplink transmission resource after data and a first MAC CE that are allocated to a logical channel are excluded. The first MAC CE is at least one of the following: (1) a MAC CE of a non padding beam status report MAC CE; (2) a MAC CE of a non padding beam status report MAC CE; and (3) a MAC CE of a non padding power headroom report PHR MAC CE. A BSR is used to notify a buffer status of the terminal device, and a PHR is used to notify power headroom of the terminal device. The first MAC may also be understood as a non padding MAC CE.

For example, for a padding beam status report MAC CE: if a remaining resource still exists, for example, padding bits used for the beam status report MAC CE are greater than or equal to the beam status report MAC CE plus its sub-header, the terminal device may trigger generation of a padding beam status report MAC CE (for example, the padding beam status report MAC CE), and add the padding beam status report MAC CE to the padding bits. The padding bits are used for transmitting padding data or a padding MAC CE.

Optionally, the terminal device determines, based on a size of the padding bits, whether the padding beam status report can be transmitted. Optionally, if the padding beam status report can be transmitted, a size of the beam status report MAC CE needs to be further determined, and beam statuses of U beams whose priorities are the highest in R beams are reported. The beams whose priorities are the highest may be understood as U beams whose first signal received power or first signal received quality are the best in the beams, or U beams whose path losses are the lowest in the beams, or U beams whose PDCCH quality is the best in the beams, where R is greater than or equal to U, U and R are both positive integers, and U and R may be configured by a network or pre-specified by a protocol.

A first signal having first signal received power or first signal received quality may be understood as at least one of the following: a PSS, an SSS, a CSI-RS, and a DMRS.

Optionally, if the padding bits cannot used to transmit the beam status report MAC CE, the terminal device may report a truncated beam status report, that is, report beam statuses of only some beams, for example, beam statuses of some beams whose reference signal received power or quality is the best in the beams; or if the padding bits can be used to transmit a long beam status report MAC CE, the terminal device transmits the long beam status report MAC CE.

Optionally, for a padding beam status report, the terminal device does not cancel a triggered ordinary beam status report or periodic beam status report. The ordinary beam status report is triggered by a failed beam, and the periodic beam status report is triggered by a beam status report periodic timer.

It should be understood that, in this embodiment of this application, the beam status report may also be understood as beam status information.

Optionally, if a MAC protocol data unit PDU includes only a padding beam status report or a periodic beam status report, the MAC does not generate the MAC PDU.

S930. The terminal device transmits the first protocol layer PDU to the network device based on the first indication, where the first protocol layer PDU includes the padding bits, and the padding bits carry the first protocol layer control signaling for the beam status report.

An example in which the first protocol layer is the MAC layer is used for description: The terminal device receives a first indication transmitted by the network device, where the first indication is used to allocate an uplink transmission resource. Then when the terminal device determines that a MAC protocol data unit generated based on the uplink transmission resource includes padding bits (padding bits), the terminal device generates a padding beam status report medium access control MAC control element CE for a beam recovery request, and transmits the padding beam status report MAC CE to the network device based on the first indication. Therefore, transmission resources can be utilized effectively.

In this embodiment of this application, the terminal device may transmit the padding beam status report MAC CE to the network device by using a remaining resource, without actively requesting a resource. Therefore, transmission resources can be utilized effectively, and resource waste is avoided.

Figure 10:
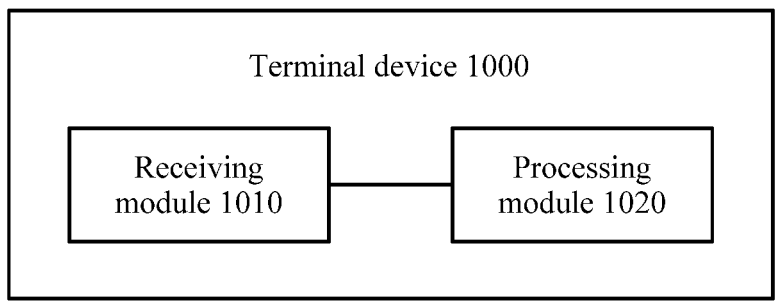
FIG. 10 is a schematic block diagram of a terminal device according to an embodiment of this application.

FIG. 10 is a schematic block diagram of a terminal device 1000 according to an embodiment of this application. As shown in FIG. 10, the terminal device 1000 includes: a receiving module 1010, configured to receive first control information transmitted by a network device, where the first control information includes identity information of at least one uplink beam, and the first control information is used to indicate whether the at least one uplink beam is valid; and a processing module 1020, configured to: determine that the at least one uplink beam is valid in preset duration, where the first control information indicates that the at least one uplink beam is valid; or skip transmitting data in the at least one uplink beam, where the first control information indicates that the at least one uplink beam is invalid.

Optionally, in an embodiment, the processing module 1020 is further configured to: when the first control information is received, start or restart a first timer, where the preset duration is duration of a running period of the first timer.

Optionally, in an embodiment, the preset duration is preconfigured by the network device, or the preset duration is indicated by the network device by using the first control information.

Optionally, in an embodiment, the processing module 1020 is specifically configured to: in the running period of the first timer, if the first control information indicates that the at least one uplink beam is invalid, determine that the at least one uplink beam is invalid, and stop the first timer.

Optionally, in an embodiment, the processing module 1020 is specifically configured to: if the first timer expires or stops, and the terminal device has not received the first control information, determine that the at least one uplink beam is invalid.

Optionally, in an embodiment, a physical PHY layer of the terminal device receives identity information of a downlink beam transmitted by the network device; the PHY layer of the terminal device transmits the identity information of the downlink beam to a medium access control MAC layer of the terminal device; the MAC layer of the terminal device selects, based on the identity information of the downlink beam, a first random access channel resource from a resource pool corresponding to the identity information of the downlink beam; the MAC layer of the terminal device transmits the first random access channel resource to the PHY layer of the terminal device; and the PHY layer of the terminal device transmits a random access preamble sequence in the at least one uplink beam to the network device by using the first random access channel resource.

The terminal device 1000 according to this embodiment of this application may perform the method 200 for transmitting data according to the embodiment of this application, and the foregoing and other operations and/or functions of each module in the terminal device 1000 are respectively intended to implement the corresponding procedure of the foregoing method. Details are not described again herein for brevity.

Therefore, the terminal device 1000 in this embodiment of this application receives the first control information transmitted by the network device, where the first control information includes the identity information of the at least one uplink beam, and the first control information is used to indicate whether the at least one uplink beam is valid; and if the first control information indicates that the at least one uplink beam is valid, the terminal device determines that the at least one uplink beam is valid in the preset duration; or if the first control information indicates that the at least one uplink beam is invalid, the terminal device does not transmit the data in the at least one uplink beam. Therefore, unnecessary uplink transmission can be avoided, and power saving and cell interference reduction are achieved.

Further, the MAC layer of the terminal device may interact with the PHY layer of the terminal device to obtain a beam ID or index, and therefore perform a random access process, so that a valid beam is obtained for data transmission.

Figure 11:
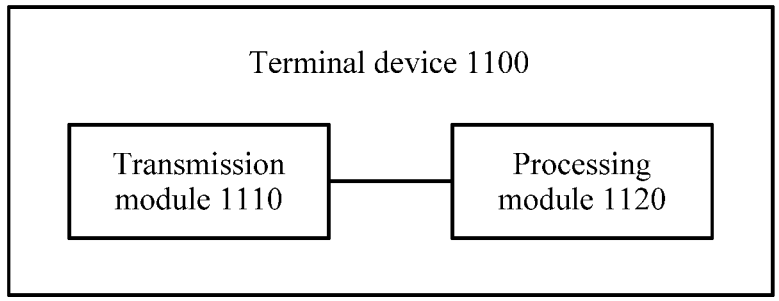
FIG. 11 is a schematic block diagram of a terminal device according to another embodiment of this application.

FIG. 11 is a schematic block diagram of a terminal device 1100 according to an embodiment of this application. As shown in FIG. 11, the terminal device 1100 includes: a transmission module 1110, configured to transmit a request message to a network device, and count a quantity of times of transmitting the request message, where the request message is used to request to recover a downlink beam; and a processing module 1120, configured to: when the quantity of times of transmission does not reach a preset quantity of times, if the terminal device receives a response message transmitted by the network device with respect to the request message, stop transmitting the request message, and receive data that is transmitted by the network device by using a downlink beam indicated by the response message or receive an uplink transmission resource that is indicated by the network device by using the response message, where the uplink transmission resource is used to transmit a measurement report or a beam status report; or when the quantity of times of transmission reaches a preset quantity of times, stop, by the terminal device, transmitting the request message.

Optionally, in an embodiment, the terminal device further includes: a determining module, configured to determine that at least one first downlink serving beam fails, where the determining module is specifically configured to: determine, by the terminal device, that reference signal received power or reference signal received quality of at least one second downlink beam is higher than or equal to a first preset threshold; or determine, by the terminal device, that reference signal received power of at least one second downlink beam is higher than or equal to an average value of reference signal received power of the at least one first downlink serving beam; or determine, by the terminal device, that the reference signal received quality of the at least one second downlink beam is higher than or equal to an average value of reference signal received power of the at least one first downlink serving beam; or determine, by the terminal device, that reference signal received power of at least one second downlink beam is higher than or equal to a sum of an average value of reference signal received power of the at least one first downlink serving beam and a second preset threshold; or determine, by the terminal device, that reference signal received quality of at least one second downlink beam is higher than or equal to a sum of an average value of reference signal received quality of the at least one first downlink serving beam and a third preset threshold; or determine, by the terminal device, that reference signal received power of at least one second downlink beam is higher than or equal to reference signal received power of a reference beam in the at least one first downlink serving beam, where the reference beam may be a beam with best reference signal received power or a beam with worst reference signal received power in the at least one first downlink serving beam; or determine, by the terminal device, that reference signal received quality of at least one second downlink beam is higher than or equal to reference signal received quality of a reference beam in the at least one first downlink serving beam, where the reference beam may be a beam with best reference signal received quality or a beam with worst reference signal received quality in the at least one first downlink serving beam; or determine, by the terminal device, that reference signal received power of at least one second downlink beam is higher than or equal to a sum of reference signal received power of a reference beam in the at least one first downlink serving beam and a fourth preset threshold, where the reference beam may be a beam with best reference signal received power or a beam with worst reference signal received power in the at least one first downlink serving beam; or determine, by the terminal device, that reference signal received quality of at least one second downlink beam is higher than or equal to a sum of reference signal received quality of a reference beam in the at least one first downlink serving beam and a fifth preset threshold, where the reference beam may be a beam with best reference signal received quality or a beam with worst reference signal received quality in the at least one first downlink serving beam.

Optionally, in an embodiment, the processing module 1120 is further configured to: after the quantity of times of transmission reaches the preset quantity of times, perform at least one of the following operations: transmitting a random access request to the network device; determining, by the terminal device, a radio link failure; entering, by the terminal device, an idle mode; and initiating, by the terminal device, a radio resource control RRC connection reestablishment process.

Optionally, in an embodiment, the processing module 1120 is further configured to: determine, based on the at least one first downlink serving beam, that at least one recovery request is triggered.

Optionally, in an embodiment, the processing module 1120 is further configured to: when the terminal device receives the response message transmitted by the network device, or when the quantity of times of transmission reaches the preset quantity of times, cancel the triggered at least one recovery request.

Optionally, in an embodiment, if the network device configures a discontinuous reception DRX mechanism for the terminal device, the request message is further used to trigger the terminal device to monitor a downlink channel.

Optionally, in an embodiment, the processing module 1120 is further configured to: if the terminal device detects, in a preset time window, the response message transmitted by the network device with respect to the request message, and no trigger condition used to control the terminal device to monitor the downlink channel is satisfied, stop, by the terminal device, monitoring the downlink channel; or if the terminal device does not detect, in a preset time window associated with the request message, the response message transmitted by the network device with respect to the request message, and no trigger condition used to control the terminal device to monitor the downlink channel is satisfied, stop, by the terminal device, monitoring the downlink channel.

Optionally, in an embodiment, the request message includes identity information of at least one downlink beam, where the at least one downlink beam is valid; or the request message includes identity information of at least one second downlink serving beam, where the at least one second downlink serving beam is a failed beam in a serving beam set of the terminal device.

Optionally, in an embodiment, before the terminal device receives the response message transmitted by the network device, the terminal device further includes: a receiving module, configured to receive resource information transmitted by the network device, where the resource information is used to indicate an uplink transmission resource; and the transmission module 110 is specifically configured to transmit a medium access control control element MAC CE to the network device by using the uplink transmission resource, where the MAC CE includes identity information of at least one downlink beam, and the at least one downlink beam is valid, or the MAC CE includes identity information of at least one second downlink serving beam, and the at least one second downlink serving beam is a failed beam in a serving beam set of the terminal device.

Optionally, the response message received by the terminal device is transmitted by the network device in one or more downlink beams, and the one or more downlink beams are obtained by the network device from the at least one downlink beam.

The terminal device 1100 according to this embodiment of this application may perform the method 400 for transmitting data according to the embodiment of this application, and the foregoing and other operations and/or functions of each module in the terminal device 1100 are respectively intended to implement the corresponding procedure of the foregoing method. Details are not described again herein for brevity.

Therefore, in this embodiment of this application, the terminal device 1100 transmits the request message to the network device, and counts the quantity of times of transmitting the request message; and before the quantity of times of transmission reaches the preset quantity of times, if the terminal device receives the response message transmitted by the network device, the terminal device stops transmitting the request message, and receives the data that is transmitted by the network device by using the downlink beam indicated by the response message; or after the quantity of times of transmission reaches the preset quantity of times, the terminal device stops transmitting the request message. Therefore, beam recovery can be performed, and further, unnecessary transmission of the request message is avoided, and power consumption of the terminal device is reduced.

Figure 12:
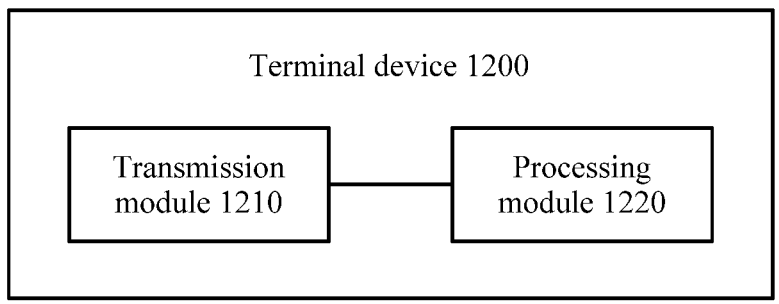
FIG. 12 is a schematic block diagram of a terminal device according to another embodiment of this application.

FIG. 12 is a schematic block diagram of a terminal device 1200 according to an embodiment of this application. As shown in FIG. 12, the terminal device 1200 includes: a transmission module 1210, configured to transmit a request message to a network device, and count a quantity of times of transmitting the request message, where the request message is used to request to recover a downlink beam; and a processing module 1220, configured to: when the quantity of times of transmission does not reach a preset quantity of times, if the terminal device receives a response message transmitted by the network device, stop transmitting the request message, and receive an uplink transmission resource that is indicated by the network device by using the response message, where the uplink transmission resource is used to transmit a measurement report; or when the quantity of times of transmission reaches a preset quantity of times, stop transmitting the request message.

Optionally, in an embodiment, the terminal device further includes: a determining module, configured to determine that at least one first downlink serving beam fails.

Optionally, in an embodiment, the processing module 1220 is further configured to: after the quantity of times of transmission reaches the preset quantity of times, transmit a random access request to the network device; or determine, by the terminal device, a radio link failure; or enter, by the terminal device, an idle mode; or initiate, by the terminal device, a radio resource control RRC connection reestablishment process.

Optionally, in an embodiment, the processing module 1220 is further configured to: determine, based on the at least one first downlink serving beam, that at least one recovery request is triggered.

Optionally, in an embodiment, the processing module 1220 is further configured to: when the terminal device receives the response message transmitted by the network device, or when the quantity of times of transmission reaches the preset quantity of times, cancel the triggered at least one recovery request.

Optionally, in an embodiment, if the network device configures a discontinuous reception DRX mechanism for the terminal device, the processing module 1220 is specifically configured to: after the terminal device transmits the request message of the downlink beam to the network device, and before the terminal device cancels the triggered at least one recovery request, monitor a downlink channel to receive the response message transmitted by the network device.

Optionally, in an embodiment, the processing module 1220 is further configured to: if the terminal device detects the response message transmitted by the network device, and no other condition used to control the terminal device to monitor a downlink control channel exists, stop monitoring the downlink channel; or if the quantity of times of transmission reaches the preset quantity of times, and the terminal device does not detect the response message transmitted by the network device, stop monitoring the downlink channel.

Optionally, in an embodiment, the request message includes identity information of at least one downlink beam, where the at least one downlink beam is valid; or the request message includes identity information of at least one second downlink serving beam, where the at least one second downlink serving beam is a failed beam in a serving beam set of the terminal device.

Optionally, in an embodiment, before the terminal device receives the response message transmitted by the network device, the terminal device further includes: a receiving module, configured to receive resource information transmitted by the network device, where the resource information is used to indicate an uplink transmission resource; and the transmission module 1210 is specifically configured to transmit a medium access control control element MAC CE to the network device by using the uplink transmission resource, where the MAC CE includes identity information of at least one downlink beam, and the at least one downlink beam is valid, or the MAC CE includes identity information of at least one second downlink serving beam, and the at least one second downlink serving beam is a failed beam in a serving beam set of the terminal device.

Optionally, the response message received by the terminal device is transmitted by the network device in one or more downlink beams, and the one or more downlink beams are obtained by the network device from the at least one downlink beam.

The terminal device 1200 according to this embodiment of this application may perform the method 500 for transmitting data according to the embodiment of this application, and the foregoing and other operations and/or functions of each module in the terminal device 1200 are respectively intended to implement the corresponding procedure of the foregoing method. Details are not described again herein for brevity.

Therefore, in this embodiment of this application, the terminal device 1200 transmits the request message to the network device, and counts the quantity of times of transmitting the request message; and before the quantity of times of transmission reaches the preset quantity of times, if the terminal device receives the response message transmitted by the network device, the terminal device stops transmitting the request message, and receives the uplink transmission resource that is indicated by the network device by using the response message, where the uplink transmission resource is used to transmit the measurement report; or after the quantity of times of transmission reaches the preset quantity of times, the terminal device stops transmitting the request message. Therefore, beam recovery can be performed, and further, unnecessary transmission of the request message is avoided, and power consumption of the terminal device is reduced.

Figure 13:
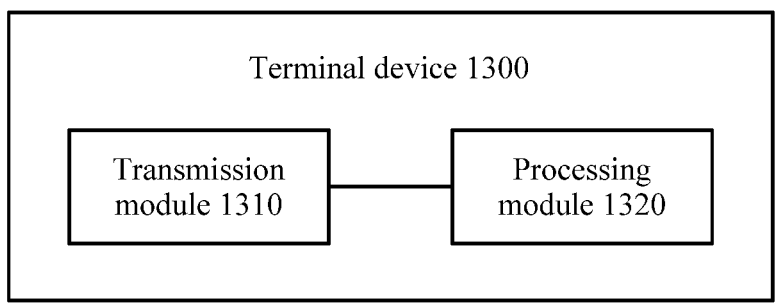
FIG. 13 is a schematic block diagram of a terminal device according to another embodiment of this application.

FIG. 13 is a schematic block diagram of a terminal device 1300 according to an embodiment of this application. As shown in FIG. 13, the terminal device 1300 includes: a transmission module 1310, configured to transmit a request message to a network device, and count a quantity of times of transmitting the request message, where the request message is used to request to recover a downlink beam; and a processing module 1320, configured to: when the quantity of times of transmission does not reach a preset quantity of times, if the terminal device receives a response message transmitted by the network device, stop transmitting the request message, and receive data that is transmitted by the network device by using a downlink beam indicated by the response message; or after the quantity of times of transmission reaches a preset quantity of times, stop transmitting the request message.

The terminal device 1300 according to this embodiment of this application may perform the method 300 for transmitting data according to the embodiment of this application, and the foregoing and other operations and/or functions of each module in the terminal device 1300 are respectively intended to implement the corresponding procedure of the foregoing method. Details are not described again herein for brevity.

Therefore, in this embodiment of this application, the terminal device 1300 transmits the request message to the network device, and counts the quantity of times of transmitting the request message; and before the quantity of times of transmission reaches the preset quantity of times, if the terminal device receives the response message transmitted by the network device, the terminal device stops transmitting the request message, and receives the data that is transmitted by the network device by using the downlink beam indicated by the response message; or after the quantity of times of transmission reaches the preset quantity of times, the terminal device stops transmitting the request message. Therefore, beam recovery can be performed, and further, unnecessary transmission of the request message is avoided, and power consumption of the terminal device is reduced.

Figure 14:
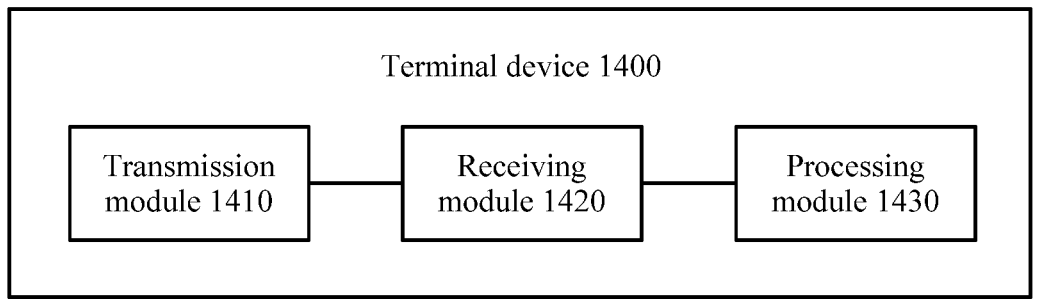
FIG. 14 is a schematic block diagram of a terminal device according to another embodiment of this application.

FIG. 14 is a schematic block diagram of a terminal device 1400 according to an embodiment of this application. As shown in FIG. 14, the terminal device 1400 includes: a transmission module 1410, configured to transmit a first signal in at least one uplink beam to a network device, where the first signal is used by the network device to determine, from the at least one uplink beam in which the first signal is transmitted, that at least one first beam is valid; a receiving module 1420, configured to receive a first message transmitted by the network device, where the first message includes the at least one first beam; and a processing module 1430, configured to transmit data by using the at least one first beam.

Optionally, in an embodiment, if the network device configures a discontinuous reception DRX mechanism for the terminal device, the first signal is further used to trigger the terminal device to monitor a downlink channel.

Optionally, in an embodiment, the starting module is further configured to start a second timer after the terminal device transmits the first signal in the at least one uplink beam to the network device; and the processing module 1430 is specifically configured to skip monitoring the downlink channel in a running period of the second timer.

The terminal device 1400 according to this embodiment of this application may perform the method 600 for transmitting data according to the embodiment of this application; and the foregoing and other operations and/or functions of each module in the terminal device 1400 are respectively intended to implement the corresponding procedure of the foregoing method, and may achieve an effect of the method 600. Details are not described again herein for brevity.

Therefore, in this embodiment of this application, the terminal device 1400 transmits the first signal in the at least one uplink beam to the network device, so that the network device determines, from the at least one uplink beam in which the first signal is transmitted, that at least one first beam having relatively good signal quality is valid; the terminal device receives the first message transmitted by the network device, where the first message includes the at least one first beam; and the terminal device finally transmits the data by using the at least one first beam, so that the data can be transmitted in the beam having relatively good signal quality.

Figure 15:
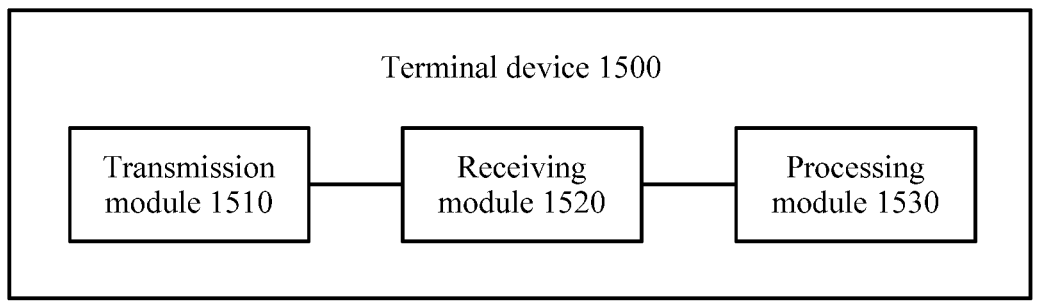
FIG. 15 is a schematic block diagram of a terminal device according to another embodiment of this application.

FIG. 15 is a schematic block diagram of a terminal device 1500 according to an embodiment of this application. As shown in FIG. 15, the terminal device 1500 includes: a transmission module 1510, configured to transmit a first signal in at least one uplink beam to a network device, where the first signal is used by the network device to determine, from the at least one uplink beam in which the first signal is transmitted, that at least one first beam is valid; a receiving module 1520, configured to receive a first message transmitted by the network device, where the first message includes an identity of the at least one first beam; and a processing module 1530, configured to transmit data by using the at least one first beam.

Optionally, in an embodiment, if the network device configures a discontinuous reception DRX mechanism for the terminal device, the terminal device further includes: a starting module, configured to start a first timer when the terminal device transmits the first signal in the at least one uplink beam to the network device; the receiving module 1520 is specifically configured to monitor a downlink channel in a running period of the first timer to receive the first message transmitted by the network device by using the downlink channel; and the processing module 1530 is specifically configured to stop monitoring the downlink channel after the first message is detected.

Optionally, in an embodiment, the starting module is further configured to start a second timer after the terminal device transmits the first signal in the at least one uplink beam to the network device; and the processing module 1530 is specifically configured to skip monitoring the downlink channel in a running period of the second timer when no other condition used to control the terminal device to monitor the downlink channel exists.

The terminal device 1500 according to this embodiment of this application may perform the method 700 for transmitting data according to the embodiment of this application, and the foregoing and other operations and/or functions of each module in the terminal device 1500 are respectively intended to implement the corresponding procedure of the foregoing method. Details are not described again herein for brevity.

Therefore, in this embodiment of this application, the terminal device 1500 transmits the first signal in the at least one uplink beam to the network device, so that the network device determines, from the at least one uplink beam in which the first signal is transmitted, that at least one first beam having relatively good signal quality is valid; the terminal device receives the first message transmitted by the network device, where the first message includes an identity of the at least one first beam; and the terminal device finally transmits the data by using the at least one first beam, so that the data can be transmitted in the beam having relatively good signal quality.

Figure 16:
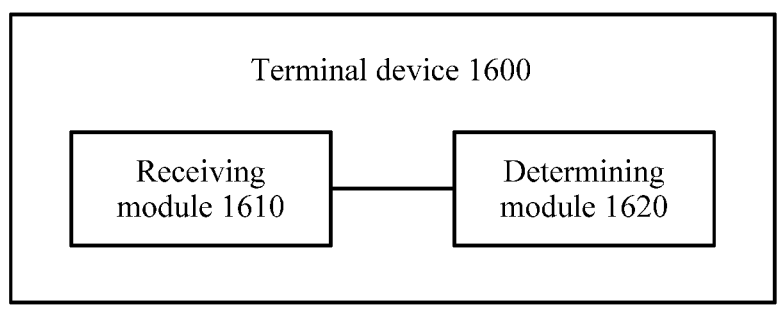
FIG. 16 is a schematic block diagram of a terminal device according to another embodiment of this application.

FIG. 16 is a schematic block diagram of a terminal device 1600 according to an embodiment of this application. As shown in FIG. 16, the terminal device 1600 includes: a receiving module 1610, configured to receive a first signal transmitted by a network device by using at least one downlink beam, where the first signal is a synchronization signal and/or a reference signal; and a determining module 1620, configured to determine cell out-of-synchronization or cell synchronization, or beam out-of-synchronization or beam synchronization based on first channel quality that is determined based on a first signal in all or a part of the at least one downlink beam.

In this embodiment of this application, the terminal device 1600 may determine cell out-of-synchronization or cell synchronization, or beam out-of-synchronization or beam synchronization based on the first channel quality that is determined based on the first signal in all or the part of the at least one downlink beam. Optionally, the determining module 1620 is specifically configured to: if the terminal device determines that reference signal received quality of all or the part of the at least one downlink beam is lower than a preset reference signal quality threshold, determine, by the terminal device, cell out-of-synchronization or beam out-of-synchronization; or if the terminal device measures that reference signal received power of all or the part of the at least one downlink beam is lower than a predetermined reference signal received power threshold, determine, by the terminal device, cell out-of-synchronization or beam out-of-synchronization.

Optionally, the preset reference signal quality threshold or the predetermined RSRP threshold may be determined by the network device.

Optionally, the terminal device 1600 further includes: a starting module, configured to start a first timer if the terminal device determines cell out-of-synchronization or beam out-of-synchronization.

Optionally, duration of the first timer may be configured by the network device, or may be prescribed by a protocol. This is not limited herein.

Optionally, if the terminal device receives synchronization IS indication information in a running period of the first timer, the terminal device stops the first timer.

Optionally, if the terminal device has not received the synchronization IS indication information when the first timer expires, the terminal device determines link connection failure, and triggers a reestablishment operation.

The terminal device 1600 according to this embodiment of this application may perform the method 800 for transmitting data according to the embodiment of this application; and the foregoing and other operations and/or functions of each module in the terminal device 1600 are respectively intended to implement the corresponding procedure of the foregoing method, and may achieve an effect of the method 800. Details are not described again herein for brevity.

Therefore, the terminal device receives a downlink serving beam transmitted by the network device, and may determine, based on signal quality or measured reference signal received power of the downlink serving beam, whether out-of-synchronization occurs.

Figure 17:
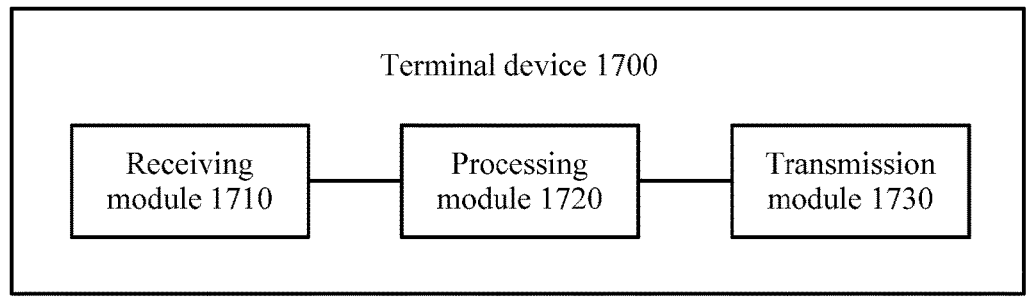
FIG. 17 is a schematic block diagram of a terminal device according to another embodiment of this application.

FIG. 17 is a schematic block diagram of a terminal device 1700 according to an embodiment of this application. As shown in FIG. 17, the terminal device 1700 includes: a receiving module 1710, configured to receive a first indication, where the first indication is used to allocate an uplink transmission resource; a processing module 1720, configured to: when determining that a first protocol layer protocol data unit PDU generated based on the uplink transmission resource includes padding bits, add first protocol layer control signaling for a beam status report to the padding bits; and a transmission module 1730, configured to transmit the first protocol layer PDU to the network device based on the first indication, where the first protocol layer PDU includes the padding bits, and the padding bits include the first protocol layer control signaling for the beam status report.

In this embodiment of this application, when determining that the uplink transmission resource includes a first resource, the terminal device 1700 generates a first padding beam recovery request BRR medium access control MAC control element CE, and transmits the first padding BRR MAC CE to the network device based on the first indication. Therefore, transmission resources can be utilized effectively.

The terminal device 1700 according to this embodiment of this application may perform the method 900 for transmitting data according to the embodiment of this application; and the foregoing and other operations and/or functions of each module in the terminal device 1700 are respectively intended to implement the corresponding procedure of the foregoing method, and may achieve an effect of the method 900. Details are not described again herein for brevity.

In this embodiment of this application, the terminal device 1700 may transmit the first padding BRR MAC CE to the network device by using a remaining resource, without actively requesting a resource. Therefore, transmission resources can be utilized effectively, and resource waste is avoided.

Figure 18:
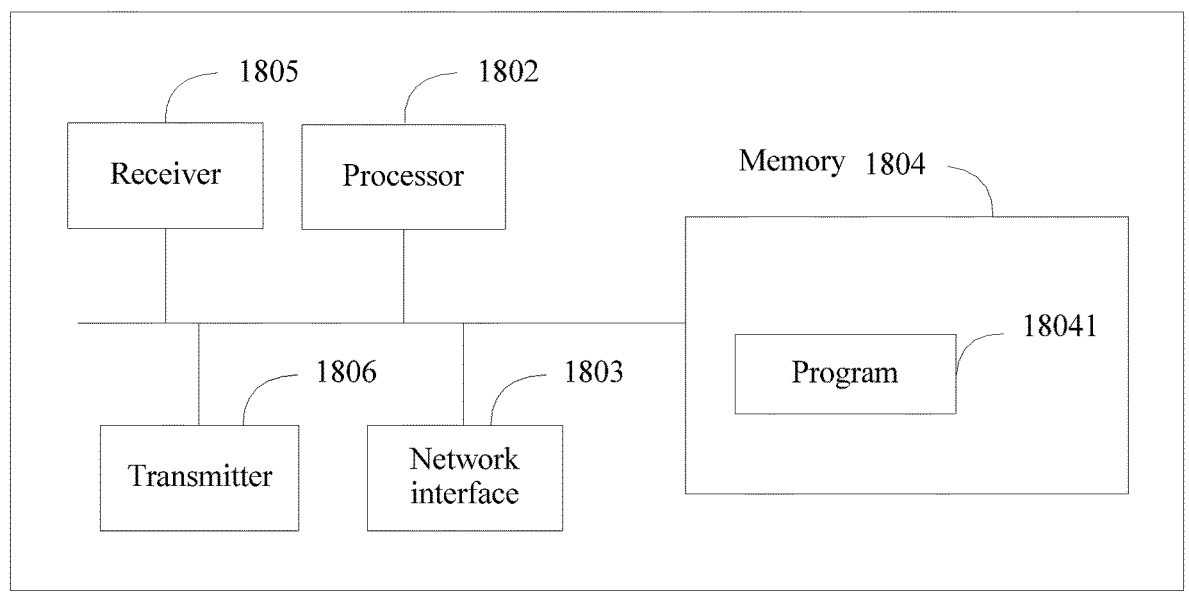
FIG. 18 is a structural block diagram of a terminal device according to an embodiment of this application.

FIG. 18 shows a structure of a terminal device according to an embodiment of this application. The terminal device includes a processor 1802 (for example, a CPU), at least one network interface 1803 or another communications interface, and a memory 1804. Optionally, the terminal device may further include a receiver 1805 and a transmitter 1806. The processor 1802 is configured to execute an executable module stored in the memory 1804, for example, a computer program. The memory 1804 may include a high-speed random access memory (RAM), and may also further include a non-volatile memory, for example, at least one disk storage. The at least one network interface 1803 (which may be wired or wireless) is used to implement a communications connection to at least one other network element. The receiver 1805 and the transmitter 1806 are configured to transmit various signals or information.

In some implementations, the memory 1804 stores a program 18041, where the program 18041 may be executed by the processor 1802, and is used to perform the method on the terminal device side in the foregoing embodiment of this application.

Figure 19:
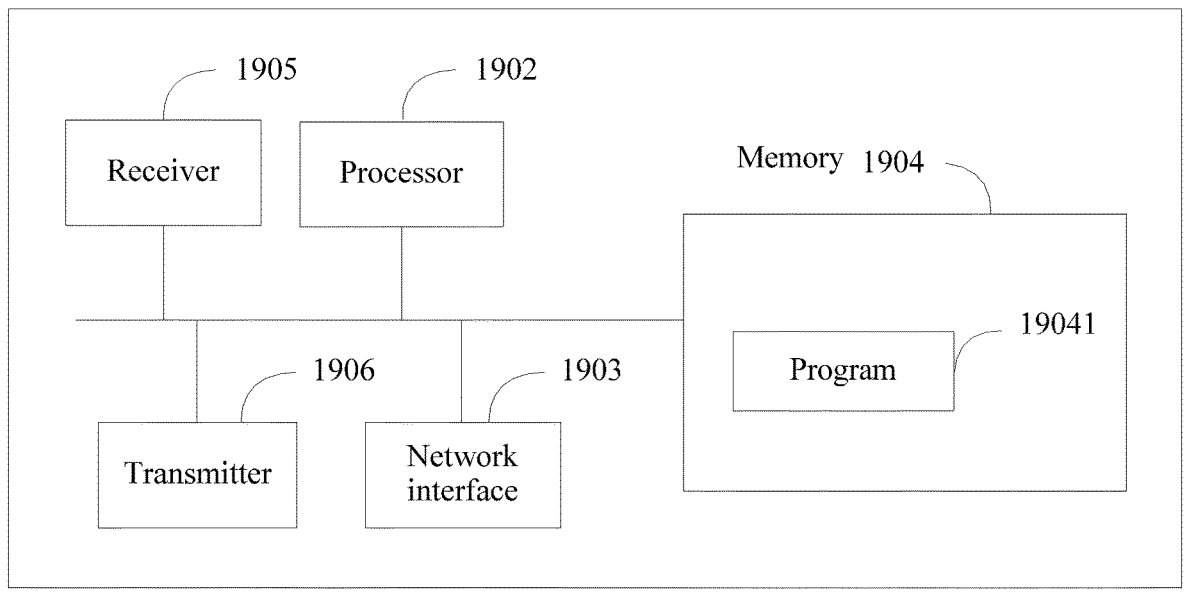
FIG. 19 is a structural block diagram of a terminal device according to an embodiment of this application.

FIG. 19 shows a structure of a terminal device according to an embodiment of this application. The terminal device includes a processor 1902 (for example, a CPU), at least one network interface 1903 or another communications interface, and a memory 1904. Optionally, the terminal device may further include a receiver 1905 and a transmitter 1906. The processor 1902 is configured to execute an executable module stored in the memory 1904, for example, a computer program. The memory 1904 may include a high-speed random access memory RAM, and may also further include a non-volatile memory, for example, at least one disk storage. The at least one network interface 1903 (which may be wired or wireless) is used to implement a communications connection to at least one other network element. The receiver 1905 and the transmitter 1906 are configured to transmit various signals or information.

In some implementations, the memory 1904 stores a program 19041, where the program 19041 may be executed by the processor 1902, and is used to perform the method on the terminal device side in the foregoing embodiment of this application.

Figure 20:
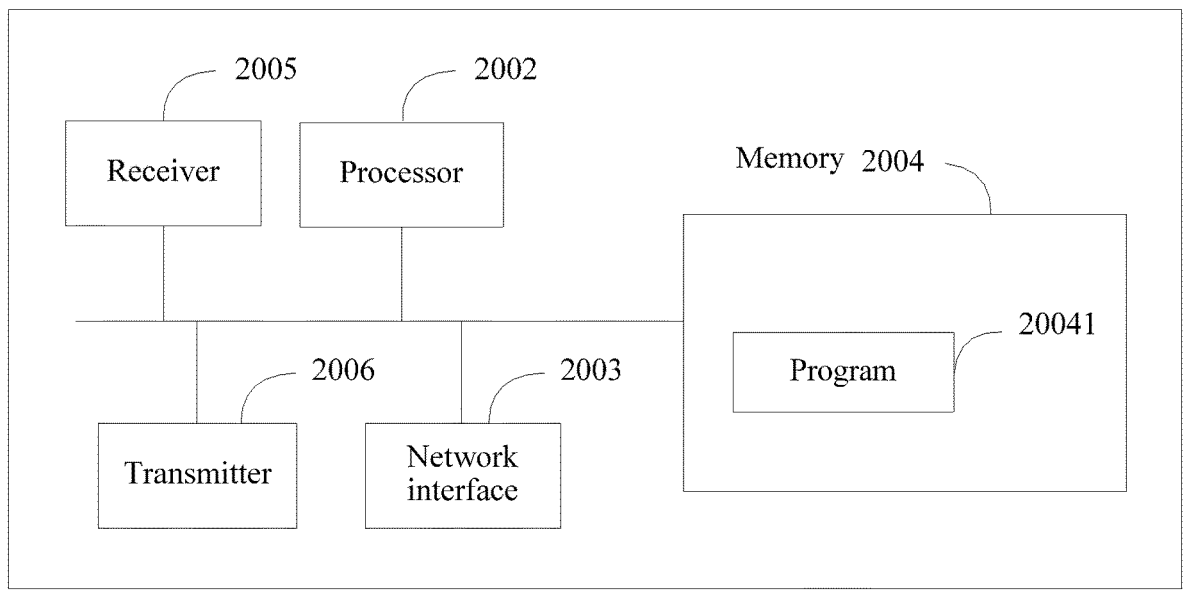
FIG. 20 is a structural block diagram of a terminal device according to an embodiment of this application.

FIG. 20 shows a structure of a terminal device according to an embodiment of this application. The terminal device includes a processor 2002 (for example, a CPU), at least one network interface 2003 or another communications interface, and a memory 2004. Optionally, the terminal device may further include a receiver 2005 and a transmitter 2006. The processor 2002 is configured to execute an executable module stored in the memory 2004, for example, a computer program. The memory 2004 may include a high-speed random access memory RAM, and may also further include a non-volatile memory, for example, at least one disk storage. The at least one network interface 2003 (which may be wired or wireless) is used to implement a communications connection to at least one other network element. The receiver 2005 and the transmitter 2006 are configured to transmit various signals or information.

In some implementations, the memory 2004 stores a program 20041, where the program 20041 may be executed by the processor 2002, and is used to perform the method on the terminal device side in the foregoing embodiment of this application.

Figure 21:
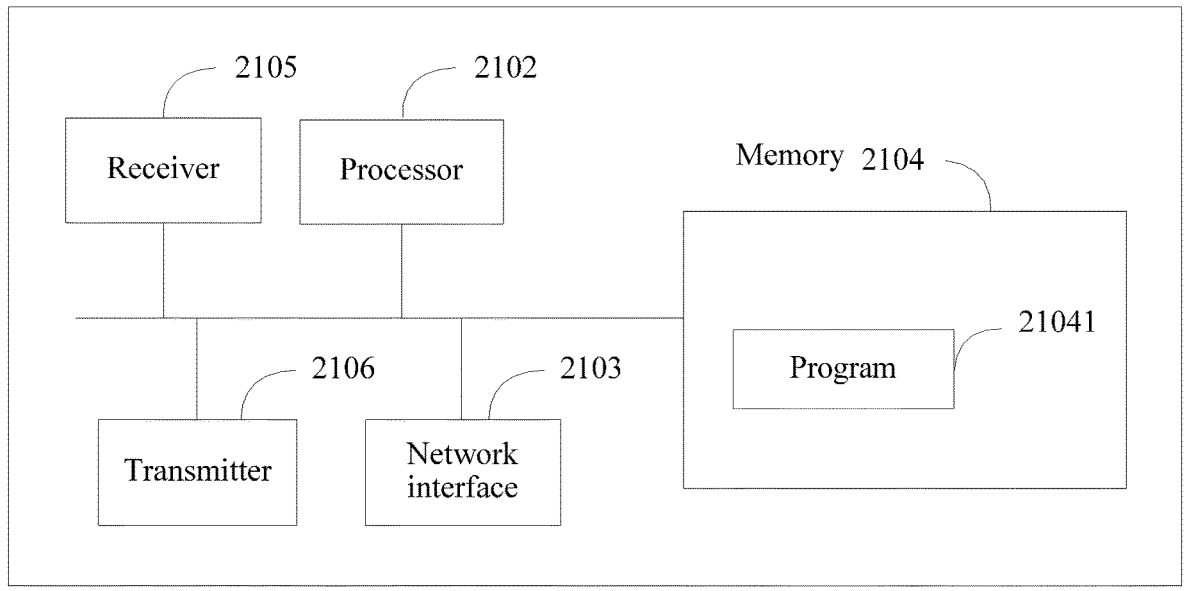
FIG. 21 is a structural block diagram of a terminal device according to an embodiment of this application.

FIG. 21 shows a structure of a terminal device according to an embodiment of this application. The terminal device includes a processor 2102 (for example, a CPU), at least one network interface 2103 or another communications interface, and a memory 2104. Optionally, the terminal device may further include a receiver 2105 and a transmitter 2106. The processor 2102 is configured to execute an executable module stored in the memory 2104, for example, a computer program. The memory 2104 may include a high-speed random access memory RAM, and may also further include a non-volatile memory (non-volatile memory), for example, at least one disk storage. The at least one network interface 2103 (which may be wired or wireless) is used to implement a communications connection to at least one other network element. The receiver 2105 and the transmitter 2106 are configured to transmit various signals or information.

In some implementations, the memory 2104 stores a program 21041, where the program 21041 may be executed by the processor 2102, and is used to perform the method on the terminal device side in the foregoing embodiment of this application.

Figure 22:
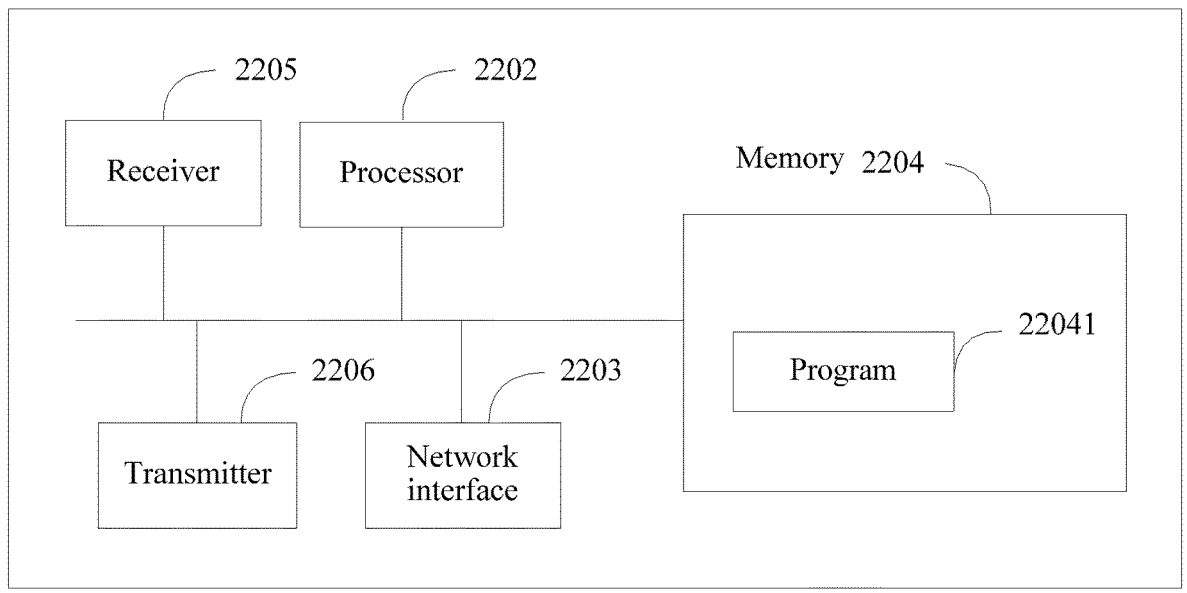
FIG. 22 is a structural block diagram of a terminal device according to an embodiment of this application.

FIG. 22 shows a structure of a terminal device according to an embodiment of this application. The terminal device includes a processor 2202 (for example, a CPU), at least one network interface 2203 or another communications interface, and a memory 2204. Optionally, the terminal device may further include a receiver 2205 and a transmitter 2206. The processor 2202 is configured to execute an executable module stored in the memory 2204, for example, a computer program. The memory 2204 may include a high-speed random access memory RAM, and may also further include a non-volatile memory (non-volatile memory), for example, at least one disk storage. The at least one network interface 2203 (which may be wired or wireless) is used to implement a communications connection to at least one other network element. The receiver 2205 and the transmitter 2206 are configured to transmit various signals or information.

In some implementations, the memory 2204 stores a program 22041, where the program 22041 may be executed by the processor 2202, and is used to perform the method on the terminal device side in the foregoing embodiment of this application.

Figure 23:
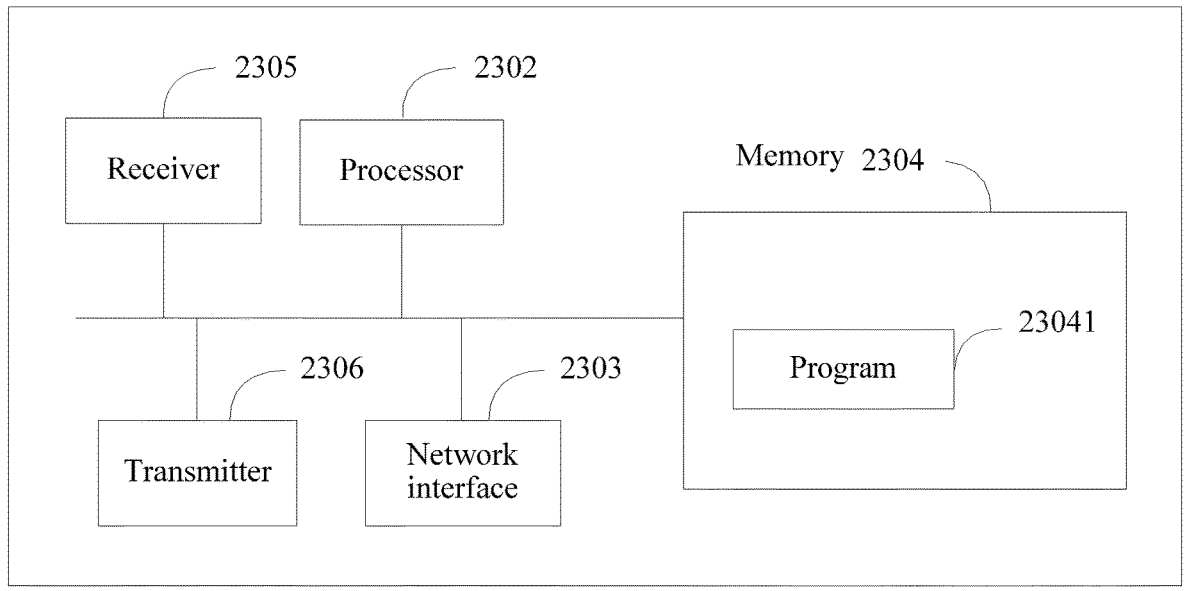
FIG. 23 is a structural block diagram of a terminal device according to an embodiment of this application.

FIG. 23 shows a structure of a terminal device according to an embodiment of this application. The terminal device includes a processor 2302 (for example, a CPU), at least one network interface 2303 or another communications interface, and a memory 2304. Optionally, the terminal device may further include a receiver 2305 and a transmitter 2306. The processor 2302 is configured to execute an executable module stored in the memory 2304, for example, a computer program. The memory 2304 may include a high-speed random access memory RAM, and may also further include a non-volatile memory, for example, at least one disk storage. The at least one network interface 2303 (which may be wired or wireless) is used to implement a communications connection to at least one other network element. The receiver 2305 and the transmitter 2306 are configured to transmit various signals or information.

In some implementations, the memory 2304 stores a program 23041, where the program 23041 may be executed by the processor 2302, and is used to perform the method on the terminal device side in the foregoing embodiment of this application.

Figure 24:
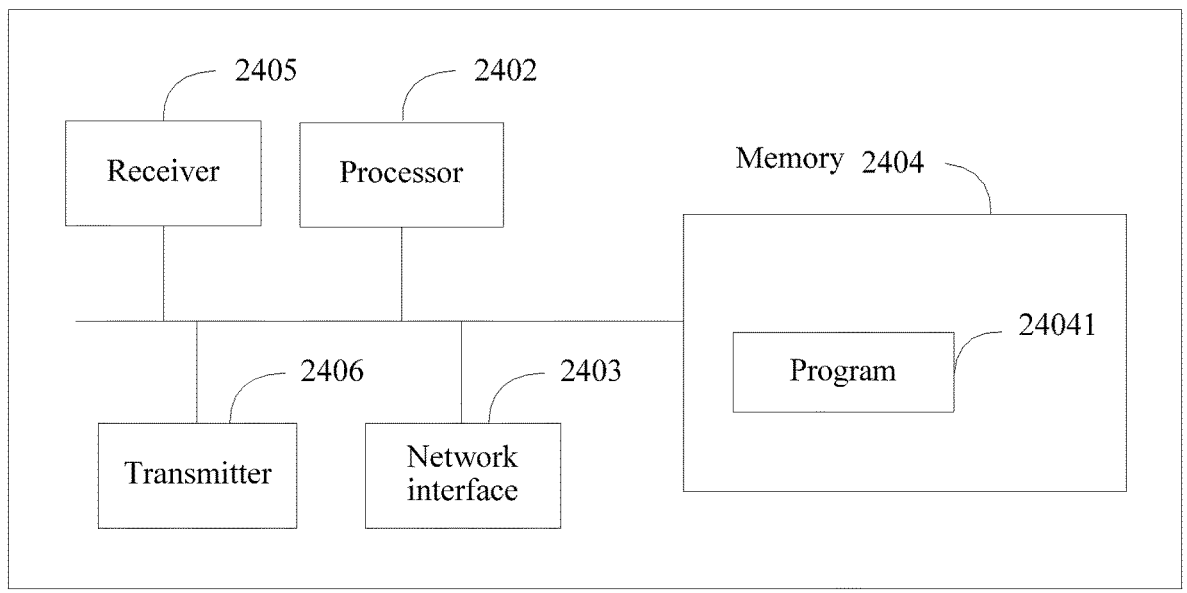
FIG. 24 is a structural block diagram of a terminal device according to an embodiment of this application.

FIG. 24 shows a structure of a terminal device according to an embodiment of this application. The terminal device includes a processor 2402 (for example, a CPU), at least one network interface 2403 or another communications interface, and a memory 2404. Optionally, the terminal device may further include a receiver 2405 and a transmitter 2406. The processor 2402 is configured to execute an executable module stored in the memory 2404, for example, a computer program. The memory 2404 may include a high-speed random access memory RAM, and may also further include a non-volatile memory, for example, at least one disk storage. The at least one network interface 2403 (which may be wired or wireless) is used to implement a communications connection to at least one other network element. The receiver 2405 and the transmitter 2406 are configured to transmit various signals or information.

In some implementations, the memory 2404 stores a program 24041, where the program 24041 may be executed by the processor 2402, and is used to perform the method on the terminal device side in the foregoing embodiment of this application.

Figure 25:
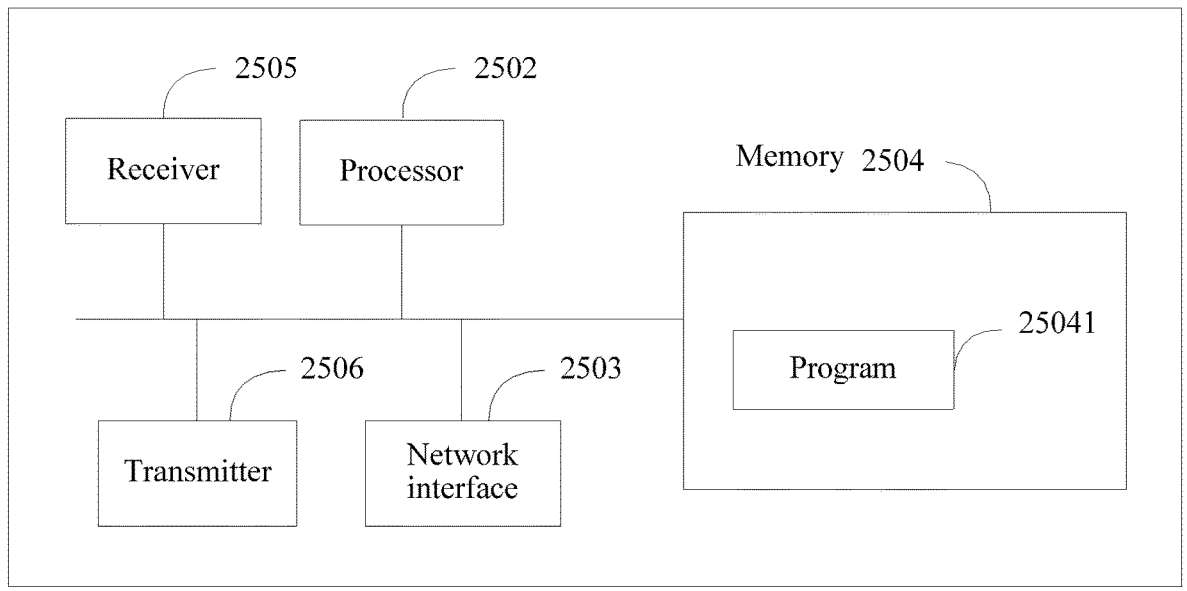
FIG. 25 is a structural block diagram of a terminal device according to an embodiment of this application.

FIG. 25 shows a structure of a terminal device according to an embodiment of this application. The terminal device includes a processor 2502 (for example, a CPU), at least one network interface 2503 or another communications interface, and a memory 2504. Optionally, the terminal device may further include a receiver 2505 and a transmitter 2506. The processor 2502 is configured to execute an executable module stored in the memory 2504, for example, a computer program. The memory 2504 may include a high-speed random access memory RAM, and may also further include a non-volatile memory (non-volatile memory), for example, at least one disk storage. The at least one network interface 2503 (which may be wired or wireless) is used to implement a communications connection to at least one other network element. The receiver 2505 and the transmitter 2506 are configured to transmit various signals or information.

In some implementations, the memory 2504 stores a program 25041, where the program 25041 may be executed by the processor 2502, and is used to perform the method on the terminal device side in the foregoing embodiment of this application.

It should be understood that, in this embodiment of this application, the terminal device may perform some or all of the steps in the foregoing embodiment. The steps or operations are merely examples. In this embodiment of this application, other operations or variants of operations may be further performed. In addition, the steps may be performed in different sequences presented in the foregoing embodiment, and not all operations in the foregoing embodiment may need to be performed.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the embodiments of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A method, comprising:
   receiving, by a terminal device, first control information transmitted by a network device, wherein the first control information comprises identity information of an uplink beam, and the first control information indicates whether the uplink beam is valid;
   in response to receiving the first control information, starting or restarting, by the terminal device, a first timer;
   in response to the first control information indicating that the uplink beam is valid, determining, by the terminal device, that the uplink beam is valid in a preset duration, wherein the preset duration is duration of a running period of the first timer;
   in response to the first control information indicating that the uplink beam is invalid, skipping, by the terminal device, transmitting data using the uplink beam; and
   in response to the first timer expiring or stopping, and the terminal device not receiving additional first control information, determining, by the terminal device, that the uplink beam is invalid, and transmitting a random access preamble sequence to the network device using a first random access channel resource.

2. The method according to claim 1, further comprising:
   receiving, by a physical (PHY) layer of the terminal device, identity information of a downlink beam transmitted by the network device;
   transmitting, by the PHY layer of the terminal device, the identity information of the downlink beam to a medium access control (MAC) layer of the terminal device;
   selecting, by the MAC layer of the terminal device based on the identity information of the downlink beam, the first random access channel resource from a resource pool corresponding to the identity information of the downlink beam;
   transmitting, by the MAC layer of the terminal device, the first random access channel resource to the PHY layer of the terminal device; and
   transmitting, by the PHY layer of the terminal device, the random access preamble sequence in the uplink beam to the network device using the first random access channel resource.

3. An apparatus, comprising:
   at least one processor coupled to a memory, the at least one processor being configured to cause a terminal device to:
   receive first control information transmitted by a network device, wherein the first control information comprises identity information of an uplink beam, and the first control information indicates whether the uplink beam is valid;
   perform the following:
     in response to the first control information indicating that the uplink beam is valid, determine that the uplink beam is valid in a preset duration; or
     in response to the first control information indicating that the uplink beam is invalid, skip transmitting data in the uplink beam; and
   in response to determining that the uplink beam is invalid, transmit a random access preamble sequence to the network device.

4. The apparatus according to claim 3, wherein the processor is further configured to cause the terminal device to:
   in response to receiving the first control information, start or restart a first timer, wherein the preset duration is a duration of a running period of the first timer.

5. The apparatus according to claim 4, wherein the processor is further configured to cause the terminal device to:
   during the running period of the first timer, in response to the first control information indicating that the uplink beam is invalid, determine that the uplink beam is invalid, and stop the first timer.

6. The apparatus according to claim 4, wherein the processor is further configured to cause the terminal device to:

in response to the first timer expiring or stopping, and in response to the terminal device not receiving additional first control information, determine that the uplink beam is invalid.

7. The apparatus according to claim 4, wherein the processor is further configured to cause the terminal device to:

receive, by a physical (PHY) layer of the terminal device, identity information of a downlink beam transmitted by the network device;

transmit, by the PHY layer of the terminal device, the identity information of the downlink beam to a medium access control (MAC) layer of the terminal device;

select, by the MAC layer of the terminal device based on the identity information of the downlink beam, a first random access channel resource from a resource pool corresponding to the identity information of the downlink beam;

transmit, by the MAC layer of the terminal device, the first random access channel resource to the PHY layer of the terminal device; and transmit, by the PHY layer of the terminal device, the random access preamble sequence in the uplink beam to the network device using the first random access channel resource.

8. A non-transitory computer readable medium storing instructions, wherein when the instructions are executed by one or more processors, the instructions cause a terminal to:

receive first control information transmitted by a network device, wherein the first control information comprises identity information of an uplink beam, and the first control information indicates whether the uplink beam is valid;

in response to receiving the first control information, start or restart a first timer; and perform the following:

in response to the first control information indicating that the uplink beam is valid, determine that the uplink beam is valid in a preset duration, wherein the preset duration is duration of a running period of the first timer; and in response to the first control information indicating that the uplink beam is invalid, skip transmitting data in the uplink beam.

9. The non-transitory computer readable medium according to claim 8, wherein when the instructions are executed by the one or more processors, the instructions further cause the terminal to:

during the running period of the first timer, and in response to the first control information indicating that the uplink beam is invalid, determine that the uplink beam is invalid, and stop the first timer.

10. The non-transitory computer readable medium according to claim 8, wherein when the instructions are executed by the one or more processors, the instructions further cause the terminal to:

in response to the first timer expiring or stopping, and in response to the terminal not receiving additional first control information, determine that the uplink beam is invalid.

11. The non-transitory computer readable medium according to claim 8, wherein when the instructions are executed by the one or more processors, the instructions further cause the terminal to:

receive, by a physical (PHY) layer of the terminal, identity information of a downlink beam transmitted by the network device;

transmit, by the PHY layer of the terminal, the identity information of the downlink beam to a medium access control (MAC) layer of the terminal;

select, by the MAC layer of the terminal based on the identity information of the downlink beam, a first random access channel resource from a resource pool corresponding to the identity information of the downlink beam;

transmit, by the MAC layer of the terminal, the first random access channel resource to the PHY layer of the terminal; and transmitting, by the PHY layer of the terminal, a random access preamble sequence in the uplink beam to the network device using the first random access channel resource.

\* \* \* \* \*